United States Patent
Muramatsu et al.

(10) Patent No.: US 12,388,116 B2
(45) Date of Patent: Aug. 12, 2025

(54) POSITIVE ACTIVE MATERIAL FOR NONAQUEOUS ELECTROLYTE SECONDARY BATTERY, METHOD FOR PRODUCING POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, NONAQUEOUS ELECTROLYTE SECONDARY BATTERY, METHOD FOR MANUFACTURING NONAQUEOUS ELECTROLYTE SECONDARY BATTERY, AND METHOD OF USING NONAQUEOUS ELECTROLYTE SECONDARY BATTERY

(71) Applicant: GS Yuasa International Ltd., Kyoto (JP)

(72) Inventors: Hiromasa Muramatsu, Kyoto (JP); Ryo Harada, Kyoto (JP); Akira Kishimoto, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 940 days.

(21) Appl. No.: 17/252,765

(22) PCT Filed: Jun. 19, 2019

(86) PCT No.: PCT/JP2019/024375
§ 371 (c)(1),
(2) Date: Dec. 16, 2020

(87) PCT Pub. No.: WO2019/244955
PCT Pub. Date: Dec. 26, 2019

(65) Prior Publication Data
US 2021/0257665 A1 Aug. 19, 2021

(30) Foreign Application Priority Data

Jun. 21, 2018 (JP) .............................. 2018-117725
Jun. 21, 2018 (JP) .............................. 2018-117727
Oct. 31, 2018 (JP) .............................. 2018-205573

(51) Int. Cl.
H01M 4/505 (2010.01)
H01M 4/525 (2010.01)
(Continued)

(52) U.S. Cl.
CPC ....... H01M 10/0568 (2013.01); H01M 4/505 (2013.01); H01M 4/525 (2013.01);
(Continued)

(58) Field of Classification Search
None
See application file for complete search history.

(56) References Cited

U.S. PATENT DOCUMENTS 7,393,476 B2 * 7/2008 Shiozaki ................ C01G 51/44
429/231.95
9,543,055 B2 1/2017 Endo et al.
(Continued)

FOREIGN PATENT DOCUMENTS

EP 2660907 A1 11/2013
JP 8-31406 A 2/1996
(Continued)

OTHER PUBLICATIONS

A guide to Understanding Battery Specifications, https://web.mit.edu/evt/summary_battery_specifications.pdf (3 pages). (Year: 2008).*
(Continued)

Primary Examiner — Tracy M Dove
(74) Attorney, Agent, or Firm — RANKIN, HILL & CLARK LLP

(57) ABSTRACT

A nonaqueous electrolyte secondary battery including a positive electrode, a negative electrode, and a nonaqueous
(Continued)

electrolyte, in which the positive electrode includes, as an active material, a lithium-transition metal composite oxide that has an α-NaFeO$_2$-type crystal structure, and is represented by the general formula Li$_{1+\alpha}$Me$_{1-\alpha}$O$_2$ (0<α, Me is a transition metal element containing Ni and Mn, or containing Ni, Mn, and Co), and has a diffraction peak observed in the range of 20° or more and 22° or less in an X-ray diffraction pattern obtained with a CuKα line.

17 Claims, 7 Drawing Sheets

(51) Int. Cl.
| | |
|---|---|
| *H01M 10/0525* | (2010.01) |
| *H01M 10/0568* | (2010.01) |
| *H01M 10/0569* | (2010.01) |
| *H01M 10/44* | (2006.01) |
| *H01M 4/02* | (2006.01) |

(52) U.S. Cl.
CPC ... *H01M 10/0525* (2013.01); *H01M 10/0569* (2013.01); *H01M 10/446* (2013.01); *H01M 10/448* (2013.01); *H01M 2004/027* (2013.01); *H01M 2004/028* (2013.01); *H01M 2300/0028* (2013.01)

(56) References Cited

U.S. PATENT DOCUMENTS

| | | | |
|---|---|---|---|
| 10,297,822 | B2 | 5/2019 | Endo et al. |
| 2004/0234857 | A1 | 11/2004 | Shiozaki et al. |
| 2005/0019661 | A1 | 1/2005 | Han et al. |
| 2009/0239146 | A1 | 9/2009 | Nakagawa et al. |
| 2010/0086854 | A1 | 4/2010 | Kumar et al. |
| 2010/0233542 | A1 | 9/2010 | Endo et al. |
| 2011/0037440 | A1 | 2/2011 | Endo et al. |
| 2012/0077064 | A1 | 3/2012 | Sasakawa et al. |
| 2012/0115043 | A1 | 5/2012 | Yu et al. |
| 2012/0308881 | A1 | 12/2012 | Tokuda et al. |
| 2013/0280622 | A1 | 10/2013 | Tokuda et al. |
| 2013/0313471 | A1 | 11/2013 | Endo et al. |
| 2014/0059845 | A1 | 3/2014 | Endo et al. |
| 2014/0141331 | A1 | 5/2014 | Lee et al. |
| 2014/0199602 | A1 | 7/2014 | Kim et al. |
| 2014/0234717 | A1 | 8/2014 | Christensen et al. |
| 2014/0242468 | A1 | 8/2014 | Song et al. |
| 2014/0272563 | A1 | 9/2014 | Dai et al. |
| 2015/0064577 | A1 | 3/2015 | Natsui et al. |
| 2015/0147644 | A1 | 5/2015 | Kinoshita et al. |
| 2016/0190551 | A1 | 6/2016 | Endo |
| 2016/0301073 | A1 | 10/2016 | Yoshikawa et al. |
| 2017/0117544 | A1 | 4/2017 | Endo et al. |
| 2017/0117586 | A1 | 4/2017 | Dubois et al. |
| 2017/0338511 | A1 | 11/2017 | Yamano et al. |
| 2018/0145318 | A1 | 5/2018 | Endo et al. |

FOREIGN PATENT DOCUMENTS

| | | | |
|---|---|---|---|
| JP | 2003-123755 | A | 4/2003 |
| JP | 2005-44785 | A | 2/2005 |
| JP | 2010-50079 | A | 3/2010 |
| JP | 2011-187440 | A | 9/2011 |
| JP | 2012-504316 | A | 2/2012 |
| JP | 4877660 | B2 | 2/2012 |
| JP | 2012-89470 | A | 5/2012 |
| JP | 2012-104335 | A | 5/2012 |
| JP | 2012-151085 | A | 8/2012 |
| JP | 2012-234772 | A | 11/2012 |
| JP | 2013-65472 | A | 4/2013 |
| JP | 2013-191390 | A | 9/2013 |
| JP | 2014-75177 | A | 4/2014 |
| JP | 2014-107269 | A | 6/2014 |
| JP | 2014-137996 | A | 7/2014 |
| JP | 2014-170739 | A | 9/2014 |
| JP | 2014-197523 | A | 10/2014 |
| JP | 2015-65165 | A | 4/2015 |
| JP | 2015-122235 | A | 7/2015 |
| JP | 2015-128044 | A | 7/2015 |
| JP | 2015-162304 | A | 9/2015 |
| JP | 2016-15298 | A | 1/2016 |
| JP | 2016-42409 | A | 3/2016 |
| JP | 2016-100054 | A | 5/2016 |
| JP | 2016-517615 | A | 6/2016 |
| JP | 2016-126935 | A | 7/2016 |
| JP | 2017-10842 | A | 1/2017 |
| JP | 2017-520100 | A | 7/2017 |
| JP | 2018-107118 | A | 7/2018 |
| WO | 03/044881 | A1 | 5/2003 |
| WO | 2015/004856 | A1 | 1/2015 |
| WO | 2015/039490 | A1 | 3/2015 |
| WO | 2015/083330 | A1 | 6/2015 |
| WO | 2016/190419 | A1 | 12/2016 |
| WO | 2018/012385 | A1 | 1/2018 |

OTHER PUBLICATIONS

Lanz et al., "Ex situ and in situ Raman microscopic investigation of the differences between stoichiometric LiMO2 and high-energy xLi2MnO3.(1-x)LiM02 (M=Ni, Co, Mn)", Electrochimica Acta, Elsevier, 2014, vol. 130, pp. 206-212; Cited in Specification.
International Search Report (ISR) dated Aug. 6, 2019 filed in PCT/JP2019/024375.
US Office Action (USOA) of U.S. Appl. No. 16/973,472 dated Dec. 8, 2023.
US Office Action dated Jan. 3, 2025 for U.S. Appl. No. 16/973,472.

* cited by examiner

POSITIVE ACTIVE MATERIAL FOR NONAQUEOUS ELECTROLYTE SECONDARY BATTERY, METHOD FOR PRODUCING POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, NONAQUEOUS ELECTROLYTE SECONDARY BATTERY, METHOD FOR MANUFACTURING NONAQUEOUS ELECTROLYTE SECONDARY BATTERY, AND METHOD OF USING NONAQUEOUS ELECTROLYTE SECONDARY BATTERY

TECHNICAL FIELD

The present invention relates to a positive active material for a nonaqueous electrolyte secondary battery, a method for producing the positive active material, a positive electrode for a nonaqueous electrolyte secondary battery, a nonaqueous electrolyte secondary battery, a method for manufacturing a nonaqueous electrolyte secondary battery, and a method of using the battery.

BACKGROUND ART

The use of nonaqueous electrolyte secondary batteries typified by lithium secondary batteries have been increasingly expanded in recent years, and development of higher-capacity positive electrode materials has been required.

Conventionally, lithium-transition metal composite oxides that have an $\alpha$-NaFeO$_2$-type crystal structure have been studied as positive active materials for nonaqueous electrolyte secondary batteries, and nonaqueous electrolyte secondary batteries obtained with LiCoO$_2$ have been widely put into practical use. The discharge capacity of LiCoO$_2$ is about 120 to 130 mAh/g. With the use of a so-called "LiMeO$_2$-type" active material in which Mn, which is abundant as an earth resource, is used as a transition metal (Me) constituting the lithium-transition metal composite oxide, the molar ratio Li/Me of Li to the transition metal constituting the lithium-transition metal composite oxide is approximately 1, and the molar ratio Mn/Me of Mn in the transition metal is 0.5 or less, nonaqueous electrolyte secondary batteries have been also put into practical use. For example, the discharge capacity of LiNi$_{1/2}$Mn$_{1/2}$O$_2$ or LiNi$_{1/3}$Co$_{1/3}$Mn$_{1/3}$O$_2$ is 150 to 180 mAh/g.

On the other hand, in recent years, among the lithium-transition metal composite oxides that have an $\alpha$-NaFeO$_2$-type crystal structure, so-called "lithium-excessive" active materials are known in which the molar ratio Mn/Me of Mn in the transition metal (Me) is increased, with the molar ratio Li/Me of Li to the transition metal (Me) in excess of 1. These active materials have been attracting attention, because the active materials have the feature of, in the case of certain Li/Me or higher, an observed region where the potential change is relatively flat with respect to the amount of charge in the potential range of 4.5 V (vs. Li/Li$^+$) or higher and 5.0 V (vs. Li/Li$^+$) or lower in the first charge process after assembling a battery, and have, in charge with electricity until the completion of the charge process with the flat region observed, higher discharge capacities than the "LiMeO$_2$-type" active materials, even if the subsequent potential is not so high (see Patent Document 1).

Patent Document 1 discloses a nonaqueous electrolyte secondary battery including "an active material for a lithium secondary battery, containing a solid solution of a lithium-transition metal composite oxide that has an $\alpha$-NaFeO$_2$-type crystal structure, characterized in that the compositional ratios of Li, Co, Ni, and Mn contained in the solid solution satisfy Li$_{1+(1/3)x}$Co$_{1-x-y}$Ni$_{(1/2)y}$Mn$_{(2/3)x+(1/2)y}$ (x+y≤1, 0≤y, 1−x−y=z), represented by . . . , and the intensity ratio between the diffraction peaks of the (003) plane and the (104) plane, obtained by X-ray diffraction measurement, is I$_{(003)}$/I$_{(104)}$>1 at the end of discharge, and the amount of electricity that can be discharged in a potential region of 4.3 V (vs. Li/Li$^+$) or lower is 177 mAh/g or more in a case where the battery undergoes a step of initially charging the battery with electricity for reaching a region with relatively flat potential change that appears with respect to the amount of charge in the positive electrode potential range of higher than 4.3 V (vs. Li/Li$^+$) and 4.8 V or lower (vs. Li/Li$^+$)." (Claim 3) in a positive electrode.

Further, the paragraph [0058] mentions that "The active material for a lithium secondary battery according to the present invention is an active material that exists in the region of x>⅓, and has a diffraction peak observed around 2θ=20 to 30° in an X-ray diffraction pattern obtained with a CuKα line, as in Li[Li$_{1/3}$Mn$_{2/3}$]O$_2$-type monoclinic crystals. This is presumed to be a superlattice line observed in the case of Li$^+$ and Mn$^{4+}$ regularly arranged", and furthermore, the paragraph [0062] mentions that "in order to manufacture a lithium secondary battery capable of extracting a sufficient discharge capacity even if such a charge method is employed such that the maximum attainable potential of the positive electrode during charge with electricity is 4.3 V (vs. Li/Li$^+$) or lower in use with the use of the active material for a lithium secondary battery according to the present invention, it is important to provide, in the process of manufacturing the lithium secondary battery, the following charge process in consideration of the behavior characteristic of the active material according to the lithium secondary battery according to the present invention. More specifically, when constant current charge is continued with the use of the active material for a lithium secondary battery according to the present invention in the positive electrode, a region with relatively flat potential change is observed over a relatively long period in the positive electrode potential range of 4.3 V to 4.8 V . . . . The charge condition employed herein is constant current constant voltage charge with a current 0.1 ItA and a voltage (positive electrode potential) of 4.5 V (vs. Li/Li$^+$), and even if the charge voltage is set higher, the potential flat region over a relatively long period is hardly observed in the case of using a material with an x value of ⅓ or less. In contrast, in the case of the material with the value of x in excess of ⅔, a region with relatively flat potential change will be short even if any is observed. Moreover, this behavior is not observed even in the case of conventional Li[Co$_{1-2x}$Ni$_x$Mn$_x$]O$_2$ (0≤x≤½)-based materials. This behavior is characteristic of the active material for a lithium secondary battery according to the present invention".

Furthermore, the document mentions that as an example of the lithium secondary battery, with the use of a "lithium metal" for a negative electrode to be combined with the positive electrode, and "LiPF$_6$ dissolved to a concentration of 1 mol/lithium in a mixed solvent of EC/EMC/DMC with a volume ratio of 6:7:7", for an electrolyte, "the battery was subjected to 5 cycles of initial charge-discharge step at 20° C. Voltage control was all performed on the positive electrode potential. The charge was constant current constant voltage charge with a current of 0.1 ItA and a voltage of 4.5 V, and the charge termination condition was the time when the current value was attenuated to ⅙. The discharge was constant current discharge with a current of 0.1 ItA and a cutoff voltage of 2.0 V. A 30-minute pause time was set after charge and after discharge in all of the cycles." (paragraphs [0112] to [0114]).

In addition, Patent Document 2 mentions that, "A non-aqueous electrolyte secondary battery comprising a positive electrode containing a positive active material, a negative electrode containing a negative active material, and a non-aqueous electrolyte solution containing a nonaqueous solvent, characterized in that the positive active material comprises a lithium-containing transition metal oxide represented by the general formula (1) $Li_{1+x}Mn_yM_zO_2$ (where x, y, and z satisfy 0<x<0.4, 0<y<1, 0<z<1, and x+y+z=1, and M represents one or more metal elements containing at least Ni or Co), and the nonaqueous solvent comprises a fluorinated cyclic carbonate in which two or more fluorine atoms are directly bonded to a carbonate ring." (Claim 1).

Furthermore, the document mentions that as Example 1 of the secondary battery, with "$Li_{1.2}Mn_{0.54}Ni_{0.13}Co_{0.13}O_2$" for the positive active material, the negative electrode containing silicon and carbon, and "$LiPF_6$" dissolved to a concentration of 1 mol/liter in a nonaqueous solvent of 4,5-difluoroethylene carbonate and ethyl methyl carbonate with a volume ratio of 2:8" for the nonaqueous electrolyte, and initial charge-discharge was performed as follow: "The battery was charged with electricity at a constant current of 0.5 It until the battery voltage reached 4.45 V, and further subjected to constant voltage charge at a constant voltage of 4.45 V until the current value reached 0.05 It. It is to be noted that the potential of the positive electrode in this case was 4.60 V based on metallic lithium. Thereafter, the battery was discharged at a constant current of 0.5 It until the battery voltage reached 1.50 V" (paragraphs [0041] to [0049]).

Also known is a nonaqueous electrolyte secondary battery obtained with the use of a lithium-excessive active material for a positive electrode and with the addition of a compound having an oxalate group bonded to boron to a nonaqueous electrolyte.

Patent Document 3 discloses "A lithium ion secondary battery comprising a positive electrode containing a positive active material that operates at a potential of 4.4 V (vs Li/Li$^+$) or higher, a negative electrode, and an electrolyte solution containing a nonaqueous solvent, wherein the electrolyte solution contains a first lithium salt having a boron atom, represented by the following formula (1) and/or formula (2) at 0.01% by mass or more and 10% by mass or less and a second lithium salt having no boron atom at 1% by mass or more and 40% by mass or less . . . (Claim 1)", and "The lithium ion secondary battery according to any one of claims 1 to 3, wherein the first lithium salt comprises one or more selected from the group consisting of $LiBF_4$, $LiB(C_2O_4)_2$, and $LiBF_2(C_2O_4)$." (Claim 4).

Further, the paragraphs [0076] to [0083] disclose, as Example 1, a lithium ion secondary battery including: "$0.5Li_2MnO_3$-$0.5LiNi_{0.37}Mn_{0.37}Co_{0.26}O_2$" for the positive active material; graphite for the negative active material; and for the electrolyte solution, an "electrolyte solution A" with "0.2 g of lithium bisoxaborate ( . . . hereinafter, referred to as 'LiBOB') mixed into 9.8 g of a solution ( . . . ) containing a $LiPF_6$ salt at 1 mol/L in a mixed solvent of ethylene carbonate and ethyl methyl carbonate mixed at a volume ratio of 1:2", and the paragraphs [0085] to [0087] disclose, as Example 3, the preparation of the same lithium ion secondary battery as in Example 1 except for the use of an electrolyte solution C obtained by changing the LiBOB of the electrolyte solution A in Example 1 to $LiBF_2(C_2O_2)$, and disclose the evaluation of each battery by a 50-cycle charge-discharge test of: charge to reaching 4.7 V and discharge down to 2.0 V; and then charge to reaching 4.5 V and discharge down to 2.0 V for 1-cycle charge-discharge.

Patent Document 4 discloses "A lithium ion battery comprising a positive electrode, a negative electrode, a nonaqueous electrolyte solution, and a separator, characterized in that a positive active material contained in the positive electrode has a first charge-discharge efficiency of 80% to 90% in a charge-discharge case with metal Li as a counter electrode, a negative active material contained in the negative electrode comprises a mixed material of a silicon compound and a carbon material, the negative electrode is not doped with lithium for an irreversible capacity in initial charge-discharge, and a capacity ratio of the negative electrode to the positive electrode is 0.95 or more and 1 or less in the initial charge electric capacities of the positive electrode and the negative electrode." (Claim 1), "The lithium ion battery according to claim 1, wherein the positive active material is represented by the following chemical formula 1: [Chemical Formula 1] $aLi[Li_{1/3}Mn_{2/3}]O_2$ (1−a)$Li[Ni_xCo_yMn_z]O_2$ (0≤a≤0.3, 0≤x≤1, 0≤y≤1, 0≤z≤1, x+y+z=1)" (Claim 6), and "The lithium ion battery according to claim 1, wherein the nonaqueous electrolyte solution comprises a solvent and a supporting salt, the solvent contains at least γ-butyrolactone (GBL), and the supporting salt contains at least lithium bis(oxalate)borate (LiBOB)." (Claim 8).

Further, the paragraphs [0047] to [0054] disclose, as Example 1, the preparation of a charge-discharge test battery including: "$(0.2Li_2MnO_3$-$0.8LiNi_{0.33}Co_{0.33}Mn_{0.33}O_2)$" for a positive active material; a composite of "Si, SiO, and HC" for a negative active material; and "1M $LiPF_6$+0.05M LiBOB EC (ethylene carbonate):GBL (γ-butyrolactone)=1:1 (vol %)" for a nonaqueous electrolyte, and "a charge-discharge test performed at 60° C. with a cutoff voltage of 2.2-4.6 V in the first charge-discharge and a cutoff voltage of 2.2-4.3 V in the second and subsequent charge-discharge".

Patent Document 5 discloses, "A nonaqueous electrolyte secondary battery comprising a positive electrode including a positive active material, a negative electrode including a negative active material, and a nonaqueous electrolyte that has lithium ion conductivity, characterized in that the positive active material has a layered structure, and a lithium-containing transition metal composite oxide represented by the general formula $Li_{1+x}(Ni_aMn_bCo_c)O_{2+\alpha}$ (x+a+b+c=1, 0.7≤a+b, 0<x≤0.1, 0≤c/(a+b)<0.35, 0.7≤a/b≤2.0, −0.1≤α≤0.1), and the nonaqueous electrolyte contains a lithium salt with an oxalate complex as an anion." (Claim 1).

Further, the paragraphs [0039] to [0058] and Table 1 disclose, as Examples 1 to 8, the preparation of a nonaqueous electrolyte secondary battery including: $Li_{1.06}Ni_{0.47}Mn_{0.47}O_2$, $Li_{1.07}Ni_{0.56}Mn_{0.37}O_2$, or $Li_{1.07}Ni_{0.42}Co_{0.09}Mn_{0.42}O_2$ for the positive active material; graphite with a surface coated with amorphous carbon for the negative active material; and for the electrolyte solution, $LiPF_6$ as a solute dissolved to 1 M in a solvent of EC, MEC, and DMC mixed, with 1% VC in ratio by weight added to the solution, and further lithium-bisoxalate borate (LiBOB) dissolved to 0.1 M in the solution, and mentions that "The prepared nonaqueous electrolyte secondary battery was subjected to constant current charge at 1000 mA up to 4.2 V, and then constant voltage charge at 4.2 V up to 50 mA and discharged at 330 mA down to 2.4 V, and the capacity in this case was defined as a battery discharge capacity." (paragraph

[0045]), and that thereafter, the IV characteristics were measured in a SOC 50% charged state.

Patent Document 6 discloses, as Example 22, a lithium secondary battery including: "80% by mass of lithium manganese oxide ($Li_{1.1}Mn_{1.9}Al_{0.1}O_4$,LMO) and 20% by mass of $Li_{1.15}Ni_{0.45}Mn_{0.45}Co_{0.10}O_2$ (Co-less LNMC)" for a positive active material (paragraph [0401]); "an artificial graphite powder" for a negative active material (paragraph [0343]); and a nonaqueous electrolyte obtained by "mixing ethylene carbonate (EC), dimethyl carbonate (DMC), and ethyl methyl carbonate (EMC) (volume ratio of 30:30:40), and then dissolving 0.1 mol/L of sufficiently dried $LiFSO_3$, 0.1 mol/L of lithium bisoxalate borate ($LiB(C_2O_4)_2$, LiBOB), and $LiPF_6$ to a proportion of 1 mol/L" (paragraph [0408]).

Further, the document mentions that, for the evaluation of the initial discharge capacity for the lithium secondary battery according to Example 22, "The lithium secondary battery, sandwiched between the glass plates to enhance the adhesion between the electrodes, was, at 25° C., charged with electricity up to 4.2 V at a constant current corresponding to 0.1C, and then discharged down to 3.0 V at a constant current of 0.1C. In the second cycle and the third cycle, the battery was charged with electricity up to 4.2 V at 0.33C, then charged with electricity at a constant voltage of 4.2 V until the current value reached 0.05C, and discharged down to 3.0 V at a constant current of 0.33C, and the initial discharge capacity was determined from the discharge process in the third cycle." (paragraph [0404]), and mentions that for the evaluation of the high-temperature storage characteristics for the same battery, the residual capacity after storage at 75° C., the recovery capacity after the storage at 75° C., and the storage capacity retention ratio were evaluated by constant current charge up to 4.2 V and constant voltage charge at 4.2 V.

On the other hand, in the case of using a battery including a "lithium-excessive" active material as described in Patent Documents 1 to 4 after undergoing an initial charge process at 4.5 V (vs. Li/Li$^+$) or higher, the battery is known to be low in first coulombic efficiency and inferior in high rate discharge performance, as compared with a battery including a "LiMeO$_2$-type" active material.

Thus, acid treatments for positive active materials are known as techniques for improving the first coulombic efficiency and high rate discharge performance of batteries including the "lithium-excessive" active material. (Patent Documents 7 to 10)

Patent Document 7 discloses "A method for producing a positive active material for a nonaqueous electrolyte secondary battery, the positive active material comprising a lithium-excessive metal composite oxide represented by general formula: $Li_{1+u}Ni_xCo_yMn_zA_tO_{2+\alpha}$ ($0.1 \leq u < 0.3$, $0.03 \leq x \leq 0.25$, $0.03 \leq y \leq 0.25$, $0.4 \leq z < 0.6$, $x+y+z+u+t=1$, $0 \leq \alpha < 0.3$, $0 \leq t < 0.1$, where A is at least one of metal elements with any of the valences from divalence to hexavalence), comprising secondary particles that have primary particles aggregated, the method characterized by comprising: a mixing step of obtaining a lithium mixture by mixing a lithium compound with secondary particles of aggregated primary particles comprising at least one of a hydroxide, an oxyhydroxide, an oxide, and a carbonate containing nickel, cobalt, and manganese; a firing step of obtaining a fired product by firing the lithium mixture at a temperature of 800 to 1050° C. in an oxidizing atmosphere; an acid cleaning step of cleaning the fired product with an acid under control such that a lithium content difference of the fired product between before and after the acid cleaning, divided by the lithium content of the fired product before the acid cleaning, has a lithium removal rate of 10 to 30% and such that the acid-cleaned slurry at completion of the acid cleaning has pH of 1 to 4 at a standard of 25° C., followed by water washing; and a heat treatment step of performing a heat treatment on the fired product after the acid cleaning step at a temperature of 200 to 600° C. in an oxidizing atmosphere." (Claim 5).

Further, the document mentions that "The acid for use in this acid cleaning is preferably an acid that shows strong acidity with a high dissociation constant, more preferably any of inorganic acids such as a hydrochloric acid, a nitric acid, and a sulfuric acid, and further preferably any of a hydrochloric acid or a sulfuric acid." (paragraph [0073]), and that "Thus, in the case of using no strong acid, it is difficult to extract lithium from the crystal structure, and it is not possible to cause dissolution for forming fine irregularities at the surfaces of the primary particles, and thus, the interfacial resistance may fail to be reduced." (paragraph [0074]), and mentions that for the evaluation of the positive active material, a coin-type battery with a Li metal for the negative electrode was prepared, charged with electricity at 4.8 V and discharged at 2.5 V with 0.05C for initial charge-discharge to define the ratio of the discharge capacity to the charge capacity as an initial charge-discharge efficiency, and that in the voltage range 2.0 to 4.55 V, the ratio (%) of the discharge capacity in the case of charge-discharge at 0.1C for charge and 2C for discharge as the numerator to the discharge capacity in the case of charge-discharge at 0.1C as the denominator was defined as a load efficiency (paragraphs [0096] to [0101] and [0103]).

Patent Document 8 discloses "A positive active material for a lithium secondary battery, the positive active material comprising a lithium-transition metal composite oxide that has an $\alpha$-NaFeO$_2$ structure, characterized in that the lithium-transition metal composite oxide comprises the transition metal (Me) containing Co, Ni, and Mn, Mn in the transition metal has a molar ratio Mn/Me of Mn/Me$\geq$0.5, a diffraction peak at $2\theta=44\pm1°$ in an X-ray diffraction pattern obtained with a CuK$\alpha$ line source has a half width of 0.265° or more, and the lithium-transition metal composite oxide contains a P element." (Claim 1), and "The positive active material for a lithium secondary battery according to claim 1 or 2, characterized in that the lithium-transition metal composite oxide contains P obtained by a heat treatment after a phosphoric acid treatment." (Claim 3).

Further, the document mentions that a lithium secondary battery was prepared with the use of the active material according to each example, subjected to the heat treatment after the above-mentioned phosphoric acid treatment, and subjected to two cycles of constant-current constant voltage charge at a current of 0.1C and a voltage 4.6 V and constant current discharge at a current of 0.05C with a cutoff voltage of 2.0 V. and then 30 cycles of charge-discharge test of constant current constant voltage charge at a current of 0.2C and a voltage 4.3 V and constant current discharge at a current 0.5C with a cutoff voltage of 2.0 V, and the discharge capacity in the 30-th cycle was recorded as a 0.5C discharge capacity in the 30-th cycle (paragraphs [0075] to [0085] and [0123] to [0130]).

Patent Document 9 discloses, "A positive active material for a lithium secondary battery, the positive active material containing a lithium-transition metal composite oxide, wherein the lithium-transition metal composite oxide has an $\alpha$-NaFeO$_2$ structure, with the transition metal (Me) containing Co, Ni, and Mn, a molar ratio Li/Me of lithium (Li) to the transition metal being higher than 1.2 and lower than 1.6, has a pore volume of 0.055 cc/g or more and 0.08 cc/g or less in a pore region within a pore diameter range of up to 60 nm that shows a maximum value of a differential pore volume obtained by a BJH method from an adsorption isotherm obtained by using a nitrogen gas adsorption method, and shows a single phase that belongs to the space group R3-m at 1000° C." (Claim 1), "A method for producing the positive active material for a lithium secondary battery according to any of 1 to 6, wherein the lithium-transition metal composite oxide is prepared through a precursor preparation step of preparing a precursor containing Co, Ni, and Mn as transition metal elements, a firing step of preparing an oxide by mixing the precursor with a Li salt and heat-treating the mixture at a temperature of 800° C. or higher, and an acid treatment step of acid-treating the oxide." (Claim 9), and "The method for producing the positive active material for a lithium secondary battery according to any of claims 9 to 12, wherein the acid treatment step uses a sulfuric acid." (Claim 13).

Further, the document mentions that, as an example the foregoing, a lithium secondary battery was prepared with the use of, for the positive electrode, an active material obtained by treating the lithium-transition metal composite oxide with a sulfuric acid and drying the treated oxide, and metallic lithium for the negative electrode, and subjected to, as initial charge-discharge step, two cycles of constant current constant voltage charge at a current of 0.1C and a voltage of 4.6 V and constant current discharge at a current of 0.1C with a cutoff voltage of 2.0 V, and then to constant current constant voltage at a current of 0.1C and a voltage of 4.3 V and constant current discharge at a current of 1C with a cutoff voltage of 2.0 V, and this discharge capacity was recorded as a 1C capacity (paragraphs [0076] to [0087] and [0108] to [0115]).

Patent Document 10 discloses "A positive active material for a lithium secondary battery, comprising a lithium-transition metal composite oxide that has an α-NaFeO$_2$ structure, characterized in that the lithium-transition metal composite oxide has a transition metal (Me) containing Co, Ni, and Mn, with a molar ratio (Li/Me) of Li to the transition metal (Me) being 1<Li/Me and a molar ratio (Mn/Me) of Mn to the transition metal (Me) being 0.5<Mn/Me, and contains Ce." (Claim 1), and as Examples 1 to 5, the preparation of lithium-transition metal composite oxides containing Ce by adding "a lithium-transition metal composite oxide Li$_{1.18}$Co$_{0.10}$Ni$_{0.17}$Mn$_{0.55}$O$_2$ as a starting material" into a cerium sulfate solution with pH 1.6 and heat-treating the solution at 400° C. (paragraphs [0079] to [0082]). Further, Table 1 shows the results of evaluating batteries prepared with these lithium-transition metal composite oxides as a positive active material and metallic lithium as a negative electrode, and subjected to an initial charge-discharge step with 0.1C at 4.6 V-2.0 V, for the value (%) of the discharge capacity divided by the amount of charge as an initial efficiency, and subjected to 30 cycles of constant current constant voltage charge at 0.2C and 4.45 V and constant current discharge at 0.5C and 2.0 V for the ratio (%) of the discharge capacity in the 30-th cycle to the discharge capacity in the 1st cycle as a discharge capacity retention ratio (paragraphs [0090] to [0097]).

Patent Document 11 discloses "A method for producing a composite positive active material comprising a step of acid-treating a perlithiated metal oxide, and a step of doping the acid-treated perlithiated metal oxide with a metal cation, wherein the perlithiated metal oxide includes a compound represented by the following chemical formula 4:

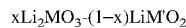  [Chemical Formula 4]

In the formula, M is at least one metal selected from fourth-period and fifth-period transition metals with an average oxidation number of +4, and M' is at least one metal selected from fourth-period and fifth-period transition metals with an average oxidation number of +3, with 0<x<1." (Claim 13).

Then, the document mentions that: as an example, a substance with a composition of 0.55Li$_2$MnO$_3$-0.45LiNi$_{0.5}$Co$_{0.2}$Mn$_{0.3}$O$_2$ was added to an aqueous solution of HNO$_3$, and then subjected to an acid treatment for drying at 80° C., and the acid-treated substance was added into 500 mL of an aqueous solution of a nitrate of Al or the like, and subjected to a heat treatment at 300° C. for 5 hours to obtain an active material doped with metal cations (paragraphs [0137] to [0147]); in the case of the LiNi$_{0.5}$Co$_{0.2}$Mn$_{0.3}$O$_2$ active material, the charge-discharge curve undergoes no change under the acid treatment condition, without any Li ion extracted by the reaction with the acid solution, whereas in the case of Li$_2$MnO$_3$, the discharge curve undergoes a substantial change due to the replacement of H$^+$ in the acid solution with Li$^+$ ions during the acid treatment (paragraph [0159]); and with a lithium metal as the negative electrode, the initial efficiency was evaluated by initial charge-discharge of constant current charge-discharge at 0.1C and 4.7-2.5 V, and the rate characteristics were evaluated by constant voltage constant current charge at 0.5C and 4.6 V and constant current discharge at each discharge current of 0.2, 0.33, 1, 2, and 3C and 2.5 V (paragraphs [0165] to [0166]).

In addition, the oxygen sites of the "lithium-excessive" active material are substituted with F, thereby making improvements in initial coulombic efficiency, rate characteristics, cycle life characteristics, and the like in the case of performing an initial charge process in excess of 4.5 V (vs. Li/Li$^+$) (see Patent Documents 12 to 15).

Patent Document 12 discloses "A positive active material for a nonaqueous electrolyte secondary battery, represented by a general formula Li(Li$_a$Mn$_b$Ni$_c$Co$_d$Fe$_e$)O$_{2-x}$F$_x$, wherein a, b, c, d, e, and x in the general formula have values of 0<a≤0.33, 0<b≤0.67, 0≤c<1, 0≤d<1, 0≤e<1, 0.1<x≤1−b, and satisfy the following formula (1).

[Formula 1]

$$3 \le \frac{3-x-a-2c-3d-3e}{b} < 4 \quad (1)$$

" (Claim 1).

Further, the document discloses "Li$_{1.2}$Ni$_{0.2}$Mn$_{0.6}$O$_{1.9}$F$_{0.1}$", "Li$_{1.2}$Ni$_{0.2}$Mn$_{0.6}$O$_{1.8}$F$_{0.2}$", "Li$_{1.2}$Ni$_{0.2}$Mn$_{0.6}$O$_{1.7}$F$_{0.3}$", "Li$_{1.2}$Ni$_{0.2}$Mn$_{0.6}$O$_{1.6}$F$_{0.4}$", "Li$_{1.2}$Ni$_{0.4}$Mn$_{0.4}$O$_{1.8}$F$_{0.2}$" as examples of the active material containing Mn and Ni, and "Li$_{1.2}$Ni$_{0.2}$Mn$_{0.6}$O$_2$", "Li$_{1.2}$Ni$_{0.2}$Mn$_{0.6}$O$_{1.95}$F$_{0.05}$", and "Li$_{1.2}$Ni$_{0.25}$Mn$_{0.55}$O$_{1.9}$F$_{0.1}$" as comparative examples, and mentions that the initial coulombic efficiency was determined from the initial charge capacity obtained by charge with electricity up to 4.6 V and the initial discharge capacity obtained by discharge from the charge state to 2.0 V (paragraphs [0072] to [0078]).

Patent Document 13 discloses "A positive active material comprising a lithium excessive lithium-metal excess compound containing Li$_2$MnO$_3$ that has a layered structure, the positive active material doped with a fluoro compound, and having an FWHM (half width) value in a range of 0.164° to 0.185°." (Claim 1).

Further, the document mentions that, as an example, a mixture of: 0.82 mol of a transition-metal hydroxide precursor with a molar ratio Ni:Co:Mn of 2:2:6; and 1.18 mol of $Li_2CO_3$ and LiF in total (LiF: 0.02 to 0.06 mol) was fired to obtain a positive active material, and that for the evaluation of battery characteristics, the high rate characteristics and the life characteristics were evaluated by charge-discharge from 2.5 V to 4.6 V (paragraph [0054] to [0064] and [0073]).

Patent Document 14 discloses "A method for producing a positive active material for a lithium ion secondary battery, characterized in that a lithium-containing composite oxide containing a Li element and at least one transition metal element selected from Ni, Co, and Mn (provided that the molar amount of the Li element is more than 1.2 times larger than the total molar amount of the transition metal element) is brought into with a fluorine gas." (Claim 1).

Further, the document mentions that, as an example, the lithium-containing composite oxide with a composition of "$Li(Li_{0.2}Ni_{0.137}Co_{0.125}Mn_{0.538})O_2$" was treated with fluorine to obtain a positive active material (paragraphs [0082] to [0092]), and that for the battery evaluation, the initial capacity was evaluated by charge-discharge from 4.8 V to 2.5 V, and the cycle performance was evaluated by charge-discharge cycle from 4.5 to 2.5 V (paragraphs [0101] and [0102]).

Patent Document 15 discloses "an electroactive composition comprising a crystalline material approximately represented by a compositional formula $Li_{1+x}Ni_\alpha Mn_\beta Co_\gamma A_\delta O_{2-z}F_z$, where x is about 0.02 to about 0.19, α is about 0.1 to about 0.4, ß is about 0.35 to about 0.869, γ is about 0.01 to about 0.2, δ is about 0.0 to about 0.1, z is about 0.01 to about 0.2, and A is Mg, Zn, Al, Ga, B, Zr, Ti, Ca, Ce, Y, Nb, or a combination thereof." (Claim 1).

Further, the document mentions that: as Example 1, a metal carbonate powder containing Ni, Co, and Mn and appropriate amounts of $Li_2CO_3$ and LiF powders were mixed and subjected to firing in two steps to obtain a lithium composite oxide with a composition of $Li_{1.2}Ni_{0.175}Co_{0.10}Mn_{0.525}O_{2-F}F_F$ (F=0.05, 0.01, 0.02, 0.05, 0.1, or 0.2) (paragraphs [0064] to [0069]); as Example 2, an oxide was produced without using LiF, and this oxide was mixed with $NH_4HF_2$ and heated to obtain a lithium composite oxide of $Li_{1.2}Ni_{0.175}Co_{0.10}Mn_{0.525}O_{2-F}F_F$, $Li_{1.167}Ni_{0.219}Co_{0.125}Mn_{0.490}O_{2-F}F_F$, $Li_{1.130}Ni_{0.266}Co_{0.152}Mn_{0.451}O_{2-F}F_F$, or $Li_{1.090}Ni_{0.318}Co_{0.182}Mn_{0.409}O_{2-F}F_F$ (paragraphs [0070] and [0071]); and coin cells were produced with these lithium composite oxides as a positive active material, and subjected to a charge-discharge cycle between 2.0 and 4.6 V to obtain specific discharge capacity data (paragraphs [0072] to [0078]).

In addition, there is also a prior art in which the crystal structure of the positive active material is specified by measuring a Raman spectrum.

Patent Document 16 discloses, as Example 1 of "A battery cell characterized by comprising: an anode comprising an anode current collector and an anode active material disposed on the anode current collector; and a cathode comprising a cathode current collector and a cathode active material disposed on the cathode current collector, the cathode active material having a composition represented by $xLi_2MO_3 \cdot (1-x)LiCo_yM'_{(1-y)}O_2$." (Claim 1), and FIG. 5 shows a Raman spectrum of the cathode active material of "a composition represented by $0.02Li_2MnO_3 \cdot 0.98LiNi_{0.021}Co_{0.979}O_2$" (paragraphs [0026] to [0029]). The document discloses, as other examples, compositions represented by "$0.04Li_2MnO_3 \cdot 0.96LiCoO_2$" and "$0.01Li_2MnO_3 \cdot 0.99LiNi_{0.01}Mn_{0.01}Co_{0.98}O_2$" are described (paragraphs [0030] and [0036]).

Patent Document 17, "A lithium-based positive active material of the following chemical formula 1, wherein in a Raman spectrum analysis, a ratio of a peak intensity of an $A_{1g}$ vibration mode of a spinel structure to a peak intensity of an $A_{1g}$ vibration mode of a hexagonal structure is 1:0.1 to 1:0.4, a ratio of the peak intensity of the $A_{1g}$ vibration mode of the hexagonal structure to a peak intensity of an $E_g$ vibration mode thereof is 1:0.9 to 1:3.5, and a ratio of the peak intensity of the $A_{1g}$ vibration mode of the spinel structure to a peak intensity of an $F_{2g}$ vibration mode thereof is 1:0.2 to 1:0.4:

$$Li_xCo_yM_{1-y}A_2 \qquad \text{[Chemical Formula 1]}$$

In the formula, $0.95 \leq x \leq 1.0$, $0 \leq y \leq 1$, M is at least one or more elements selected from the group consisting of Ni, Fe, Pb, Mg, Al, K, Na, Ca, Si, Ti, Sn, V, Ge, Ga, B, As, Zr, Mn, and Cr, and A is an element selected from the group consisting of O, F, S, and P." (Claim 1), and the document mentions that the lithium-based positive active material provides, in a Raman spectroscopic analysis, a spectrum that shows only peaks derived from the two vibration modes ($A_{1g}$ mode at 593 $cm^{-1}$ and $E_g$ mode at 484 $cm^{-1}$) because the lithium-based positive active material has only the hexagonal crystal structure before battery manufacture, whereas the lithium-based positive active material has, after the battery preparation, the spinel structure in addition to the hexagonal system (paragraphs [0017] and [0018] and FIGS. 1 and 2).

Non-Patent Document 1 mentions that: NCMs with an increased Li ratio ($LiNi_{1/3}Co_{1/3}Mn_{1/3}O_2$, $Li_{1.1}Ni_{1/3}Co_{1/3}Mn_{1/3}O_2$, and high-energy $xLi_2MnO_3 \cdot (1-x)LiMO_2$ (M=Ni, Co, Mn; x=0.5)) have, in the Raman spectrum, a peak $A_{1g}$ around 600 $cm^{-1}$ corresponding to the $MeO_6$ vibration mode and a peak $E_g$ around 500 $cm^{-1}$ corresponding to the O-Me-O vibration mode; $Li_2MnO_3$ has peaks such as 612 $cm^{-1}$ ($A_{g1}$) and 493 $cm^{-1}$; and $xLi_2MnO_3 \cdot (1-x)LiMO_2$ (x=0.5) has peaks that are not provided by $LiNi_{1/3}Co_{1/3}Mn_{1/3}O_2$ but are provided by $Li_2MnO_3$, in particular, with the peak at 496 $cm^{-1}$ and the shoulder at 569 $cm^{-1}$ being prominent. Further, the document mentions that the NCMs maintain a layered $LiMO_2$-like structure even after charge-discharge, in that the NCMs have typical peaks corresponding to $E_g$ and $A_{g1}$ before and after the charge-discharge (lines 2 to 5 of right column on page 206, left column on page 208 to right column on page 209 "3.2. Ex situ Raman investigation" full text).

PRIOR ART DOCUMENTS

Patent Documents

Patent Document 1: Japanese Patent No. 4877660
Patent Document 2: JP-A-2012-104335
Patent Document 3: JP-A-2013-191390
Patent Document 4: JP-A-2016-100054
Patent Document 5: JP-A-2010-050079
Patent Document 6: JP-A-2011-187440
Patent Document 7: JP-A-2015-122235
Patent Document 8: JP-A-2016-15298
Patent Document 9: International Publication 2015/083330
Patent Document 10: JP-A-2016-126935
Patent Document 11: JP-A-2014-170739
Patent Document 12: JP-A-2012-89470
Patent Document 13: JP-A-2014-107269

Patent Document 14: JP-A-2014-75177
Patent Document 15: JP-A-2012-504316
Patent Document 16: JP-A-2016-517615
Patent Document 17: JP-A-2005-44785

Non-Patent Document

Non-Patent Document 1: P. Lanz, et al. Electrochimica Acta, 130, 206-212 (2014).

DISCLOSURE OF THE INVENTION

Problems to be Solved by the Invention

The standards (for example, "GB/T (China Recommended National Standards)" for automobile batteries) provide that the safety of nonaqueous electrolyte secondary batteries should be ensured even if the batteries are accidentally further charged with electricity beyond the full charge state (SOC 100%) (hereinafter referred to as "overcharge"). Examples of a method for evaluating the improvement in safety include a method of, with the assumption that a charge control circuit is broken, recording an SOC at which a sudden rise in battery voltage is observed in the case where a current is forced to be further applied beyond the full charge state. In the case where no sudden increase in battery voltage is observed until reaching a higher SOC, improved safety is recognized.

In this regard, the SOC, which is an abbreviation for State Of Charge, represents the charge state of a battery by the ratio of the residual capacity therein to the capacity in the case of full charge, and the full charge state is expressed as "SOC 100%".

Patent Documents 1 to 4 disclose nonaqueous electrolyte secondary batteries on the assumption that the batteries are manufactured with the use of lithium-excessive active materials for the positive electrodes through an initial charge-discharge step until the positive electrode potentials reach 4.5 V (vs. Li/Li$^+$) or higher (hereinafter, also referred to as "overcharge formation"), and fail to show that a sudden increase in battery voltage is delayed until reaching a higher SOC in the case where the nonaqueous electrolyte secondary batteries are overcharged with electricity.

On the other hand, Patent Documents 5 and 6 disclose nonaqueous electrolyte secondary batteries with the use of lithium-excessive active materials with Li/Me of 1 or more for positive electrodes, which is subjected to an initial charge-discharge step at a voltage of 4.2 V (the positive electrode potential is considered about 4.3 V (vs. Li/Li$^+$)). The lithium-excessive active materials according to examples described in Patent Documents 5 and 6, however, each have a small Li/Me of 1.15 or less. It is to be noted that Patent Document 1 mentions that in the case of the lithium-excessive active material that exists in the region of x>⅓ (Li/Me>1.25), "the active material has a diffraction peak observed around 2θ=20 to 30° in an X-ray diffraction pattern obtained with a CuKα line, as in Li[Li$_{1/3}$Mn$_{2/3}$]O$_2$-type monoclinic crystals", and thus, in the case of the lithium-excessive active materials with much lower Li/Me, described in Patent Documents 5 and 6, it is highly probable that no diffraction peak will be observed in the range of 2θ=20° or more and 22° or less even if the maximum attainable potentials of the positive electrodes in the initial charge-discharge step are lower than 4.5 V (vs. Li/Li$^+$). Moreover, Patent Documents 5 and 6 also fail to show that a sudden increase in battery voltage is delayed until reaching a higher SOC in the case where the nonaqueous electrolyte secondary batteries are overcharged with electricity.

Furthermore, as described in Patent Documents 7 to 11, in a nonaqueous electrolyte secondary battery on the assumption that the battery is used with the use of a "lithium-excessive" active material for the positive electrode through initial charge-discharge (the "overcharge formation" mentioned above) at positive electrode potential of 4.5 V (Li/Li$^+$) or higher, the acid treatment of the "lithium-excessive" active material with a hydrochloric acid, a phosphoric acid, a sulfuric acid, a nitric acid, or the like is known to improve the initial coulombic efficiency and the high rate discharge performance, but the effect in the case of treatment with a strong acid is merely shown, and the effect is unknown without overcharge formation.

Moreover, nonaqueous electrolyte secondary batteries with positive electrodes including therein the lithium-excessive active materials described in Patent Documents 12 to 15 are also intended for overcharge formation, and the documents fail to show that a sudden increase in battery voltage is delayed until reaching a higher SOC in the case where the nonaqueous electrolyte secondary batteries are overcharged with electricity.

The active material described in Patent Document 16 is not any original lithium-excessive active material because the Mn content is low, and the active material described in Patent Document 17 is not any lithium-excessive active material, and thus irrelevant about the problem of the nonaqueous electrolyte secondary battery with the positive electrode including therein the lithium-excessive active material.

An object of the present invention is to provide a nonaqueous electrolyte secondary battery in which a sudden increase in battery voltage is not observed up to reaching a higher SOC.

Means for Solving the Problems

One aspect of the present invention is a nonaqueous electrolyte secondary battery including a positive electrode, a negative electrode, and a nonaqueous electrolyte, in which the positive electrode includes, as an active material, a lithium-transition metal composite oxide that has an α-NaFeO$_2$-type crystal structure, and is represented by the general formula Li$_{1+\alpha}$Me$_{1-\alpha}$O$_2$ (0<α, Me is a transition metal element containing Ni and Mn, or containing Ni, Mn, and Co), and the active material has a diffraction peak observed in the range of 20° or more and 22° or less in an X-ray diffraction pattern obtained with a CuKα line.

Another aspect of the present invention is a nonaqueous electrolyte secondary battery including a positive electrode, a negative electrode, and a nonaqueous electrolyte, in which the positive electrode includes, as an active material, a lithium-transition metal composite oxide that has an α-NaFeO$_2$-type crystal structure, and is represented by the general formula Li$_{1+\alpha}$Me$_{1-\alpha}$O$_2$ (0<α, Me is a transition metal element containing Ni and Mn, or containing Ni, Mn, and Co), and with the positive electrode in charge with electricity up to a positive electrode potential of 5.0 V (vs. Li/Li$^+$), a region where the potential change is relatively flat with respect to the amount of charge is observed within the positive electrode potential range of 4.5 V (vs. Li/Li$^+$) or higher and 5.0 V (vs. Li/Li$^+$) or lower.

Yet another aspect of the present invention is a method for producing a nonaqueous electrolyte secondary battery according to one aspect or another aspect of the present invention, in which the positive electrode in an initial charge-discharge step has a lower maximum attainable potential than 4.5 V (vs. Li/Li$^+$).

In other words, in one aspect or another aspect of the present invention, the "nonaqueous electrolyte secondary battery" refers to a battery subjected to the above-mentioned initial charge-discharge step and finished to be ready for shipment in a factory. In the factory, charge-discharge may be performed more than once, if necessary.

Yet another aspect of the present invention is a method of using the nonaqueous electrolyte secondary battery according to one aspect or another aspect of the present invention, for use at a battery voltage at which the positive electrode has a lower maximum attainable potential than 4.5 V (vs. Li/Li$^+$) in a full charge state (SOC 100%).

Advantages of the Invention

According to one aspect of the present invention, it is possible to provide a nonaqueous electrolyte secondary battery in which a sudden increase in battery voltage is not observed until reaching a higher SOC, a method for producing the battery, and a method of using the battery.

MODE FOR CARRYING OUT THE INVENTION

Figure 1:
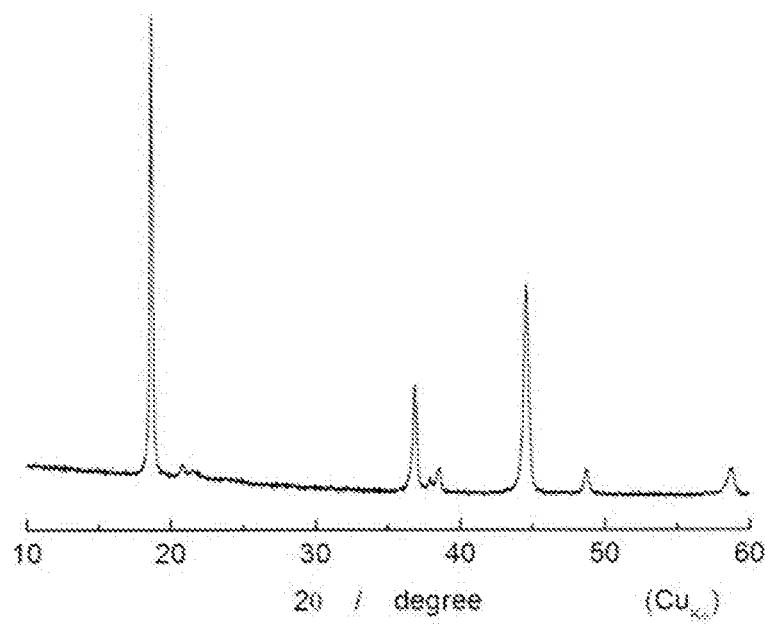
FIG. 1 is a diagram for describing the fact that "a diffraction peak is observed in a range of 20° or more and 22° or less" in X-ray diffraction measurement for a lithium-excess positive active material for use in a nonaqueous electrolyte secondary battery.

The configuration and function effects of the present invention will be described together with technical ideas. However, the function mechanism includes assumptions, and whether the assumptions are right or wrong is not intended to limit the present invention. It is to be noted that the present invention can be implemented in various other forms without departing from the spirit or main features of the invention. For that reason, the embodiments or examples described below, by way of example only in all respects, should not be construed in a limited sense. Furthermore, modifications and changes that belong to the equivalent scope of the claims all fall within the scope of the present invention.

A first embodiment of the present invention is a nonaqueous electrolyte secondary battery including a positive electrode, a negative electrode, and a nonaqueous electrolyte, in which the positive electrode includes, as an active material, a lithium-transition metal composite oxide that has an α-NaFeO$_2$-type crystal structure, and is represented by the general formula Li$_{1+\alpha}$Me$_{1-\alpha}$O$_2$ (0<α, Me is a transition metal element containing Ni and Mn, or containing Ni, Mn, and Co), and the active material has a diffraction peak observed in the range of 20° or more and 22° or less in an X-ray diffraction pattern obtained with a CuKα line.

Another first embodiment of the present invention is a nonaqueous electrolyte secondary battery including a positive electrode, a negative electrode, and a nonaqueous electrolyte, in which the positive electrode includes, as an active material, a lithium-transition metal composite oxide that has an α-NaFeO$_2$-type crystal structure, and is represented by the general formula Li$_{1+\alpha}$Me$_{1-\alpha}$O$_2$ (0<α, Me is a transition metal element containing Ni and Mn, or containing Ni, Mn, and Co), and with the positive electrode in charge with electricity up to a positive electrode potential of 5.0 V (vs. Li/Li$^+$), a region where the potential change is relatively flat with respect to the amount of charge (in a third embodiment described later, referred to as an "overcharge region") is observed within the positive electrode potential range of 4.5 V (vs. Li/Li$^+$) or higher and 5.0 V (vs. Li/Li$^+$) or lower.

In the nonaqueous electrolyte secondary battery, a lithium-transition metal composite oxide in which the molar ratio of Mn to the transition metal (Me) meets 0.4≤Mn/Me may be used as the active material of the positive electrode. According to this aspect, the layered structure of the active material can be stabilized.

In the nonaqueous electrolyte secondary battery, a lithium-transition metal composite oxide in which the molar ratio of Li to the transition metal (Me) meets 1.15<Li/Me may be used as the active material of the positive electrode.

According to this aspect, a nonaqueous electrolyte secondary battery can be provided in which a sudden increase in battery voltage is not observed until reaching a higher SOC.

In the nonaqueous electrolyte secondary battery, a lithium-transition metal composite oxide in which the molar ratio of Li to the transition metal (Me) meets Li/Me≤1.35 may be used as the active material of the positive electrode. According to this aspect, the discharge capacity can be improved.

In the nonaqueous electrolyte secondary battery, the content of the lithium-transition metal composite oxide included as an active material in the positive electrode is preferably more than 80% by mass, based on the total active material of the positive electrode. According to this aspect, a nonaqueous electrolyte secondary battery can be provided in which a sudden increase in battery voltage is not observed until reaching a much higher SOC. The content of the lithium-transition metal composite oxide is more preferably 90% by mass or more, and may be substantially 100% by mass, based on the total active material of the positive electrode. The presence of other small amounts of active materials is, however, not to be considered excluded, unless the effects of the present invention are impaired.

The nonaqueous electrolyte secondary battery is preferably used at a battery voltage at which the maximum attainable potential of the positive electrode in the full charge state (SOC 100%) is lower than 4.5 V (vs. Li/Li$^+$).

According to the foregoing embodiments, a nonaqueous electrolyte secondary battery can be provided in which a sudden increase in battery voltage is not observed until reaching a higher SOC.

In the nonaqueous electrolyte secondary battery, as the nonaqueous electrolyte, a nonaqueous electrolyte containing a fluorinated cyclic carbonate in a nonaqueous solvent may be used. This composition produces, in addition to the effect of being capable of providing a nonaqueous electrolyte secondary battery in which a sudden increase in battery voltage is not observed until reaching a higher SOC, the effect of suppressing the increase in AC resistance after storage.

The nonaqueous electrolyte may include a compound having an oxalate group bonded to boron.

According to this aspect, the effect of being capable of reducing the initial AC resistance is produced in addition to the effect of being capable of providing a nonaqueous electrolyte secondary battery in which a sudden increase in battery voltage is not observed until reaching a higher SOC.

A second embodiment of the present invention is a positive active material for a nonaqueous electrolyte secondary battery, containing a lithium-transition metal composite oxide, in which the lithium-transition metal composite oxide has an α-NaFeO$_2$-type crystal structure, and is represented by the general formula Li$_{1+\alpha}$Me$_{1-\alpha}$O$_2$ (0<α, Me is a transition metal element containing Ni and Mn, or containing Ni, Mn, and Co, the molar ratio Mn/Me of Mn to Me meets Mn/Me≥0.45), and the positive active material has a ratio a/b of 17≤a/b≤25 between a discharge capacity (a) from 4.35 V (vs. Li/Li$^+$) to 3.0 V (vs. Li/Li$^+$) and a discharge capacity (b) from 3.0 V (vs. Li/Li$^+$) to 2.0 V (vs. Li/Li$^+$).

Another second embodiment of the present invention is a method for producing the positive active material for a nonaqueous electrolyte secondary battery according to the second embodiment mentioned above, in which a lithium-transition metal composite oxide that has an α-NaFeO$_2$-type crystal structure, and is represented by the general formula Li$_{1+\alpha}$Me$_{1-\alpha}$O$_2$ (0<α, Me is a transition metal element containing Ni and Mn, or containing Ni, Mn, and Co, the molar ratio Mn/Me of Mn to Me meets Mn/Me≥0.45), is treated with an acid with pKa$_1$ of 3.1 or more to produce a positive active material that has a ratio a/b of 17≤a/b≤25 between a discharge capacity (a) from 4.35 V (vs. Li/Li$^+$) to 3.0 V (vs. Li/Li$^+$) and a discharge capacity (b) from 3.0 V (vs. Li/Li$^+$) to 2.0 V (vs. Li/Li$^+$).

A third embodiment of the present invention is a positive active material for a nonaqueous electrolyte secondary battery, containing a lithium-transition metal composite oxide, in which the lithium-transition metal composite oxide has an α-NaFeO$_2$-type crystal structure, and is represented by the general formula Li$_{1+\alpha}$Me$_{1-\alpha}$O$_2$ (0<α, Me is a transition metal element containing Ni and Mn, or containing Ni, Mn, and Co, the molar ratio Mn/Me of Mn to Me meets 0.3≤Mn/Me<0.55), and the ratio ($I_{490}/I_{600}$) of the maximum value $I_{490}$ in the range of 450 cm$^{-1}$ or more and 520 cm$^{-1}$ or less to the maximum value $I_{600}$ in the range of 550 cm$^{-1}$ or more and 650 cm$^{-1}$ or less is 0.45 or more in a Raman spectrum.

According to the third embodiment of the present invention, a positive active material is provided, which has a large amount of charge per volume in the overcharge region and has a large discharge capacity per volume.

Another third embodiment of the present invention is a method for producing the positive active material for a nonaqueous electrolyte secondary battery according to the third embodiment mentioned above, in which a sintering aid is added in a case where a transition metal compound containing Ni and Mn, or containing Ni, Co, and Mn, with a molar ratio Mn/Me of Mn to Me meeting 0.3≤Mn/Me<0.55, is mixed with a Li compound, and fired to produce a lithium-transition metal composite oxide with a molar ratio Li/Me meeting 1<Li/Me.

According to the other third embodiment of the present invention, a method is provided for producing a positive active material, which has, in particular, a large discharge capacity per volume.

Yet another second or third embodiment of the present invention is a positive electrode for a nonaqueous electrolyte secondary battery, containing the positive active material for a nonaqueous electrolyte secondary battery according to the second or third embodiment.

Yet another second or third embodiment of the present invention is a nonaqueous electrolyte secondary battery including the positive electrode for a nonaqueous electrolyte secondary battery according to the yet other second or third embodiment, in which the positive active material contained in the positive electrode has a diffraction peak observed in the range of 20° or more and 22° or less in an X-ray diffraction pattern obtained with a CuKα line.

Yet another second or third embodiment of the present invention is a nonaqueous electrolyte secondary battery including the positive electrode for a nonaqueous electrolyte secondary battery according to the yet other second or third embodiment, in which with the positive electrode in charge with electricity up to a positive electrode potential of 5.0 V (vs. Li/Li$^+$), a region where the potential change is relatively flat with respect to the amount of charge is observed within the positive electrode potential range of 4.5 V (vs. Li/Li$^+$) or higher and 5.0 V (vs. Li/Li$^+$) or lower.

According to this yet other second or third embodiment, a nonaqueous electrolyte secondary battery is provided in which a sudden increase in battery voltage is not observed until reaching a higher SOC, because of the large amount of charge per volume in the overcharge region.

The above-mentioned nonaqueous electrolyte secondary battery is preferably used at a potential of lower than 4.5 V (vs. Li/Li$^+$).

In this yet other second or third embodiment, in the case of use at a potential of lower than 4.5 V (vs. Li/Li$^+$), a balance can be achieved between the large discharge capacity per volume and no sudden increase in battery voltage observed until reaching a higher SOC.

Yet another first, second, or third embodiment of the present invention is a method for manufacturing the above-mentioned nonaqueous electrolyte secondary battery, in which the maximum attainable potential of the positive electrode in an initial charge-discharge step is lower than 4.5 V (vs. Li/Li$^+$).

It is to be noted that the term "initial" charge-discharge in this specification refers to one or more charge or discharge processes performed after nonaqueous electrolyte solution filling, and in particular, the "first-" charge-discharge refers to the first charge and discharge steps performed after nonaqueous electrolyte solution filling.

According to this embodiment, in charge with electricity up to a positive electrode potential of 5.0 V (vs. Li/Li$^+$), a region where the potential change is relatively flat with respect to the amount of charge is observed within the positive electrode potential range of 4.5 V (vs. Li/Li$^+$) or higher and 5.0 V (vs. Li/Li$^+$) or lower, and thus, a nonaqueous electrolyte secondary battery is manufactured in which a sudden increase in battery voltage is not observed until reaching a higher SOC.

Yet another first, second, or third embodiment of the present invention is a method of using the nonaqueous electrolyte secondary battery, at a battery voltage at which the maximum attainable potential of the positive electrode in the full charge state (SOC 100%) is lower than 4.5 V (vs. Li/Li$^+$).

The foregoing first embodiment, other first embodiment, and yet other first embodiment of the present invention (hereinafter, referred to as "first embodiment"), the second embodiment, other second embodiment, and yet other second embodiment of the present invention (hereinafter, referred to as "second embodiment"), and the third embodiment, other third embodiment, and yet other third embodiment of the present invention (hereinafter, referred to as "third embodiment") will be described in detail below. In addition, the first embodiment, the second embodiment, and the third embodiment are collectively referred to as the present embodiments.

According to the first embodiment, a nonaqueous electrolyte secondary battery can be provided in which a sudden increase in battery voltage is not observed until reaching a higher SOC, and a method for manufacturing the battery and a method using the battery can be provided.

According to the second embodiment, a positive active material for a nonaqueous electrolyte secondary battery, which exhibits an excellent first coulombic efficiency and shows high rate discharge performance in the case of use at a potential of lower than 4.5 V (vs. Li/Li$^+$), a method for producing the positive active material, a positive electrode containing the positive active material, a nonaqueous electrolyte secondary battery including the positive electrode, and a method for manufacturing the battery can be provided, and a nonaqueous electrolyte secondary battery in which a sudden increase in battery voltage is not observed until reaching a higher SOC, a method for manufacturing the battery, and a method of using the battery can be provided.

According to the third embodiment, a positive active material for a nonaqueous electrolyte secondary battery, which has a large amount of charge per volume in the overcharge region and has a large discharge capacity per volume, a method for producing the positive active material, a positive electrode containing the positive active material, a nonaqueous electrolyte secondary battery including the positive electrode, and a method for manufacturing the battery can be provided, and a nonaqueous electrolyte secondary battery in which a sudden increase in battery voltage is not observed until reaching a higher SOC, a method for manufacturing the battery, and a method of using the battery can be provided.

<Composition of Lithium-Transition Metal Composite Oxide>

The lithium-transition metal composite oxide included as an active material in the positive electrode included in the nonaqueous electrolyte secondary battery according to the present embodiment is a so-called "lithium-excessive" active material represented by the general formula $Li_{1+\alpha}Me_{1-\alpha}O_2$ ($0<\alpha$, Me is a transition metal element containing Ni and Mn, or containing Ni, Mn, and Co). Typically, the lithium-transition metal complex oxide can be expressed as $Li_{1+\alpha}(Ni_\beta Co_\gamma Mn_\delta)_{1-\alpha}O_2$ ($\beta+\gamma+\delta=1$).

In the first embodiment, in order to provide a positive active material that allows a nonaqueous electrolyte secondary battery in which a sudden increase in battery voltage is not observed until reaching a higher SOC, the molar ratio Li/Me of Li to transition metal element Me, that is, $(1+\alpha)/(1-\alpha)$ is preferably more than 1.15, more preferably 1.2 or more, and further preferably 1.23 or more. In order to improve the discharge capacity, Li/Me is preferably 1.35 or less, and more preferably 1.3 or less.

In the second embodiment, in order to prevent a sudden increase in battery voltage from being observed until reaching a higher SOC in the case of further charge in excess of SOC 100%, Li/Me is preferably 1.05 or more, and more preferably 1.10 or more. In order to suppress the decrease in discharge capacity, Li/Me is preferably 1.4 or less, and more preferably 1.35 or less.

In the third embodiment, Li/Me is preferably 1.05 or more, and more preferably 1.1 or more, from the viewpoint of being capable of further increasing the amount of charge per volume in the overcharge region. Furthermore, Li/Me is preferably less than 1.4, and more preferably 1.3 or less. This range improves the discharge capacity per volume of the positive active material in the case of manufacture and use in a potential range that is lower than the overcharge region.

In the first embodiment, the molar ratio Mn/Me of Mn to the transition metal element Me, that is, $\delta$, is preferably 0.4 or more, and more preferably 0.45 or more, from the viewpoint of stabilizing the layered structure. In addition, from the viewpoint of charge-discharge capacity, Mn/Me is preferably 0.65 or less, and more preferably 0.60 or less.

In the second embodiment, the molar ratio Mn/Me is 0.45 or more from the viewpoint of stabilizing the layered structure. In addition, from the viewpoint of charge-discharge capacity, Mn/Me is preferably 0.65 or less, and more preferably 0.6 or less.

In the third embodiment, the molar ratio Mn/Me is 0.3 or more and less than 0.55. The molar ratio of 0.3 or more can increase the amount of charge per volume in the overcharge region. In addition, the molar ratio of less than 0.55 improves the discharge capacity per volume in the case of manufacture and use in a potential range that is lower than the overcharge region. The above-mentioned molar ratio Mn/Me of Mn is more preferably 0.5 or less, and further preferably 0.45 or less.

In the first and second embodiments, the molar ratio Ni/Me of Ni to the transition metal element Me, that is, ß is preferably 0.2 or more in order to improve the charge-discharge cycle performance of the nonaqueous electrolyte secondary battery. Furthermore, the molar ratio is preferably 0.5 or less, and more preferably 0.4 or less.

In the third embodiment, the molar ratio Ni/Me is preferably 0.2 or more, and more preferably 0.3 or more. Furthermore, the molar ratio is preferably 0.6 or less, and more preferably 0.55 or less. In this range, the polarization in charge-discharge is reduced, thereby increasing the discharge capacity in the case of use at a potential of lower than 4.5 V (vs. Li/Li$^+$).

In the present embodiment, the molar ratio Co/Me of Co to the transition metal element Me, that is, γ, is preferably 0.03 or more, and more preferably 0.2 or more from the viewpoint of enhancing the conductivity of the active material particles. Furthermore, in order to reduce the material cost, the molar ratio is preferably 0.4 or less, more preferably 0.35 or less, and further preferably 0.3 or less, and may be 0.

It is to be noted that the lithium-transition metal composite oxides according to the present embodiments are not intended to exclude containing small amounts of other metals, e.g., alkali metals such as Na and K, alkaline earth metals such as Mg and Ca, and transition metals typified by 3d transition metals such as Fe, without impairing the effects of the present invention.

<Crystal Structure of Lithium-Transition Metal Composite Oxide>

The lithium-transition metal composite oxides according to the present embodiments have an α-NaFeO$_2$-type crystal structure. The lithium-transition metal composite oxides synthesized (before charge-discharge as an active material) belong to the space group P3$_1$12, and have a superlattice peak (a peak found in the Li[Li$_{1/3}$Mn$_{2/3}$]O$_2$-type monoclinic crystal) observed in the range of 2θ=20° or more and 22° or less in an X-ray diffraction pattern obtained with a CuKα line. This superlattice peak (hereinafter, referred to as "diffraction peak in the range of 20° or more and 22° or less") will not disappear even in the case of charge-discharge in the potential region where the positive electrode potential is lower than 4.5 V (vs. Li/Li$^+$) (see FIG. 1). If once charge is performed up to a potential of 4.5 V (vs. Li/Li$^+$) or higher at which the overcharge region is completed, however, the symmetry of the crystal will change with the extraction of Li in the crystal, thereby resulting in disappearance of the diffraction peak in the range of 20° or more and 22° or less, and the lithium-transition metal composite oxides will then belong to the space group R3-m (see FIG. 2). In this regard, P3$_1$12 refers to a crystal structure model obtained by subdividing the atomic locations of 3a, 3b, and 6c sites in R3-m, and the P3$_1$12 model is adopted in the case where ordering is observed in the atomic arrangement in R3-m. It is to be noted that "R3-m" is originally written with a bar "-" on "3" of "R3m".

<Diffraction Peak in X-Ray Diffraction Pattern of Positive Active Material>

The positive active materials for nonaqueous electrolyte secondary batteries according to the present embodiments include the lithium-transition metal composite oxide described above, and have a feature of diffraction peaks observed in the range of 20° or more 22° or less in the X-ray diffraction patterns in the case of X-ray diffraction with the use of a CuKα line.

<Method for Diffraction Peak Confirmation>

In the X-ray diffraction measurements and X-ray diffraction patterns obtained with a CuKα line for the positive active materials for use in the nonaqueous electrolyte secondary batteries according to the second and third embodiments and the positive active material included in the positive electrode included in the nonaqueous electrolyte secondary battery according to the first embodiment, the diffraction peaks observed in the range of 20° or more and 22° or less is confirmed in accordance with the following procedures and conditions. In this regard, the term "observed" means that the ratio of the difference ($I_{21}$) between the maximum value and minimum value of the intensity within the diffraction angle range of 20° or more and 22° or less to the difference ($I_{18}$) between the maximum value and minimum value of the intensity within the diffraction angle range of 17° or more and 19° or less, that is, the value of "$I_{21}/I_{18}$" falls within the range of 0.001 or more and 0.1 or less.

If the sample to be subjected to the X-ray diffraction measurement is an active material powder before positive electrode preparation (a powder before charge-discharge), the sample is directly subjected to the measurement. In the case of disassembling the nonaqueous electrolyte secondary battery (hereinafter, also referred to as a "battery") and then collecting a sample from the positive electrode removed, the battery is, before disassembling the battery, subjected to constant current discharge at a current value (A) corresponding to 1/10 of the nominal capacity (Ah) of the battery until reaching the battery voltage corresponding to the lower limit of the voltage specified for normal use, thereby bringing the battery into a full discharge state. As long as the battery has a metallic lithium electrode for the negative electrode as a result of the disassembly, the positive electrode is removed without performing the additional work described below. In the case of the battery without a metallic lithium electrode for the negative electrode, for providing precise control over the positive electrode potential, as the additional work, a test battery is, after disassembling the battery and then removing the positive electrode, assembled with a metallic lithium electrode as a counter electrode, subjected to constant current discharge at a current value of 10 mA per 1 g of positive composite until the voltage reaches 2.0 V (positive electrode potential of 2.0 V (vs. Li/Li$^+$)) and adjusted to a full discharge state, and then re-disassembled to remove the positive electrode.

The removed positive electrode is washed with dimethyl carbonate to thoroughly clean the nonaqueous electrolyte adhering to the positive electrode, and dried at room temperature all night and all day, and then, the positive composite is collected from the current collector. The collected positive composite is lightly crushed in an agate mortar, and placed in a sample holder for X-ray diffraction measurement and then subjected to the measurement.

The above-mentioned work from the disassembly of the battery to the re-disassembly thereof, and the work of cleaning and drying the positive electrode are performed in an argon atmosphere with a dew point of −60° C. or lower.

<X-Ray Diffraction Measurement>

In this specification, the X-ray diffraction measurement is made under the following conditions. The radiation source is CuKα, the acceleration voltage is 30 kV, and the acceleration current is 15 mA. The sampling width is 0.01 deg, the scan speed is 1.0 deg/min, the divergence slit width is 0.625 deg, the light receiving slit is open, and the scattering slit width is 8.0 mm.

Figure 3:
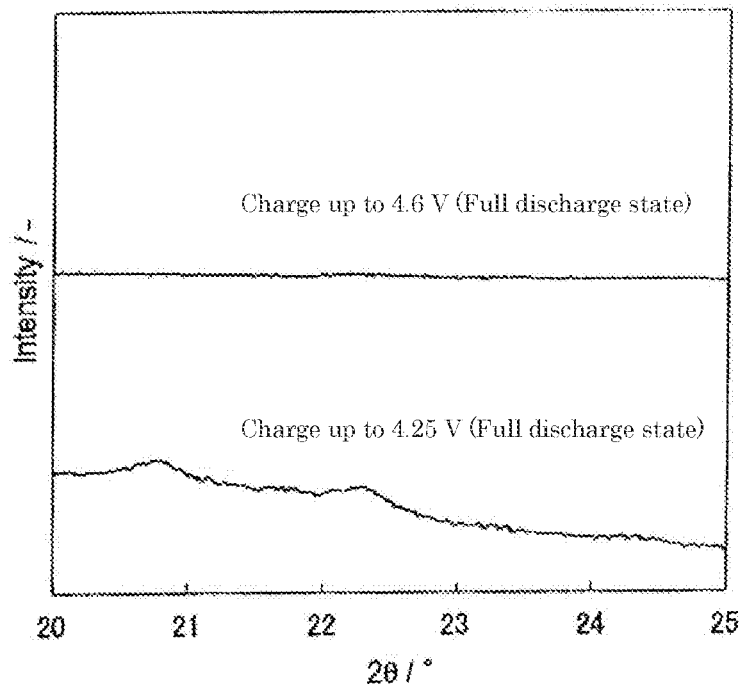
FIG. 3 shows X-ray diffraction patterns of positive active materials included in a nonaqueous electrolyte secondary battery according to an embodiment of the present invention and a nonaqueous electrolyte secondary battery according to a conventional example.

As shown in Example 1-1 described later, after assembling a nonaqueous electrolyte secondary battery with a lithium-excessive active material as a positive electrode and metallic lithium as a negative electrode, the positive electrode obtained by disassembling the nonaqueous electrolyte secondary battery in the full discharge state, completed by charge-discharge twice at a current value equivalent to 0.1C with a charge upper limit potential of 4.25 V (vs. Li/Li$^+$) and a discharge lower limit potential of 2.0 V (vs. Li/Li$^+$), is subjected to the X-ray diffraction measurement in accordance with the procedure mentioned above, thereby providing an X-ray diffraction pattern in which a diffraction peak is observed similarly in the range of 20° or more and 22° or less as in FIG. 1 (partially enlarged view: lower part of FIG. 3).

Figure 2:
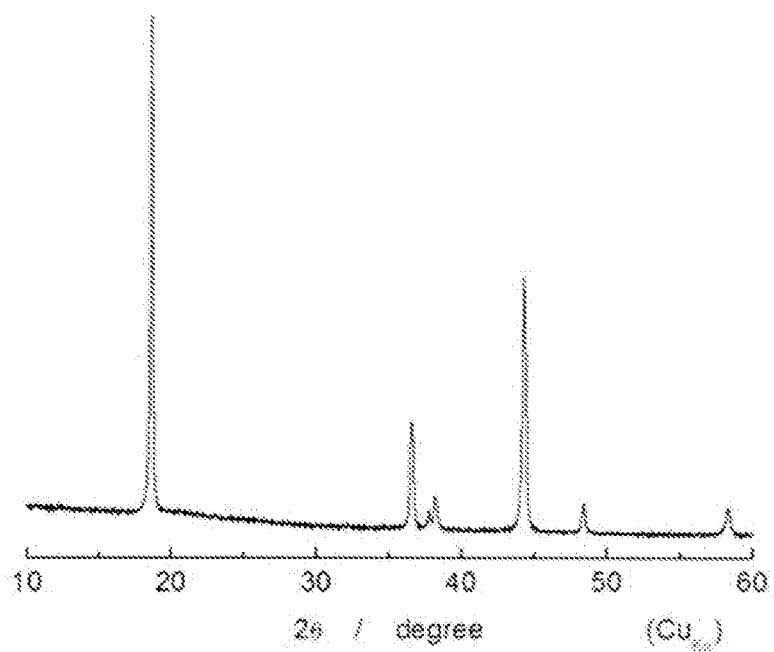
FIG. 2 is a diagram for describing the fact that "no diffraction peak is observed in a range of 20° or more and 22° or less" in X-ray diffraction measurement for a lithium-excess positive active material for use in a nonaqueous electrolyte secondary battery.

In addition, as shown in Comparative Example 1-2 described later, after assembling a nonaqueous electrolyte secondary battery with a lithium-excessive active material as a positive electrode and metallic lithium as a negative electrode, the positive electrode obtained by disassembling the nonaqueous electrolyte secondary battery in the full discharge state, completed by first charge-discharge with a charge upper limit potential of 4.6 V (vs. Li/Li$^+$) and a discharge lower limit potential of 2.0 V (vs. Li/Li$^+$), and then second charge-discharge with a charge upper limit potential of 4.25 V (vs. Li/Li$^+$) and a discharge lower limit potential of 2.0 V (vs. Li/Li$^+$) (at a current value equivalent to 0.1C in each case), is subjected to the X-ray diffraction measurement in accordance with the procedure mentioned above, thereby providing an X-ray diffraction pattern in which no peak is observed similarly in the range of 20° or more and 22° or less as in FIG. 2 (partially enlarged view: upper part of FIG. 3). More specifically, as mentioned above, if once charge is performed up to a potential of 4.5 V (vs. Li/Li$^+$) or higher, no peak is observed in the range of 20° or more and 22° or less.

The nonaqueous electrolyte secondary battery according to the first embodiment has, even after charge-discharge, a diffraction peak observed in the range of 20° or more and 22° or less in the X-ray diffraction pattern of the positive active material, measured in accordance with the procedure mentioned above, and it is thus determined that the nonaqueous electrolyte secondary battery according to the first embodiment is used at a battery voltage at which the maximum attainable potential of the positive electrode in the full charge state (SOC 100%), including the initial charge-discharge, is lower than 4.5 V (vs. Li/Li$^+$).

Furthermore, also in the case where the charge upper limit potential is changed from the foregoing 4.25 V (vs. Li/Li$^+$) to 4.35 V (vs. Li/Li$^+$) in the second and third embodiments, diffraction peaks are similarly observed in the range of 20° or more and 22° or less in the X-ray diffraction pattern of the positive active material, and it is thus determined that the nonaqueous electrolyte secondary batteries according to the second and third embodiments are used at a battery voltage at which the maximum attainable potentials of the positive electrodes in the full charge states (SOC 100%), including the initial charge-discharge, are lower than 4.5 V (vs. Li/Li$^+$).

It is to be noted that a first charge-discharge condition 2 with the charge upper limit potential of 4.6 V (vs. Li/Li$^+$) and the discharge lower limit potential 2.0 V (vs. Li/Li$^+$) in the example described later has the charge upper limit potential of 4.6 V (vs. Li/Li$^+$), in order to check the amount of charge per volume in the overcharge region of the positive active material according to the third embodiment, and thus, the nonaqueous electrolyte secondary battery after applying the first charge-discharge condition 2 under which the diffraction peak in the range of 20° or more and 22° or less is not observed in the X-ray diffraction pattern of the positive active material is not any nonaqueous electrolyte secondary battery according to the third embodiment.

<Change in Positive Electrode Potential>

Furthermore, in the nonaqueous electrolyte secondary batteries according to the present embodiments, which has diffraction peaks observed in the range of 20° or more and 22° or less in the X-ray diffraction patterns of the positive active materials, in charge with electricity up to a positive electrode potential of 5.0 V (vs. Li/Li$^+$), a region where the potential change is relatively flat with respect to the amount of charge (hereinafter, also referred to as a "region with flat potential change") is observed within the positive electrode potential range of 4.5 V (vs. Li/Li$^+$) or higher and 5.0 V (vs. Li/Li$^+$) or lower. It is to be noted that if once charge is performed until completing the charge process in which the region with flat potential change is observed, the region with flat potential change will not be then observed again even if charge is performed up to a positive electrode potential of 5.0 V (vs. Li/Li$^+$).

Figure 4:
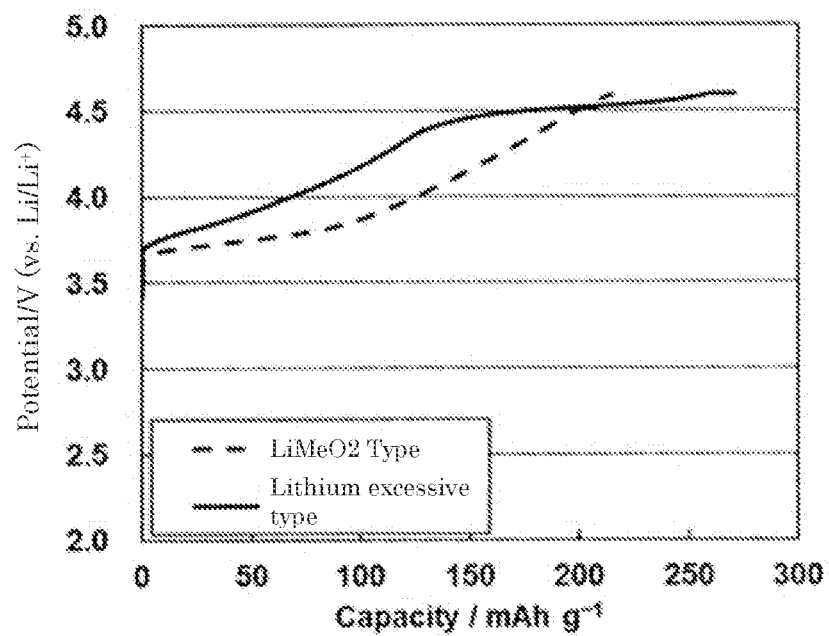
FIG. 4 is a diagram showing a change in positive electrode potential with respect to the amount of charge observed in the case of initial charge with electricity with the charge upper limit potentials of positive electrodes at 4.6 V (vs. Li/Li$^+$) for the positive electrodes including LiMeO$_2$-type and lithium-excessive active materials.

The principle of the function mechanism of the present invention will be described with reference to FIG. 4. The solid line in FIG. 4 shows the change in the positive electrode potential in the case of assembling a nonaqueous electrolyte secondary battery according to the present embodiment, including a positive electrode with a lithium-transition metal composite oxide (referred to as a "lithium excessive type") as a positive active material and a negative electrode with metallic lithium, and first charging the battery with electricity with the charge upper limit potential of the positive electrode at 4.6 V (vs. Li/Li$^+$). In contrast, the broken line shows the change in the positive electrode potential, in the case of similar first charge with electricity, a nonaqueous electrolyte secondary battery configured similarly except for including a positive electrode with a commercially available LiNi$_{1/3}$Co$_{1/3}$Mn$_{1/3}$O$_2$ (referred to as a "LiMeO$_2$ type") as a positive active material. In the case of the positive electrode with the lithium-excessive active material, a region with flat potential change is observed within the positive electrode potential range of 4.45 V (vs. Li/Li$^+$) or higher and 4.6 V (vs. Li/Li$^+$) or lower. In contrast, in the case of the positive electrode with the LiMeO$_2$-type active material, a region with flat potential change is not observed within the positive electrode potential range of 4.45 V (vs. Li/Li$^+$) or higher and 4.6 V (vs. Li/Li$^+$) or lower.

It is to be noted that the potential range in which the flat region is observed and the capacity for charge-discharge are slightly different depending on the properties such as the composition even in the case of the positive electrode with the lithium-excessive active material, and this diagram is merely an example.

The nonaqueous electrolyte secondary battery according to the present embodiment has the positive electrode including the lithium-excessive active material in which the region with flat potential change is observed in charge with electricity up to a positive electrode potential of 5.0 V (vs. Li/Li$^+$), and in the initial charge-discharge step, the battery is completed without any charge with electricity until completing the charge process in which the flat region is observed. The maximum attainable potential of the positive electrode in the initial charge-discharge step is preferably lower than 4.5 V (vs. Li/Li$^+$). Furthermore, the nonaqueous electrolyte secondary battery according to the present embodiment is used under charge conditions without any charge with electricity until completing the charge process in which the flat region is observed. Accordingly, the nonaqueous electrolyte secondary battery according to the present embodiment is not subjected even once to charge with electricity until completing the charge process in which the flat region is observed, from the manufacturing stage to the use, and thus, in the case of overcharge, a region where the potential change is flat with respect to the amount of charge is observed within the positive electrode potential range of 4.5 V (vs. Li/Li$^+$) or higher and 5.0 V (vs. Li/Li$^+$) or lower.

The nonaqueous electrolyte secondary battery according to the present embodiment utilizes the behavior described above, thereby making it possible to suppress a sudden increase in battery voltage (positive electrode potential) until reaching a higher SOC, even if the battery is overcharged beyond the SOC 100% corresponding to the full charge state during normal use.

<Method for Confirming Region with Flat Potential Change>

In this regard, the "region with flat potential change" observed is confirmed in accordance with the following procedure. Prepared is a test battery that has, as a working electrode, a positive electrode removed from a disassembled nonaqueous electrolyte secondary battery and metallic lithium as a counter electrode. It is to be noted that because the battery voltage of the test battery and the working electrode potential (positive electrode potential) have almost the same value, the positive electrode potential in the following procedure can be read as the battery voltage of the test battery. The test battery is discharged down to a final potential of 2.0 V (vs. Li/Li$^+$) for the positive electrode at a current value of 10 mA per 1 g of the positive composite, and the discharge is then followed by a pause for 30 minutes. Thereafter, constant current charge is performed up to a final potential of 5.0 V (vs. Li/Li$^+$) for the positive electrode at a current value of 10 mA per 1 g of the positive composite. In this regard, Y/X*100 is regarded as a capacity ratio Z (%), where the capacity at the time of reaching 4.45 V (vs. Li/Li$^+$) from the start of the charge is denoted by X (mAh) and the capacity at each potential is denoted by Y (mAh). A dZ/dV curve is obtained by plotting the positive electrode potential on the horizontal axis and plotting, on the vertical axis, dZ/dV with the difference in potential change for the denominator and the difference in capacity ratio change for the numerator.

Figure 5:
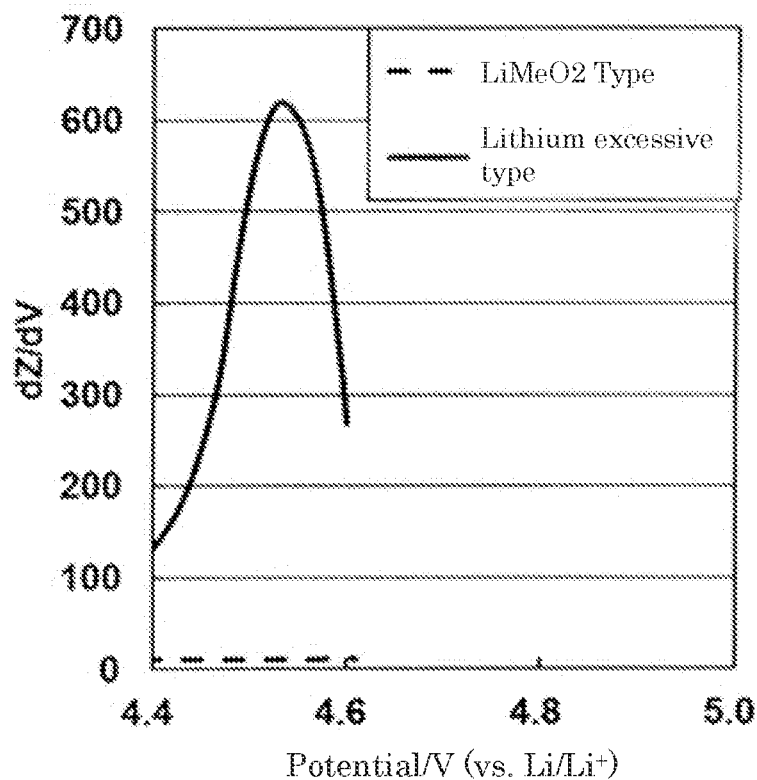
FIG. 5 is a diagram for describing "a region where the potential change is relatively flat with respect to the amount of charge" in the nonaqueous electrolyte secondary battery according to the embodiment of the present invention.

The solid line in FIG. 5 is an example of a dZ/dV curve in the case of assembling a nonaqueous electrolyte secondary battery including a positive electrode with a lithium-excessive active material as a positive active material and a negative electrode with metallic lithium, and first charging the battery with electricity up to 4.6 V (vs. Li/Li$^+$). The dZ/dV curve has, as can be seen from the calculation formula, a dZ/dV value increased as the potential change is decreased with respect to the capacity ratio change, and a dZ/dV value decreased as the potential change is increased with respect to the capacity ratio change. In the process of charging the lithium-excessive active material, the value of dZ/dV is increased in the region with flat potential change in the potential region in excess of 4.5 V (vs. Li/Li$^+$). Thereafter, when the region with flat potential change ends to start a rise in potential again, the value of dZ/dV is decreased. More specifically, the dZ/dV curve has a peak observed. In this regard, in the case where the maximum value of the dZ/dV value in the range from 4.5 V (vs. Li/Li$^+$) to 5.0 V (vs. Li/Li$^+$) shows 150 or more, it is determined that the region where the potential change is flat with respect to the amount of charge is observed. In contrast, the broken line is a dZ/dV curve of a battery configured similarly except for including a positive electrode with a commercially available LiMeO$_2$-type active material as a positive active material and subjected to the same test. Corresponding to the fact that the region with flat potential change is not observed, such a peak as in the lithium excessive type is not observed. It is to be noted that in this specification, the normal use refers to a case of using the nonaqueous electrolyte secondary battery by employing charge-discharge conditions recommended or specified for the nonaqueous electrolyte secondary battery, or in the case where a charger for the nonaqueous electrolyte secondary battery is prepared, refers to a case of using the nonaqueous electrolyte secondary battery with the charger applied.

<Discharge Capacity Ratio of Positive Active Material>

The positive active material according to the second embodiment further has a ratio a/b of 17≤a/b≤25 between a discharge capacity (a) of 4.35 V (vs. Li/Li$^+$) to 3.0 V (vs. Li/Li$^+$) and a discharge capacity (b) from 3.0 V (vs. Li/Li$^+$) to 2.0 V (vs. Li/Li$^+$).

The discharge capacity ratio a/b is determined as follows.

In the case where the evaluation target is an active material, a paste for application, in which the proportions of the active material, acetylene black (AB), and polyvinylidene fluoride (PVdF) meet 90:5:5, is prepared with N-methylpyrrolidone as a dispersion medium, the paste for application is applied to one surface of an aluminum foil current collector with a thickness of 20 μm to prepare a positive electrode plate, and a nonaqueous electrolyte secondary battery for evaluation is assembled with metallic lithium as the counter electrode. Constant current constant voltage charge is performed at a current value of 15 mA per 1 g of the positive composite, with a charge upper limit potential of 4.35 V (vs. Li/Li$^+$), under the charge termination condition of current value decay down to ⅕. After providing a pause for 10 minutes, constant current discharge is performed at the same current value with a discharge lower limit potential of 2.0 V (vs. Li/Li$^+$), thereby determining the ratio a/b between the discharge capacity (a) from the start of discharge to 3.0 V (vs. Li/Li$^+$) and the discharge capacity (b) from 3.0 V (vs. Li/Li$^+$) to 2.0 V (vs. Li/Li$^+$).

In the case where the evaluation target is a secondary battery, constant current discharge is performed at a current value (A) corresponding to 1/10 of the nominal capacity (Ah) of the battery until reaching the battery voltage corresponding to the lower limit of the specified voltage, thereby bringing the battery into a full discharge state. After disassembling the battery in an argon atmosphere with a dew point of −60° C. or lower and removing the positive electrode plate, a nonaqueous electrolyte secondary battery for evaluation with metallic lithium as a counter electrode is assembled. The prepared battery is subjected to constant current discharge down to 2.0 V (vs. Li/Li$^+$) at a current value of 15 mA per 1 g of the positive composite. Thereafter, constant current constant voltage charge is performed at the same current value, with a charge upper limit potential of 4.35 V (vs. Li/Li$^+$), under the charge termination condition of current value decay down to ⅕. After providing a pause for 10 minutes, constant current discharge is performed down to 2.0 V (vs. Li/Li$^+$) with the same current, and the a/b is similarly evaluated.

According to Experimental Example 2 described below, it has been found that a positive active material that is excellent in first coulombic efficiency and high rate discharge performance, a positive electrode for a nonaqueous electrolyte secondary battery according to the second embodiment, containing the positive active material, and a nonaqueous electrolyte secondary battery according to the second embodiment, including the positive electrode are obtained in the case where the discharge capacity ratio a/b meets $17 \leq a/b \leq 25$.

<Behavior of Nonaqueous Electrolyte Secondary Battery Charged with Electricity in Excess of 4.5 V (Vs. Li/Li$^+$)>

The nonaqueous electrolyte secondary battery according to the second embodiment includes a positive electrode containing the positive active material mentioned above, and the positive active material has a peak observed in the range of 20° or more and 22° or less in an X-ray diffraction pattern obtained with a CuKα line, and thus, the nonaqueous electrolyte secondary battery according to the second embodiment is manufactured by a method for manufacturing a nonaqueous electrolyte secondary battery according to the second embodiment, in which the maximum attainable potential of the positive electrode in the initial charge-discharge step is lower than 4.5 V (vs. Li/Li$^+$). In addition, the nonaqueous electrolyte secondary battery according to the second embodiment does not undergo the process of charge at 4.5 V (vs. Li/Li$^+$) or higher during normal use. Accordingly, when the battery is charged with electricity in excess of 4.5 V (vs. Li/Li$^+$) up to 5.0 V (vs. Li/Li$^+$), a region where the potential change is relatively flat with respect to the amount of charge is observed for the positive electrode within the positive electrode potential range of 4.5 V (vs. Li/Li$^+$) or higher and 5.0 V (vs. Li/Li$^+$) or lower (see the solid line in FIG. 6). Because of the presence of this flat region, no sudden increase in battery voltage is observed until reaching a higher SOC in the nonaqueous electrolyte secondary battery according to the present embodiment.

Figure 6:
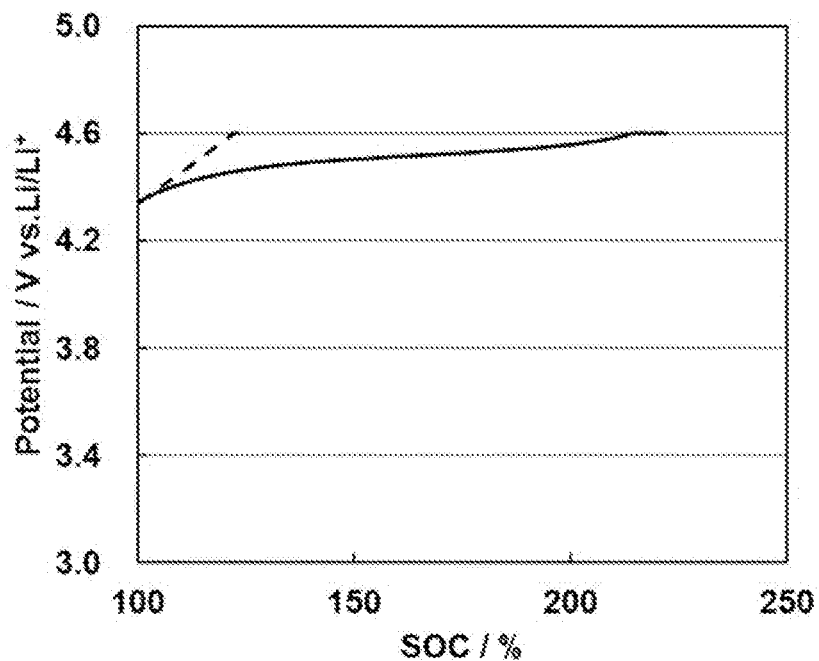
FIG. 6 is a diagram showing a potential change with respect to the amount of charge for a lithium-excessive positive active material.

The solid line in FIG. 6 shows an example of a charge curve in the case of first charging, with electricity, a nonaqueous electrolyte secondary battery including a positive electrode containing a lithium-excessive active material up to 4.6 V (vs. Li/Li$^+$). In this regard, the capacity was converted to SOC with the capacity from the start of the charge to reaching 4.35 V (vs. Li/Li$^+$) as a reference (SOC 100%). The battery has a relatively flat charge curve until the positive electrode potential rises sharply at an SOC around 200%. In contrast, the broken line in FIG. 6 is a charge curve in the case of discharging the nonaqueous electrolyte secondary battery charged up to 4.6 V (vs. Li/Li$^+$), down to 2.0 V (vs. Li/Li$^+$), and then charging the battery with the upper limit potential of 4.6 V (vs. Li/Li$^+$) again. As can be seen from the figure, no region with flat potential change appears in the positive electrode, if once, with the charge history of 4.5 V (vs. Li/Li$^+$) or higher.

The region with flat potential change is confirmed, based on FIG. 5 as mentioned above.

<Raman Spectrum of Lithium-Transition Metal Composite Oxide>

The ratio ($I_{490}/I_{600}$) of the maximum value $I_{490}$ in the range of 450 cm$^{-1}$ or more and 520 cm$^{-1}$ or less to the maximum value $I_{600}$ in the range of 550 cm$^{-1}$ or more and 650 cm$^{-1}$ or less is 0.45 or more in the Raman spectrum for the lithium-transition metal composite oxide according to the third embodiment.

$I_{490}/I_{600}$ of 0.45 or more increases the amount of charge per volume in the overcharge region, and increases the discharge capacity per volume.

In the present invention, the significance of specifying $I_{490}/I_{600}$ of 0.45 or more is presumed as follows.

Figure 7:
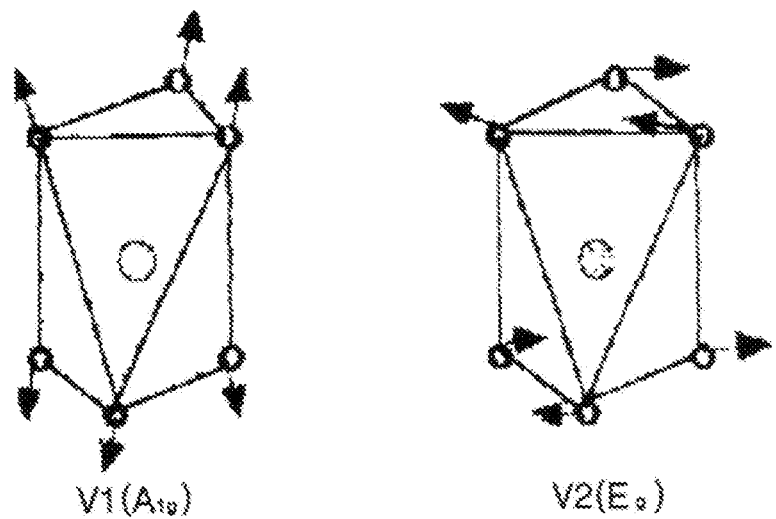
FIG. 7 is a diagram showing A$_{1g}$ and E$_g$ vibration modes of a lithium-transition metal composite oxide that has an α-NaFeO$_2$-type crystal structure.
Figure 8:
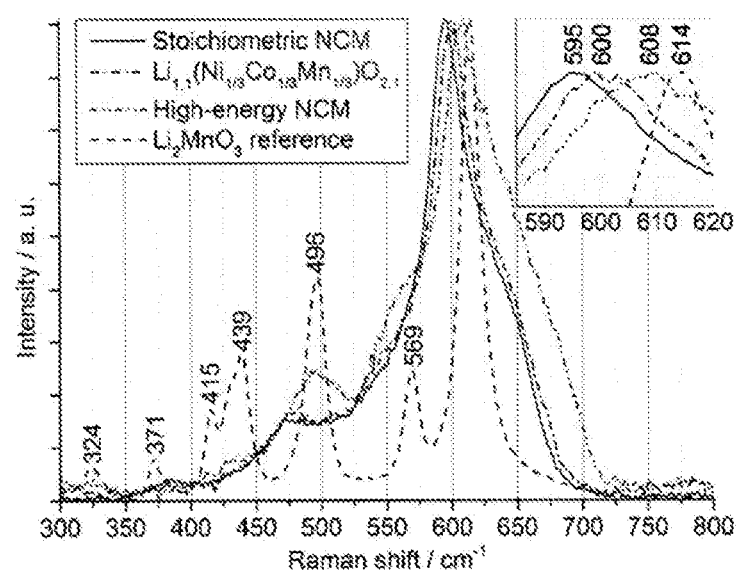
FIG. 8 shows Raman spectra before charge-discharge for LiNi$_{1/3}$Co$_{1/3}$Mn$_{1/3}$O$_2$, Li$_{1.1}$Ni$_{1/3}$Co$_{1/3}$Mn$_{1/3}$O$_{2.1}$, xLi$_2$MnO$_3$·(1−x)LiMO$_2$ (M=Ni, Co, Mn; x=0.5), and Li$_2$MnO$_3$.

The lithium-transition metal composite oxide according to the present embodiment can be represented as a solid solution of LiMeO$_2$ (M=containing Ni and Mn, or containing Ni, Co, and Mn) and Li$_2$MnO$_3$. LiMeO$_2$ and Li$_2$MnO$_3$ have, in the Raman spectra, a peak $A_{1g}$ around 600 cm$^{-1}$ corresponding to the MeO$_6$ vibration mode and a peak $E_g$ around 490 cm$^{-1}$ corresponding to the O-Me-O vibration mode, and Li$_2$MnO$_3$ is known to have a peak $E_g$ that appears particularly prominently (see Non-Patent Document 1). FIG. 2 of above-mentioned Patent Document 17 which describes the vibration mode is reprinted in FIG. 7, and FIG. 4 of above-mentioned Non-Patent Document 1 is reprinted in FIG. 8.

The large $I_{490}/I_{600}$ means that the because of the large O-Me-O vibration, Li$_2$MnO$_3$ component is relatively large in amount in the lithium-transition metal composite oxide according to the present embodiment. Li$_2$MnO$_3$ is a component that contributes to increasing the amount of charge in the overcharge region, and thus with $I_{490}/I_{600}$ of 0.45 or higher, no sudden increase in battery voltage is observed until reaching a higher SOC.

In contrast, the small $I_{490}/I_{600}$ means that the because of the large $M_{eO6}$ vibration, LiMeO$_2$ component is relatively large in amount in the lithium-transition metal composite oxide according to the present embodiment. LiMeO$_2$ has a higher density and a higher capacity than Li$_2$MnO$_3$. It has been found that, however, in the case where the positive active material containing the lithium-transition metal composite oxide according to the third embodiment is densified with a sintering aid, the active material with $I_{490}/I_{600}$ of 0.45 or more, in which the proportion of LiMeO$_2$ units is considered low, is unexpectedly larger in discharge capacity per volume than the active material with $I_{490}/I_{600}$ of less than 0.45. The reason why $I_{490}/I_{600}$ is reduced by the sintering aid is believed to be because the valence of the transition metal is reduced by oxygen deficiency in the active material, or disproportionation (3LiMeO$_2$→LiMn$_2$O$_4$+Li$_2$MnO$_3$ during the synthesis of the active material) is eliminated, thereby increasing the proportion of the LiMeO$_2$ units to the Li$_2$MnO$_3$ units in the active material. For the above reason, however, in order to increase the discharge capacity per volume, $I_{490}/I_{600}$ is preferably not excessively large, and preferably 0.85 or less.

<Raman Spectrum Measurement>

The sample to be subjected to Raman spectrum measurement is prepared in accordance with the same procedure and conditions, except that, in the preparation of the sample to be subjected to the X-ray diffraction measurement mentioned above, the collected composite is subjected to firing for 4 hours at 600° C. with the use of a small-size electric furnace to remove carbon as a conductive agent and the PVdF binder as a binder, and the lithium-transition metal composite oxide particles are taken out and subjected to Raman spectrum measurement as an active material powder (powder after charge-discharge).

The Raman spectrum is measured under the following conditions.

Raman spectrometry is performed with the use of "LabRAM HR Revolution" from Horiba, Ltd. With the use of a 100×lens as an objective lens, and the active material powder prepared as described above is subjected to the measurement with a laser focused on the powder. In that regard, the measurement is performed under the conditions of wavelength: 532 nm (YAG laser), grating: 600 g/mm, exposure time: 30 seconds, cumulated number: twice, and measurement wavelength: 100 cm$^{-1}$ or more and 4000 cm$^{-1}$ or less. The ratio ($I_{490}/I_{600}$) of the maximum value $I_{490}$ in the range of 450 cm$^{-1}$ or more and 520 cm$^{-1}$ or less to the maximum value $I_{600}$ in the range of 550 cm$^{-1}$ or more 650 cm$^{-1}$ or less is determined in the spectrum obtained by the measurement mentioned above.

Figure 9:
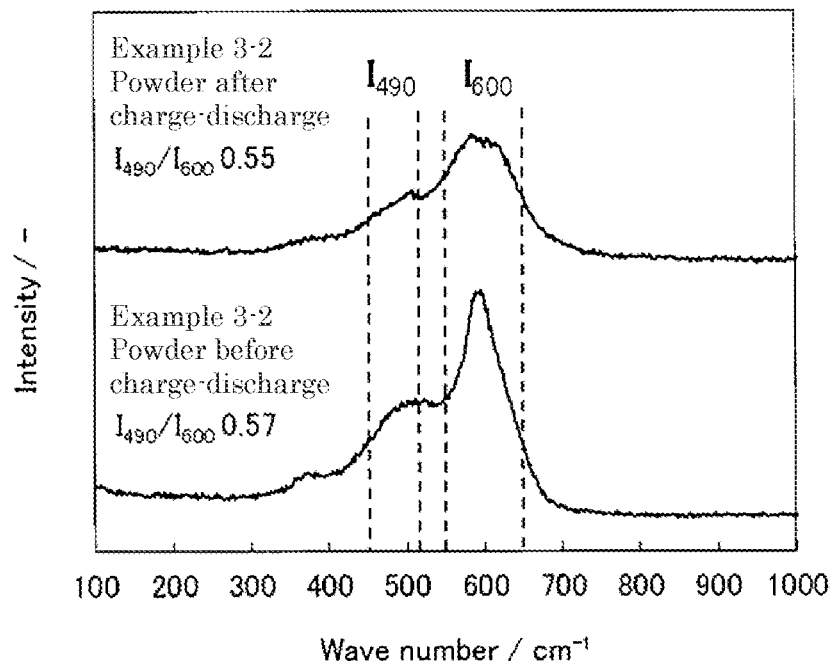
FIG. 9 shows Raman spectra before and after charge-discharge for a positive active material according to an example of the present invention.

FIG. 9 is Raman spectra of a powder before charge-discharge and a powder after charge-discharge, measured in accordance with the procedure mentioned above for a lithium-transition metal composite oxide according to Example 3-2 described later. The value of $I_{490}/I_{600}$ was 0.57 for the powder before charge-discharge, and the value of $I_{490}/I_{600}$ was 0.55 for the powder after charge-discharge. The lithium-transition metal composite oxide according to the present embodiment maintains the Raman spectrum shape before and after charge-discharge in a powdery state.

Further, FIG. 4 (before charge-discharge) and FIG. 5 (after charge-discharge) of Non-Patent Document 1 also show that the Raman spectrum changes little.

<Method for Producing Precursor of Lithium-Transition Metal Composite Oxide>

Next, a method for producing a precursor of a lithium-transition metal composite oxide for use in the production of the positive active material of the nonaqueous electrolyte secondary battery according to the present embodiment will be described.

The lithium-transition metal composite oxide according to the present embodiment can be obtained by basically preparing a raw material containing the metal elements (Li, Ni, Co, and Mn) constituting the active material in accordance with the composition of the intended active material (oxide), and firing the raw material.

For preparing a composite oxide that has the intended composition, a so-called "solid-phase method" of mixing and firing respective compounds of Li, Ni, Co, and Mn, and a "coprecipitation method" of preparing in advance a coprecipitated precursor that has Ni, Co, and Mn in one particle and mixing and firing a lithium salt with the coprecipitation precursor are known. In the synthesis process in accordance with the "solid-phase method", Mn is particularly less likely to form a homogeneous solid solution in Ni and Co, and it is thus difficult to obtain a sample in which the respective elements are homogeneously distributed in one particle. In the documents and the like, many attempts have been ever made to form a solid solution of Mn in some of Ni or Co (e.g., $LiNi_{1-x}Mn_xO_2$) by the solid-phase method, but the selection of the "coprecipitation method" makes it easier to obtain a homogeneous phase at the atomic level. Accordingly, the "coprecipitation method" is employed in the method for producing the precursor of the lithium-transition metal composite oxide according to the present embodiment.

In the method for producing the precursor of the lithium-transition metal composite oxide according to the present embodiment, preferably, a raw material aqueous solution containing Ni, Co, and Mn is delivered by drops, and a compound containing Ni, Co, and Mn is coprecipitated in the solution to produce a precursor.

In preparing the coprecipitated precursor, among Ni, Co, and Mn, Mn is more easily oxidized, it is not easy to prepare a coprecipitated precursor in which Ni, Co, and Mn are homogeneously distributed in the divalent states, and thus, homogeneously mixing Ni, Co, and Mn at the atomic level is likely to be insufficient. Accordingly, in the present invention, the dissolved oxygen is preferably removed in order to inhibit the oxidation of Mn distributed in the coprecipitated precursor. Examples of the method for removing the dissolved oxygen include a method of bubbling a gas containing no oxygen. The gas containing no oxygen ($O_2$) is not to be considered limited, and a nitrogen gas, an argon gas, a carbon dioxide ($CO_2$ gas and the like can be used.

Although the pH in the step of preparing the precursor by coprecipitating a compound containing Ni, Co, and Mn in a solution is not to be considered limited, the pH can be adjusted to 9 or more and 12 or less in the case of making an attempt to prepare the coprecipitated precursor as a coprecipitated hydroxide precursor. In order to increase the tap density of the precursor and the composite oxide, the pH is preferably controlled. The pH is adjusted to 11.5 or less, thereby making it possible to adjust the tap density of the composite oxide to 1.00 g/cm³ or more, and then making it possible to improve the high rate discharge performance. Furthermore, the pH of 11.0 or less allows the particle growth to be promoted, thus making it possible to reduce the stirring duration after the completion of dropping the raw material aqueous solution.

The transition metal compound is more preferably a transition metal hydroxide precursor produced by a coprecipitation method in which raw material compounds respectively containing Ni and Mn or containing Ni, Co, and Mn are reacted in an aqueous solution with pH of 10.2 or less. The pH of 10.2 or less allows the particle growth to be promoted, thus making it possible to reduce the stirring duration after the completion of dropping the raw material aqueous solution, and making it possible to produce a precursor that has a crystal structure containing $αMe(OH)_2$ and $ßMe(OH)_2$. The precursor that has a crystal structure containing $αMe(OH)_2$ and $ßMe(OH)_2$ has a tap density that can be increased as compared with a precursor that has a crystal structure of an $αMe(OH)_2$ single phase or a $ßMe(OH)_2$ single phase. The electrode prepared with the use of the precursor that has a high tap density allows a press density to be increased, thus allowing the resistance of the electrode to be reduced. It is to be noted that if the pH is excessively low, a precursor of an $αMe(OH)_2$ single phase is produced, and thus, the reaction pH is preferably more than 9.

In the case of producing a hydroxide precursor, an alkali metal hydroxide, a complexing agent, and an alkaline solution containing a reducing agent are preferably added along with a solution containing a transition metal (Me) into a reaction tank kept alkaline to coprecipitate the transition metal hydroxide.

As the complexing agent, ammonia, ammonium sulfate, ammonium nitrate, or the like can be used, and ammonia is preferable. A precursor that has a higher tap density can be produced by a crystallization reaction with the use of a complexing agent.

The reducing agent is preferably used along with the complexing agent. As the reducing agent, hydrazine, sodium borohydride, or the like can be used, and hydrazine is preferable.

As the alkali metal hydroxide (neutralizing agent), sodium hydroxide, lithium hydroxide, or potassium hydroxide can be used.

In the case of making an attempt to prepare the coprecipitated precursor as a coprecipitated carbonate precursor, the pH can be 7.5 or more and 11 or less. The pH of 9.4 or less allows the tap density of the composite oxide to be adjusted to 1.25 g/cm³ or more, and then allows the high rate discharge performance to be improved. Furthermore, the pH of 8.0 or less allows the particle growth to be promoted, thus making it possible to reduce the stirring duration after the completion of dropping the raw material aqueous solution.

Examples of the raw materials for the coprecipitated precursor include: a nickel hydroxide, a nickel carbonate, a nickel sulfate, a nickel nitrate, and a nickel acetate as Ni sources; a cobalt sulfate, a cobalt nitrate, and a cobalt acetate as Co sources; and a manganese oxide, a manganese carbonate, a manganese sulfate, a manganese nitrate, and manganese acetate as Mn sources.

Preferable is a method in which a mixed alkali solution containing an alkali metal hydroxide (neutralizing agent) such as sodium hydroxide, a complexing agent such as ammonia, and a reducing agent such as hydrazine is appropriately delivered by drops while delivering the raw material aqueous solution for the transition metal compound by drops for supplying the solution. The concentration of the alkali metal hydroxide delivered by drops is preferably 1.0 M or more and 8.0 M or less. The concentration of the complexing agent is preferably 0.4 M or more, and more preferably 0.6 M or more. Furthermore, the concentration of the complexing agent is preferably 2.0 M or less, more preferably 1.6 M or less, and further preferably 1.5 M or less. The concentration of the reducing agent is preferably 0.05 M or more and 1.0 M or less, and more preferably 0.1 or more and 0.5 M or less. The tap density of the hydroxide precursor can be increased by decreasing the pH of the reaction tank and adjusting the ammonia (complexing agent) concentration to 0.6 M or more.

The dropping rate of the raw material aqueous solution has a great influence on element distribution homogeneity in one particle of the coprecipitated precursor produced. The preferable dropping rate is influenced by the size of the reaction tank, the stirring conditions, pH, the reaction temperature, and the like, and preferably 30 ml/min or less. In order to improve the discharge capacity, the dropping rate is more preferably 10 mL/min or less, most preferably 5 ml/min or less.

Further, in the presence of a complexing agent such as $NH_3$, in the reaction tank and under a certain convection condition applied, the stirring is further continued after the completion of dropping the raw material aqueous solution, thereby promoting the rotation of the particles and the revolution thereof in the stirring tank, and in this process, the particles gradually grow into concentric spherical shapes while colliding with each other. More specifically, the coprecipitated precursor is formed through a two-step reaction of: a metal complex forming reaction developed when the raw material aqueous solution is dropped in the reaction tank; and a precipitation forming reaction developed during the retention of the metal complex in the reaction tank. Accordingly, a coprecipitation precursor having a target particle size can be obtained by appropriately selecting the time period for further continuing the stirring after the completion of dropping the raw material aqueous solution.

The preferable duration of stirring after the completion of dropping the raw material aqueous solution is influenced by the size of the reaction tank, the stirring conditions, pH, the reaction temperature, and the like, and is preferably 0.5 hour or longer, and more preferably 1 hour or longer in order to grow the particles as uniform spherical particles. Furthermore, in order to reduce the possibility of insufficient power performance in the low SOC region of the battery due to the excessively increased particle size, the duration is preferably 15 hours or shorter, more preferably 10 hours or shorter, and most preferably 5 hours or shorter.

Furthermore, the particle size D50 corresponding to an accumulated volume of 50% in the particle size distribution of the secondary particles of the hydroxide precursor and the lithium-transition metal composite oxide is preferably 13 μm or less. For the purpose, for example, in the case where the pH is controlled to be 9.1 or more and 10.2 or less, the stirring duration is preferably 1 hour or longer and 3 hours or shorter.

In the case where the hydroxide precursor particles are prepared with the use of, as a neutralizing agent, sodium compound such as sodium hydroxide, sodium ions adhering to the particles are preferably removed by washing in the subsequent washing step. For example, conditions can be employed such that the frequency of washing with 500 mL of ion-exchange water is 6 times or more in extracting the prepared hydroxide precursor by suction filtration.

<Method for Producing Lithium-Transition Metal Composite Oxide>

The method for producing the positive active material of the nonaqueous electrolyte secondary battery according to the present embodiment is preferably a method of mixing the coprecipitated precursor (transition metal compound) prepared as mentioned above and a lithium compound and firing the mixture.

In the method for producing the positive active material according to the second embodiment, the lithium-transition metal composite oxide can be produced by mixing a Li compound with a transition metal compound containing Ni and Mn, or containing Ni, Co, and Mn, in which the molar ratio Mn/Me of Mn to Me meets Mn/Me≥0.45, and firing the mixture.

In the method for producing the positive active material according to the third embodiment, the lithium-transition metal composite oxide can be produced by mixing a Li compound with a transition metal compound containing Ni and Mn, or containing Ni, Co, and Mn, in which the molar ratio Mn/Me of Mn to Me meets 0.3≤Mn/Me<0.55, and firing the mixture.

As the Li compound mixed with the transition metal compound, lithium hydroxide, lithium nitrate, lithium carbonate, lithium acetate, and the like can be used.

For firing the mixed transition metal compound and Li compound, a sintering aid may be used. In the third embodiment, a sintering aid is preferably added. Lithium fluoride (LiF), lithium carbonate ($Li_2CO_3$), sodium fluoride (NaF), sodium chloride (NaCl), lithium sulfate ($Li_2SO_4$), lithium phosphate ($Li_3PO_4$), lithium chloride (LiCl), magnesium chloride ($MgCl_2$), or calcium chloride ($CaCl_2$)) is preferably used as the sintering aid. As mentioned above, lithium carbonate is used as a Li compound for producing a lithium-transition metal composite oxide, but in the case where lithium hydroxide is used as the above-mentioned lithium compound as in the examples described later, lithium carbonate functions as a sintering aid. The ratio of these sintering aids added is preferably 1 mol % or higher and 10 mol % or lower, based on the total amount of the Li compound. It is to be noted that the total amount of the Li compound is preferably adjusted for about 1 mol % to 5 mol % in excess, in consideration of the Li compound partially disappearing during the firing.

The firing temperature affects the charge-discharge cycle performance of the positive active material.

If the firing temperature is excessively low, crystallization tends to proceed insufficiently, thereby degrading charge-discharge cycle performance. In one aspect of the present invention, the firing temperature is preferably 800° C. or higher. The temperature of 800° C. or higher allows for the achievement of active material particles with high crystallinity, thereby allowing the charge-discharge cycle performance to be improved.

In contrast, if the firing temperature is excessively high, the structure will change from the layered α-$NaFeO_2$ structure to a rock salt-type cubic structure, which is disadvantageous for lithium ion transfer in the active material during the charge-discharge reaction, and the charge-discharge cycle performance will be then degraded. In the present invention, the firing temperature is preferably 1000° C. or lower. The temperature of 1000° C. or higher allows for the achievement of active material particles in which the structural change to the rock salt-type cubic structure is suppressed, thereby allowing the charge-discharge cycle performance to be improved.

Accordingly, in the case of preparing a positive active material containing the lithium-transition metal composite oxide according to the present embodiment, in order to improve the charge-discharge cycle performance, the firing temperature is preferably 800° C. or higher and 1000° C. or lower, more preferably 850° C. or higher and 1000° C. or lower, and further preferably 850° C. or higher and 950° C. or lower.

The surface of the primary particles and/or secondary particles of the lithium-transition metal composite oxide obtained by firing may be coated with and/or allowed to form a solid solution in a dissimilar element in order to obtain a positive active material with a high energy density retention rate and an improved coulombic efficiency. Examples of the dissimilar element include an aluminum compound.

For coating with an aluminum compound, a method can be employed in which the synthesized lithium-transition metal composite oxide particles are input into an aqueous solution of a compound containing aluminum (a sulfate, a nitrate, an acetate, or the like). This aqueous solution is preferably acidic. The order of the input is, however, not limited to the foregoing. For example, a method may be employed in which an aqueous solution of a compound containing aluminum is input into the lithium-transition metal composite oxide particles dispersed in water. Further, a pH adjuster may be input after or at the time of inputting the lithium-transition metal composite oxide into an aqueous solution containing aluminum. The pH adjuster is not limited as long as the pH adjuster is an alkaline solution. Examples of the alkaline solution include an aqueous solution of NaOH and an aqueous solution of KOH. The pH value adjusted by inputting the pH adjuster can be selected appropriately.

The particles with the aluminum compound added thereto are separated by filtration or the like, and the obtained particles are preferably dried at 80° C. or higher and 120° C. or lower, and further subjected to a heat treatment in the atmosphere for 1 hour to 10 hours at 300° C. or higher and 500° C. or lower, thereby providing lithium-transition metal composite oxide particles with an oxide containing aluminum present on the surfaces of the particles.

In coating the surfaces of the lithium-transition metal composite oxide particles with the aluminum compound, the aluminum compound is preferably 0.1% by mass or higher and 0.7% by mass or lower, and more preferably 0.2% by mass or higher and 0.6% by mass or lower, based on the lithium-transition metal composite oxide, thereby more sufficiently producing the effect of further improving the energy density retention rate and the effect of improving the coulombic efficiency.

<Acid Treatment for Positive Active Material>

In the method for producing the positive active material according to the second embodiment, the positive active material with the discharge capacity ratio a/b meeting 17≤a/b≤25 can be produced by treating, with an acid that has $pKa_1$ of 3.1 or more, the lithium-transition metal composite oxide synthesized by the above-mentioned production method. Examples of the acid with $pKa_1$ of 3.1 or more include a boric acid ($pKa_1$=9.14), a citric acid ($pKa_1$=3.1), a tartaric acid ($pKa_1$=3.2), a malic acid ($pKa_1$=3.4), and an acetic acid ($pKa_1$=4.74). The surface treatment of the lithium-excessive active material with the use of an acid that has $pKa_1$ of 3.1 or more at an appropriate concentration allows the first coulombic efficiency and the high rate discharge performance to be improved, with a discharge capacity equivalent to or improved more than that of the untreated active material under conditions that causes no overcharge formation.

Although the detailed action mechanism of the acid treatment in the method for producing the active material according to the second embodiment is unknown, the above-mentioned acid has $pKa_1$ of 3.1 or more, lithium ions in the active material are thus unlikely to be substituted with hydrogen ions, and it is highly unlikely that the molar ratio Li/Me between the lithium of the active material and the transition metal will vary significantly. Accordingly, a mechanism is presumed to work differently from the examples described in Table 1 of Patent Document 7 and Table 1 of Patent Document 8, and the description in paragraph [0159] of Patent Document 11, in which an acid treatment with a strong acid such as a hydrochloric acid, a phosphoric acid, or a sulfuric acid with small $pKa_1$ substitutes lithium ions with hydrogen ions (removes Li), thereby reducing the above-mentioned molar ratio Li/Me of the active material after the treatment.

According to the experimental example described later, the active material subjected to the acid treatment according to the present embodiment has, as compared with the untreated active material, a decreased ratio a/b between the discharge capacity (a) from 4.35 V (vs. Li/Li$^+$) to 3.0 V (vs. Li/Li$^+$) and the discharge capacity (b) from 3.0 V (vs. Li/Li$^+$) to 2.0 V (vs. Li/Li$^+$) (relative increase in the discharge capacity b), and a specific surface area moderately increased. The discharge capacity b is known to appear characteristically in the spinel structure, and thus, this acid treatment is presumed to produce a moderate spinel-like crystal structure at the surface of the lithium-excessive active material, thereby reducing the irreversible capacity during the first charge-discharge, and then improving the first coulombic efficiency.

Moreover, the increased BET specific surface area is presumed to produce moderate irregularities at the particle surfaces, and promote the permeation of the electrolyte and the diffusion of lithium ions, thereby improving the first coulombic efficiency, and improving the high rate discharge performance. The BET specific surface area is preferably 6 m$^2$/g or less.

Here is the specific acid treatment procedure.

To 200 mL of a predetermined acid aqueous solution that has a predetermined hydrogen ion concentration, 5.0 g of the lithium-transition metal composite oxide is added, and with temperature of the aqueous solution maintained at 50° C., the mixture is stirred at 400 rpm for 2 hours with the use of a stirrer. After stirring, the lithium-transition metal composite oxide is filtered with the use of a suction device, washed with ion-exchange water, and then dried overnight at 80° C. under ordinary pressure.

<Negative Electrode Material>

The negative electrode material for the battery according to the present embodiment is not limited, and a material form capable of occluding and releasing lithium ions can be selected appropriately. Examples thereof include lithium composite oxides such as lithium titanate that has a spinel-type crystal structure as typified by Li[Li$_{1/3}$Ti$_{5/3}$]O$_4$, metallic lithium, lithium alloys (metallic lithium-containing alloys such as lithium-silicon, lithium-aluminum, lithium-lead, lithium-tin, lithium-aluminum-tin, lithium-gallium, and wood alloys), metals capable of occluding and releasing lithium, such as silicon, antimony, and tin, alloys thereof, metal oxides such as silicon oxide and tin oxide, and carbon materials (e.g., graphite, hard carbon, low-temperature calcined carbon, amorphous carbon).

<Positive Electrode and Negative Electrode>

The positive active material and the negative electrode material are preferably powders of 100 µm or less having in average particle size. In particular, the powder of the positive active material is preferably 15 µm or less in order to improve the high power characteristics of the nonaqueous electrolyte secondary battery, and preferably 10 µm or more in order to maintain the charge-discharge cycle performance. A grinder or a classifier is used in order to obtain the powder in a predetermined shape. For example, a mortar, a ball mill, a sand mill, a vibrating ball mill, a planetary ball mill, a jet mill, a counter jet mill, a swirling airflow-type jet mill, a sieve, or the like is used for the grinding. Wet grinding in coexistence with water or an organic solvent such as hexane may be used for the grinding. The classification method is not particularly limited, and a sieve, a wind classifier, and the like may be used as needed, in both dry and wet manners.

The positive active material and the negative electrode material, which are main constituents for the positive electrode and the negative electrode, have been described above in detail, but the positive electrode and the negative electrode may contain therein, in addition to the main constituents, a conductive agent, a binder, a thickener, a filler, and the like as other constituents.

The conductive agent is not limited as long as the agent is an electron conductive material that has no adverse influence on the battery performance, and typically, conductive materials such as natural graphite (flake graphite, scaly graphite, earthy graphite, etc.), artificial graphite, carbon black, acetylene black, ketjen black, carbon whiskers, carbon fibers, metals (copper, nickel, aluminum, silver, gold, etc.) powders, metal fibers, and conductive ceramic materials can be contained alone or as a mixture thereof.

Among these materials, acetylene black is preferable as the conductive agent from the viewpoint of electron conductivity and coatability. The amount of the conductive agent added is preferably 0.1% by mass or higher and 50% by mass or lower, and particularly preferably 0.5% by mass or higher and 30% by mass or lower, based on the total mass of the positive electrode or negative electrode. In particular, acetylene black subjected to grinding into ultrafine particles of 0.1 µm or more and 0.5 µm or less is preferably used, because the required carbon amount can be reduced. These mixing methods are provided by physical mixing, and ideally, homogeneous mixing. Therefore, it is possible to perform dry or wet mixing with the use of a powder mixer such as a V-type mixer, an S-type mixer, a mortar machine, a ball mill, and a planetary ball mill.

As the binder, typically, thermoplastic resins such as polytetrafluoroethylene (PTFE), polyvinylidene fluoride (PVDF), polyethylene, and polypropylene, and polymers with rubber elasticity such as ethylene-propylene-diene terpolymers (EPDM), sulfonated EPDM, styrene butadiene rubbers (SBR), and fluoro-rubbers can be used alone or as a mixture of two or more thereof. The amount of the binder added is preferably 1% by mass or higher and 50% by mass or lower, and particularly preferably 2% by mass or higher and 30% by mass or lower, based on the total mass of the positive electrode or negative electrode.

The filler is not limited as long as the filler is a material that has no adverse effect on the battery performance. Typically, olefin polymers such as polypropylene and polyethylene, amorphous silica, alumina, zeolite, glass, carbon, and the like are used. The amount of the filler added is preferably 30% by mass or lower, based on the total mass of the positive electrode or the negative electrode.

The positive electrode and the negative electrode are suitably prepared in a manner such that after mixing the main constituents (the positive active material in the positive electrode and the negative electrode material in the negative electrode) and other materials into an organic solvent such as N-methylpyrrolidone or toluene, or water, the mixed liquid obtained is applied or subjected to pressure bonding onto the current collector described below in detail, and then subjected to a heat treatment for about 2 hours at a temperature of about 50° C. to 250° C. to form a composite layer. For the method for the application, the liquid is preferably applied to have any thickness and any shape, for example, with the use of a means such as roller coating, e.g., an applicator roll, screen coating, a doctor blade method, spin coating, or a bar coater, but the method is not to be considered limited thereto.

As the current collector, current-collecting foil such as aluminum foil or copper foil can be used. Aluminum foil is preferable as the positive electrode current collector, and copper foil is preferable as the negative electrode current collector. The thickness of the current collector is preferably 10 µm or more and 30 µm or less. The thickness of the composite layer is preferably 40 µm or more and 150 µm or less (excluding the thickness of the current collector).

<Nonaqueous Electrolyte>

The nonaqueous electrolyte for use in the nonaqueous electrolyte secondary battery according to the present embodiment is not to be considered limited, and usable are electrolytes that are typically proposed for use in lithium batteries and the like.

Examples of the nonaqueous solvent for use in the nonaqueous electrolyte include cyclic carbonates such as a propylene carbonate, an ethylene carbonate, a butylene carbonate, and a chloroethylene carbonate, or fluorides thereof; cyclic esters such as γ-butyrolactone and γ-valerolactone; chain carbonates such as a dimethyl carbonate, a diethyl carbonate, and an ethyl methyl carbonate; chain esters such as a methyl formate, a methyl acetate, and a methyl butyrate; tetrahydrofuran or derivatives thereof; ethers such as 1,3-dioxane, 1,4-dioxane, 1,2-dimethoxyethane, 1,4-dibutoxyethane, and methyldiglyme; nitriles such as acetonitrile and benzonitrile; dioxolane or derivatives thereof; and ethylene sulfides or derivatives thereof, alone or as a mixture of two or more thereof.

The nonaqueous electrolyte according to the first embodiment preferably includes a fluorinated cyclic carbonate particularly as a nonaqueous solvent. The use of a nonaqueous electrolyte including a fluorinated cyclic carbonate for the nonaqueous solvent allows the AC resistance after storage to be kept from being increased. Examples of the fluorinated cyclic carbonate include 4-fluoroethylene carbonate, 4,4-difluoroethylene carbonate, 4,5-difluoroethylene carbonate, and 4,4,5-trifluoroethylene carbonate. Among them, 4-fluoroethylene carbonate (FEC) is preferably used in terms of the ability to suppress the battery swelling due to gas generation in the battery.

The content of the fluorinated cyclic carbonate is preferably 3% or higher and 30% or lower, and more preferably 5% or higher and 25% or lower in terms of volume ratio in the nonaqueous solvent.

Furthermore, a compound having an oxalate group bonded to boron is preferably added to the nonaqueous electrolyte according to the first embodiment. The compound having an oxalate group bonded to boron has the effect of reducing the initial AC resistance, and makes it possible to improve the power characteristics of a nonaqueous electrolyte secondary battery with a lithium-excessive active material for the positive electrode.

Examples of the compound having an oxalate group bonded to boron include lithium bisoxalate borate (LiBOB), lithium difluoro(oxalato)borate (LiDFOB), and (3-methyl-2,4-pentanedionato)oxalatoborate (MOAB). Here are the chemical structural formulas of the compounds having each oxalate group.

[Chemical Formula 1]

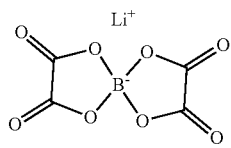

lithium bisoxalate borate (LiBOB)

[Chemical Formula 2]

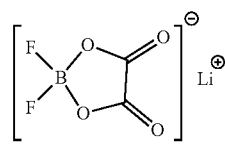

lithium difluoro(oxalato)borate (LiDFOB)

[Chemical Formula 3]

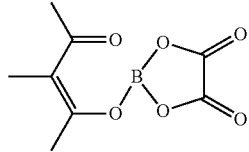

(3-methyl-2,4-pentanedionato)oxalatoborate (MOAB)

The lower limit of the amount of the added compound having an oxalate group bonded to boron is, based on the total mass of the constituents other than the electrolyte salt constituting the nonaqueous electrolyte, preferably 0.1% by mass or higher, and more preferably 0.2% by mass or higher, for improving the charge-discharge cycle performance, and the upper limit thereof is preferably 2.0% by mass or lower, and more preferably 1.0% by mass or lower, for reducing the possibility of increase in resistance.

<Method for Measuring Initial AC Resistance>

In this specification, the initial AC resistance is measured under the following conditions. The measurement is intended for a nonaqueous electrolyte secondary battery for factory shipment, which has been subjected to electrolyte solution filling and initial charge-discharge. Prior to the measurement, the battery is charged with electricity and discharged at 25° C. with a current of 0.1C in a predetermined voltage range, and then left as an open circuit for 2 hours or longer. The foregoing operation brings the nonaqueous electrolyte secondary battery into a full discharge state. The resistance value between the positive and negative electrode terminals is measured with the use of an impedance meter configured to apply an alternating current (AC) of 1 kHz, and regarded as an "initial AC resistance (mΩ)". Any overcharged or overdischarged nonaqueous electrolyte secondary battery is not allowed to be subjected to the measurement.

<Method for Measuring AC Resistance after Storage>

In this specification, the storage test and the measurement of the AC resistance after the storage are performed under the following conditions. The nonaqueous electrolyte secondary battery is charged with electricity at 0.1C at 25° C. up to a predetermined voltage, and then brought into a full charge state. Thereafter, the battery is left at 45° C. for 15 days. Next, after constant current discharge with a current of 0.2C to a predetermined voltage, the battery is left as an open circuit for 2 hours or more. The foregoing operation brings the nonaqueous electrolyte secondary battery into a full discharge state. The resistance value between the positive and negative electrode terminals is measured at 25° C. with the use of an impedance meter configured to apply an alternating current (AC) of 1 kHz. Any overcharged or overdischarged nonaqueous electrolyte secondary battery is not allowed to be subjected to the measurement.

Additives typically for use in nonaqueous electrolytes may be added to the nonaqueous electrolyte without impairing the effects of the present invention. For example, overcharge inhibitors, e.g., aromatic compounds such as biphenyl, alkylbiphenyl, terphenyl, partially hydrogenated terphenyl, cyclohexylbenzene, t-butylbenzene, t-amylbenzene, diphenyl ether, and dibenzofuran; partially fluorinated compounds of the above-mentioned aromatic compounds, such as 2-fluorobiphenyl, o-cyclohexylfluorobenzene, and p-cyclohexylfluorobenzene; fluorine-containing anisole compounds such as 2,4-difluoroanisole, 2,5-difluoroanisole, 2,6-difluoroanisole, and 3,5-difluoroanisole; negative electrode film forming agents such as vinylene carbonate, methyl vinylene carbonate, ethyl vinylene carbonate, succinic anhydride, glutaric anhydride, maleic anhydride, citraconic anhydride, glutaconic anhydride, itaconic anhydride, and cyclohexanedicarboxylic anhydride; ethylene sulfite, propylene sulfite, dimethyl sulfite, propane sultone, propene sultone, butane sultone, methyl methanesulfonate, busulfan, methyl toluene sulfonate, dimethyl sulfate, ethylene sulfate, sulfolane, dimethyl sulfone, diethyl sulfone, dimethylsulfoxide, diethylsulfoxide, tetramethylenesulfoxide, diphenyl sulfide, 4,4'-bis(2,2-dioxo-1,3,2-dioxathiolane, 4-methylsulfonyloxymethyl-2,2-dioxo-1,3,2-dioxathiolane, thioanisole, diphenyl disulfide, dipyridinium disulfide, perfluorooctane, tristrimethylsilyl borate, tristrimethylsilyl phosphate, tetrakistrimethylsilyl titanate, lithium monofluorophosphate, and lithium difluorophosphate can be added alone to the nonaqueous electrolyte, or two or more thereof can be added thereto in combination.

The amounts of these additives added in the nonaqueous electrolyte are not particularly limited, but are each, with respect to all of the constituents other than the electrolyte salt constituting the nonaqueous electrolyte, preferably 0.01% by mass or higher, more preferably 0.1% by mass or higher, and further preferably 0.2% by mass or higher, and the upper limits thereof are preferably 5% by mass or lower, more preferably 3% by mass or lower, and further preferably 2% by mass or lower. Examples of the purpose of adding these additives include the improved charge-discharge efficiency, suppressed increase in resistance, suppressed battery swelling, and the improved charge-discharge cycle performance.

Examples of the electrolyte salt for use in the nonaqueous electrolyte include inorganic ion salt containing one of lithium (Li), sodium (Na), or potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN, and organic ionic salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $C_2H_5)_4N$-phthalate, lithium stearyl sulfonate, lithium octyl sulfonate, and lithium dodecylbenzene sulfonate, and these ionic compounds can be used alone, or two or more thereof can be used in mixture.

Furthermore, the use of $LiPF_6$ or $LiBF_4$ and a lithium salt having a perfluoroalkyl group such as $LiN(C_2F_5SO_2)_2$ in mixture makes it possible to further decrease the viscosity of the electrolyte, thus allowing the low-temperature characteristics to be further improved, and allowing self discharge to be suppressed, which is more preferable.

Further, an ambient temperature molten salt or an ionic liquid may be used as the nonaqueous electrolyte.

The concentration of the electrolyte salt in the nonaqueous electrolyte is preferably 0.1 mol/L or more and 5 mol/L or less, and further preferably 0.5 mol/L or more and 2.5 mol/L or less, for reliably obtaining a nonaqueous electrolyte secondary battery with improved battery characteristics.

<Separator>

As the separator for use in the nonaqueous electrolyte secondary battery according to the present embodiment, porous membranes, nonwoven fabrics, and the like that show excellent high rate discharge performance are preferably used either alone or in combination. Examples of the material constituting the separator for the nonaqueous electrolyte secondary battery include polyolefin-based resins typified by polyethylene and polypropylene, polyester-based resins typified by polyethylene terephthalate and polybutylene terephthalate, polyvinylidene fluoride, vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

From the viewpoint of strength, the porosity of the separator is preferably 98% by volume or lower. In addition, from the viewpoint of charge-discharge characteristics, the porosity is preferably 20% by volume or higher.

In addition, for example, a polymer gel composed of a polymer such as acrylonitrile, ethylene oxide, propylene oxide, methyl methacrylate, vinyl acetate, vinylpyrrolidone, or polyvinylidene fluoride and a nonaqueous electrolyte may be used for the separator. The use of the nonaqueous electrolyte in the gel state as mentioned above is preferable in terms of the effect of preventing liquid leakage.

Furthermore, for the separator, the use of the porous membrane, non-woven fabric, or the like as mentioned above in combination with the polymer gel is preferable because the liquid retention of the nonaqueous electrolyte is improved. More specifically, a film coated with a solvophilic polymer of several µm or less in thickness is formed on the surface of the polyethylene microporous membrane and the micropore wall surface, and the nonaqueous electrolyte is held in the micropores of the film, thereby gelling the solvophilic polymer.

Examples of the solvophilic polymer include polyvinylidene fluoride, as well as polymers obtained by crosslinking an acrylate monomer having an ethylene oxide group or an ester group, an epoxy monomer, a monomer having an isocyanate group, or the like. The monomer can be, with the use of a radical initiator in combination, subjected to a crosslinking reaction by heating or with the use of ultraviolet rays (UV) or an active light beam such as an electron beam (EB).

Other constituent elements of the battery include a terminal, an insulating plate, and a battery case, and for these components, components that have been conventionally used are allowed to be used as they are.

<Nonaqueous Electrolyte Secondary Battery>

Figure 10:
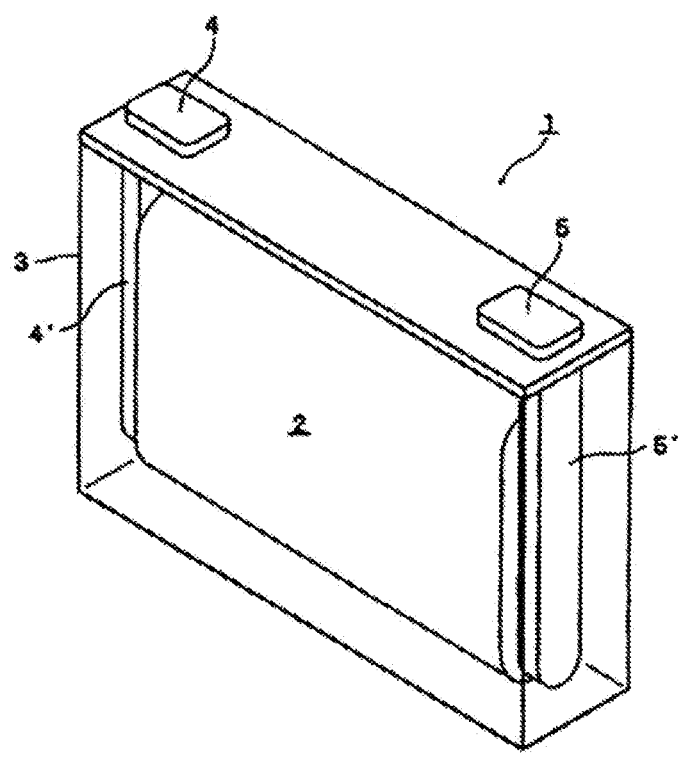
FIG. 10 is an external perspective view illustrating a nonaqueous electrolyte secondary battery according to an embodiment of the present invention.

The nonaqueous electrolyte secondary battery according to the present embodiment is shown in FIG. 10. FIG. 10 is a perspective view of the inside seen through a case of a rectangular nonaqueous electrolyte secondary battery. The nonaqueous electrolyte secondary battery 1 is assembled by injecting the nonaqueous electrolyte (electrolyte solution) into the battery case 3 with an electrode group 2 housed therein. The electrode group 2 is formed by winding a positive electrode including a positive active material and a negative electrode including a negative active material with a separator interposed therebetween. The positive electrode is electrically connected to a positive electrode terminal 4 through a positive electrode lead 4', and the negative electrode is electrically connected to a negative electrode terminal 5 through a negative electrode lead 5'.

The shape of the nonaqueous electrolyte secondary battery according to the present embodiment is not to be considered particularly limited, and examples thereof include a cylindrical battery, a prismatic battery (rectangular battery), and a flattened battery.

The nonaqueous electrolyte secondary battery is typically completed through electrolyte solution filling, sealing, and then charge-discharge more than once in the factory, and shipped.

The nonaqueous electrolyte secondary battery according to the present embodiment is shipped without being once charged with electricity until completing the charging process in which the region with flat potential change is observed within the positive electrode potential range of 4.5 (vs. Li/Li$^+$) or higher and 5.0 V (vs. Li/Li$^+$) or lower in the initial charge-discharge (manufacturing step) before shipment from the factory.

The fact that the nonaqueous electrolyte secondary battery according to the present embodiment has no history of charge with electricity until completing the charge process in which the flat region is observed can be confirmed by the observed diffraction peak of the positive active material of the battery in the range of 20° or more and 22° or less in the X-ray diffraction pattern obtained with the use of a CuKα line, or the observed region with flat potential change with respect to the amount of charge within the positive electrode potential range of 4.5 V (vs. Li/Li$^+$) or higher and 5.0 V (vs. Li/Li$^+$) or lower in the case where the battery is charged with electricity up to a positive electrode potential of 5.0 V (vs. Li/Li$^+$). These methods for the confirmation have details as mentioned above.

Further, in the third embodiment, the amount of charge per volume in the overcharge region is increased with the above-mentioned region with flat potential change, and no sudden increase in battery voltage is observed until reaching a higher SOC.

<Method for Calculation of Discharge Capacity Per Volume and Amount of Charge>

Figure 11:
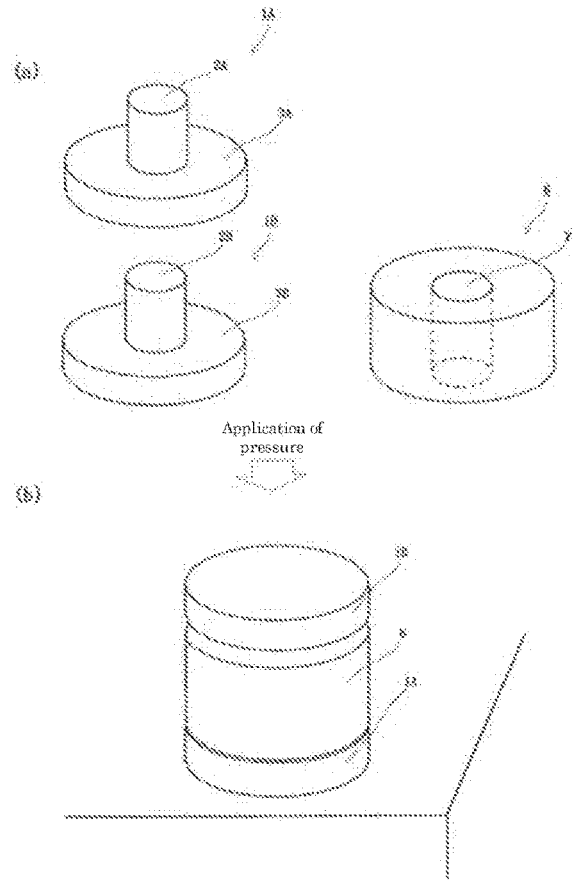
FIG. 11 is a conceptual diagram of a device used for measurement of a press density for calculating the discharge capacity per unit volume and the amount of charge.

Here are conditions for press density measurement in this specification. The measurement is performed in the atmosphere at room temperature of 20° C. or higher and 25° C. lower. FIG. 11 shows a conceptual diagram of the device used for the measurement of the press density. Prepared is a pair of measurement probes 1A and 1B. The measuring probes 1A and 1B have measurement surfaces 2A and 2B each obtained by flattening one end of a cylinder made of stainless steel (SUS304) with a diameter of 8.0 mm (±0.05 mm), with the other ends of the cylinders fixed vertically to bases 3A and 3B made of stainless steel. Prepared is a side body 6 provided, in the center of the acrylic cylinder, with a through hole 7 adjusted in terms of inner diameter and polished such that the stainless steel cylinder can naturally descend slowly in the air due to gravity. The upper and lower surfaces of the side body 6 are smoothed by polishing.

One of the measurement probes, the measurement probe 1A is placed on a flat desk such that the measurement surface 2A faces upward, and the cylindrical part of the measurement probe 1A is inserted into the through hole 7 of the side body 6 so as to cover the side body 6 from above. The other measurement probe 1B is inserted from above the through hole 7 with the measurement surface 2B facing down, and the distance between the measurement surfaces 2A and 2B is set to zero. In this regard, the distance between the base 3B of the measurement probe 1B and the base 3A of the measurement probe 1A is measured with the use of a caliper.

Next, the measurement probe 1B is pulled out, 0.3 g of a sample powder to be measured (positive active material powder) is input from above the through-hole 7 with a medicine spoon, and again, the measurement probe 1B is inserted from above the through hole 7 with the measurement surface 2B facing down. With the use of a manual hydraulic press equipped with a pressure gauge, pressure is applied from above the measurement probe 1B until the pressure scale of the press reaches a value from which the pressure applied to the active material is calculated to be 40 MPa. It is be noted that after the scale reaches the numerical value, no additional pressure is applied even if the value indicated by the scale is decreased. Thereafter, in this state, the distance between the base 3B of the measurement probe 1B and the base 3A of the measurement probe 1A is measured again with the use of a caliper. The density of the sample to be measured under pressure is calculated from the difference (cm) from the distance before the input of the sample to be measured, the area (0.5024 cm$^2$) of the measurement surface, and the input amount (0.3 g) of the sample to be measured, and defined as the press density (g/cm$^3$). It is to be noted that the pressure applied to the active material is calculated from the relation between the area of contact with the jig and the area of the measurement surface (the area of contact with the powder).

The press density of the positive active material powder, measured as mentioned above, is multiplied by the discharge capacity per mass and the amount of charge to calculate the discharge capacity per volume and the amount of charge.

Figure 12:
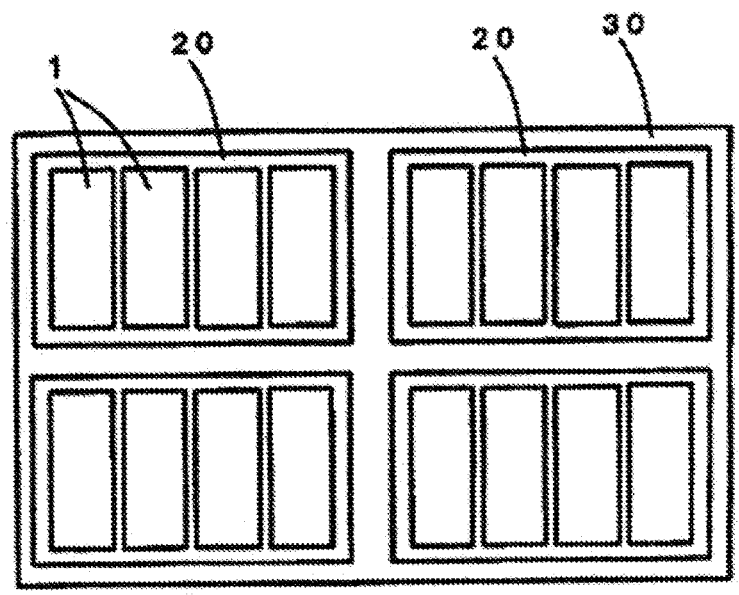
FIG. 12 is a schematic diagram illustrating an energy storage apparatus including a plurality of nonaqueous electrolyte secondary batteries according to the embodiment of the present invention.

The nonaqueous electrolyte secondary battery according to the present embodiment can also be achieved as an energy storage apparatus with a plurality of batteries assembled. FIG. 12 shows an example of the energy storage apparatus. In FIG. 12, the energy storage apparatus 30 includes a plurality of energy storage units 20. Each of the energy storage units 20 includes a plurality of nonaqueous electrolyte secondary batteries 1. The energy storage apparatus 30 can be mounted as a power source for vehicles such as electric vehicles (EV), hybrid vehicles (HEV), and plug-in hybrid vehicles (PHEV).

The nonaqueous electrolyte secondary battery according to the present embodiment is assumed to be manufactured without undergoing any charge process until the completion of the overcharge region mentioned above, and used without undergoing any charge with electricity until the completion of the overcharge region. The charge voltages in the charge process during the manufacture and in use are preferably set such that the maximum attainable potential reached by the positive electrode through the charge, that is, the charge upper limit potential, is equal to or lower than the potential at which the overcharge region starts. The charge upper limit potential in the initial charge-discharge step and the charge upper limit potential in use are preferably lower than 4.5 V (vs. Li/Li$^+$). The charge upper limit potential can be, for example, 4.40 V (vs. Li/Li$^+$). The charge upper limit potential may be 4.38 V (vs. Li/Li$^+$), 4.36 V (vs. Li/Li$^+$), 4.34 V (vs. Li/Li$^+$), or 4.32 V (vs. Li/Li$^+$).

EXAMPLES

Experimental Example 1

Example 1-1

<Preparation of Lithium-Transition Metal Composite Oxide>

A nickel sulfate hexahydrate, a cobalt sulfate heptahydrate, and a manganese sulfate pentahydrate were weighed respectively to 284 g, 303 g, and 443 g, and the total of these hydrates was dissolved in 4 L of ion-exchange water to prepare a 1.0 M aqueous solution of sulfates with a molar ratio Ni:Co:Mn of 27:27:46.

Next, 2 L of ion-exchange water was poured into a 5 L reaction tank, and bubbled with an argon gas for 30 minutes to remove oxygen contained in the ion-exchange water. The temperature of the reaction tank was set to 50° C. (±2° C.), such that sufficient convection in the reaction tank was generated, while stirring the inside of the reaction tank at a rotation speed of 1500 rpm with the use of a paddle blade equipped with a stirring motor. The aqueous sulfate solution was delivered by drops to the reaction tank at a rate of 3 mL/min. In this regard, between the start of the dropping and the end thereof, a mixed alkaline aqueous solution composed of a 4.0 M sodium hydroxide, a 0.5 M ammonia, and a 0.2 M hydrazine was appropriately delivered by drops, thereby controlling the pH in the reaction tank to be always kept at 9.8 (±0.1), and the reaction liquid was partially discharged by overflow thereof, thereby controlling the total amount of the reaction liquid always not to exceed 2 L. After the completion of the dropping, stirring in the reaction tank was continued for another 3 hours. After stopping the stirring, the reaction tank was left at room temperature for 12 hours or longer.

Next, the hydroxide precursor particles produced in the reaction tank were separated with the use of a suction filtration device, sodium ions adhering to the particles were further washed away with the use of ion-exchange water, and with the use of an electric furnace, the particles were dried in an air atmosphere at 80° C. for 20 hours under ordinary pressure. Then, the powder was crushed for several minutes in an automatic agate mortar to make the particle sizes uniform. In this manner, a hydroxide precursor was prepared.

To 1.852 g of the hydroxide precursor, 0.971 g of a lithium hydroxide monohydrate was added, and mixed well with the use of an automatic agate mortar to prepare a mixed powder such that the molar ratio of Li:(Ni, Co, Mn) was 130:100. With the use of a pellet molding machine, the powder was subjected to molding at a pressure of 6 MPa to obtain pellets of 25 mm in diameter. The amount of the mixed powder subjected to the pellet molding was determined by converting the amount such that the assumed mass of the final product was 2 g. One of the pellets was placed on an alumina boat with a total length of about 100 mm, and the boat was placed in a box-type electric furnace (model number: AMF20), and subjected to a temperature increase from ordinary temperature to 900° C. over 10 hours, and then to firing at 900° C. for 5 hours, under ordinary pressure in an air atmosphere. The internal dimensions of the box-type electric furnace are 10 cm in length, 20 cm in width, and 30 cm in depth, with heating wires inserted at intervals of 20 cm in the width direction. After the firing, the electric furnace was turned off, and the alumina boat was naturally cooled with the boat left in the furnace. As a result, the furnace temperature drops to about 200° C. after 5 hours, but the rate of the subsequent temperature decrease is rather slow. After all night and all day, the pellet was taken out after confirming that the temperature of the furnace was 100° C. or lower, and lightly crushed in an agate mortar to make the particle sizes uniform.

In this manner, a lithium-transition metal composite oxide $Li_{1.13}Ni_{0.235}Co_{0.235}Mn_{0.40}O_2$ was prepared.

<Confirmation of Crystal Structure>

The lithium-transition metal composite oxide was subjected to powder X-ray diffraction measurement with the use of an X-ray diffractometer (from Rigaku, model name: MiniFlex II), and was confirmed to have an $\alpha$-NaFeO$_2$-type crystal structure.

<Preparation of Positive Electrode>

With N-methylpyrrolidone as a dispersion medium, the lithium-transition metal composite oxide (hereinafter, referred to as "LR") as an active material, a positive electrode paste for application was prepared in which the active material, acetylene black (AB), and polyvinylidene fluoride (PVdF) were mixed and dispersed in proportions of 90:5:5. The positive electrode paste for application was applied on one surface of an aluminum foil current collector with a thickness of 20 μm, dried and then pressed to prepare a positive electrode according to Example 1-1.

<Preparation of Negative Electrode>

Metallic lithium foil was disposed on a nickel current collector to prepare a negative electrode. The amount of metallic lithium was adjusted such that the capacity of the battery was not limited by the negative electrode in combination with the positive electrode.

<Assembly of Nonaqueous Electrolyte Secondary Battery>

A nonaqueous electrolyte secondary battery was assembled in accordance with the following procedure with the use of the positive electrode according to Example 1-1.

As a nonaqueous electrolyte, a product was used that was obtained by adding 0.5% by mass of lithium difluorophosphate (LiDFP) and 1% by mass of 4,4'-bis(2,2-dioxo-1,3,2-dioxathiolane) (compound A) as additives to 100% by mass of a solution in which LiPF$_6$ was dissolved to a concentration of 1 mol/L in a mixed solvent of 4-fluoroethylene carbonate (FEC)/propylene carbonate (PC)/ethyl methyl carbonate (EMC) with a volume ratio of 1:1:8.

As the separator, a polypropylene microporous membrane surface-modified with polyacrylate was used. A metal-resin composite film composed of polyethylene terephthalate (15 μm)/aluminum foil (50 μm)/metal-adhesive polypropylene film (50 μm) was used for the outer case. A nonaqueous electrolyte secondary battery was assembled by housing, in the outer case, the positive electrode according to Example 1-1 and the negative electrode with the separator interposed therebetween such that the open ends of the positive electrode terminal and negative electrode terminal were exposed to the outside, hermetically sealing the sealing body with metal-adhesive polypropylene surfaces of the metal-resin composite film being opposed to each other, except for a part for an injection hole, nonaqueous electrolyte solution filling, and then sealing the injection hole.

<Initial Charge-Discharge Step>

The assembled nonaqueous electrolyte secondary battery was subjected to an initial charge-discharge step at 25° C. The charge was constant current constant voltage (CCCV) charge with a current of 0.1C and a cutoff voltage of 4.25 V, and the charge termination condition was the time when the current value was attenuated to 1/6. The discharge was constant current discharge with a current of 0.1C and a cutoff voltage of 2.0 V. This charge-discharge was performed twice. In this regard, a pause step of 30 minutes was provided after each of charge and discharge. It is to be noted that in the case where the negative electrode material is metallic lithium, the positive electrode potential and the battery voltage have almost the same value, and thus, the positive electrode potential in the following procedure can be read as the battery voltage of the test battery. It is known that in the case where the counter electrode is graphite, the potential of the positive electrode is determined by adding about 0.1 V to the battery voltage in consideration of the potential of graphite.

Through the above-mentioned manufacturing steps, the nonaqueous electrolyte secondary battery according to Example 1-1 was finished.

Comparative Example 1-1

Similarly to Example 1-1 except for the use of commercially available $LiNi_{0.5}Co_{0.2}Mn_{0.3}O_2$ (hereinafter, referred to as "NCM523") as the positive active material, a nonaqueous electrolyte secondary battery was assembled and subjected to initial charge-discharge, thereby finishing a nonaqueous electrolyte secondary battery according to Comparative Example 1-1.

Comparative Example 1-2

A nonaqueous electrolyte secondary battery was assembled similarly to Example 1-1, and subjected to the same initial charge-discharge step as in Example 1-1 except that only the first charge in the initial charge-discharge step was constant current constant voltage (CCCV) charge with a cutoff voltage of 4.6 V, thereby finishing a nonaqueous electrolyte secondary battery according to Comparative Example 1-2.

Example 1-2

In 200 mL of 0.1 M aluminum sulfate aqueous solution, 358 g of lithium-transition metal composite oxide $Li_{1.13}Ni_{0.235}Co_{0.235}Mn_{0.40}O_2$ prepared in Example 1-1 was input, and stirred at 25° C. and 400 rpm for 30 seconds with the use of a magnetic stirrer. Thereafter, the solution was separated by suction filtration into a powder and a filtrate. The obtained powder was dried in the atmosphere at 80° C. for 20 hours. Furthermore, the powder was subjected to a heat treatment for 4 hours in the atmosphere at 400° C. with the use of the box-type electric furnace described above. In this manner, a lithium-transition metal composite oxide coated with an aluminum compound (hereinafter referred to as "LR-Al") was prepared. Similarly to Example 1-1 except for the use of this lithium-transition metal composite oxide as the positive active material, a nonaqueous electrolyte secondary battery was assembled and subjected to initial charge-discharge, thereby finishing a nonaqueous electrolyte secondary battery according to Example 1-2.

<Confirmation of X-Ray Diffraction Peak of Positive Active Material>

With the use of the positive composites collected in accordance with the procedure and conditions described above from the nonaqueous electrolyte secondary batteries according to Example 1-1 and Comparative Example 1-2 after the initial charge-discharge, X-ray diffraction measurement was performed under the conditions described above. It has been confirmed that the positive active material according to Example 1-1 has a diffraction peak observed in the range of 20° or more and 22° or less in the X-ray diffraction pattern obtained with a CuKα line (see the lower part of FIG. 3), whereas the positive active material according to Comparative Example 1-2 has no diffraction peak observed in the range of 20° or more and 22° or less (see the upper part of FIG. 3).

<Overcharge Test>

With the use of the nonaqueous electrolyte secondary batteries according to the examples and comparative examples, constant current (CC) charge was performed at a current value of 10 mA per 1 g of the positive composite without setting the upper limit of the battery voltage. This charge corresponds to third charge when the initial charge-discharge is included. In this regard, Y/X*100 defined by the capacity X (mAh) at the time of reaching 4.45 V from the start of the charge and the capacity Y (mAh) at each voltage was referred to as a capacity ratio Z (%), and the capacity ratio Z (%) obtained when the positive electrode potential rose suddenly to cause the voltage to reach 5.1 V was recorded as a "retardation effect". In addition, the maximum value of dZ/dV was obtained.

Table 1 shows the delay effect (%) in the overcharge test of the nonaqueous electrolyte secondary batteries according to Examples 1-1 and 1-2 and Comparative Examples 1-1 and 1-2, and the maximum value of dZ/dV.

potential rose suddenly at Z of 135% to cause the voltage to reach 5.1 V in the overcharge test. This is related to the fact that, in the overcharge test, the positive electrode of the nonaqueous electrolyte secondary battery according to Comparative Example 1-1 has no observed region with flat potential change with respect to the amount of charge within the positive electrode potential range of 4.5 V (vs. Li/Li$^+$) or higher and 5.0 V (vs. Li/Li$^+$) or lower (the maximum dZ/dV value is less than 150), in the case of the battery charged with electricity without setting the upper limit of the voltage.

Furthermore, the nonaqueous electrolyte secondary battery according to Comparative Example 1-2 includes the positive electrode obtained with a lithium-excessive active material, but has an observed sudden increase in positive electrode potential at Z of 130% in the overcharge test, and thus also has an inadequate retardation effect. This is related to the fact that, because of the battery charged with electricity to cause the positive electrode potential to reach 4.6 V (vs. Li/Li$^+$) in the initial charge-discharge step, the positive electrode of the nonaqueous electrolyte secondary battery according to Comparative Example 1-2 has, in the overcharge test, no observed region with flat potential change with respect to the amount of charge within the positive electrode potential range of 4.5 V (vs. Li/Li$^+$) or higher and 5.0 V (vs. Li/Li$^+$) or lower (the maximum dZ/dV value is less than 150), in the case of the battery charged with electricity without setting the upper limit of the voltage.

In contrast, the nonaqueous electrolyte secondary batteries according to Examples 1-1 and 1-2, each including the positive electrode obtained with a lithium-excessive active material, and subjected to the initial charge-discharge step at a potential of lower than 4.5 V (vs. Li/Li$^+$), have excellent retardation effects as compared with Comparative Examples 1-1 and 1-2. This is related to the fact that the positive electrodes of the nonaqueous electrolyte secondary batteries according to Examples 1-1 and 1-2 has no observed region with flat potential change with respect to the amount of charge within the positive electrode potential range of 4.5 V (vs. Li/Li$^+$) or higher and 5.0 V (vs. Li/Li$^+$) or lower (the maximum dZ/dV value is less than 150).

Next, nonaqueous electrolyte batteries were prepared by changing the compositions of the nonaqueous electrolytes with respect to Example 1-1 or 1-2.

Example 1-3

Similarly to Example 1-1 except that the solvent of the nonaqueous electrolyte was changed to a mixed solvent composed of ethylene carbonate (EC)/propylene carbonate (PC)/ethyl methyl carbonate (EMC) with a volume ratio of

TABLE 1

| | Active Material | First Charge Voltage/V | Second Charge Voltage/V | Solvent | Volume Ratio of Solvent | Retardation Effect/% | Maximum Value of dZ/dV |
|---|---|---|---|---|---|---|---|
| Comparative Example 1-1 | NMC523 | 4.25 | 4.25 | FEC/PC/EMC | 10/10/80 | 135 | 83 |
| Comparative Example 1-2 | LR | 4.6 | 4.25 | FEC/PC/EMC | 10/10/80 | 130 | 67 |
| Example 1-1 | LR | 4.25 | 4.25 | FEC/PC/EMC | 10/10/80 | 194 | 417 |
| Example 1-2 | LR-Al | 4.25 | 4.25 | FEC/PC/EMC | 10/10/80 | 176 | 566 |

According to Table 1, the nonaqueous electrolyte secondary battery according to Comparative Example 1-1 including a positive electrode obtained with NCM523 has an inadequate retardation effect, because the positive electrode 25:5:70, a nonaqueous electrolyte secondary battery was assembled and subjected to initial charge-discharge, thereby finishing a nonaqueous electrolyte secondary battery according to Example 1-3.

Example 1-4

Similarly to Example 1-1 except that the solvent of the nonaqueous electrolyte was changed similarly to Example 1-3, with vinylene carbonate (VC) further added as an additive at 0.2% by mass based on the mass of the nonaqueous electrolyte, a nonaqueous electrolyte secondary battery was assembled and subjected to initial charge-discharge, thereby finishing a nonaqueous electrolyte secondary battery according to Example 1-4.

Example 1-5

Similarly to Example 1-1 except that the solvent of the nonaqueous electrolyte was changed to a mixed solvent with a volume ratio FEC/EMC of 20:80, a nonaqueous electrolyte secondary battery was assembled and subjected to initial charge-discharge, thereby finishing a nonaqueous electrolyte secondary battery according to Example 1-5.

Example 1-6

Similarly to Example 1-1 except that the solvent of the nonaqueous electrolyte was changed to a mixed solvent with a volume ratio FEC/EMC of 5:95, a nonaqueous electrolyte secondary battery was assembled and subjected to initial charge-discharge, thereby finishing a nonaqueous electrolyte secondary battery according to Example 1-6.

Examples 1-7 and 1-8

Similarly to Examples 1-3 and 1-4 except that the positive active material was changed to the lithium-transition metal composite oxide (LR-Al) coated with the aluminum compound, prepared in Example 1-2, nonaqueous electrolyte secondary batteries were assembled and subjected to initial charge-discharge, thereby respectively finishing nonaqueous electrolyte secondary batteries according to Examples 1-7 and 1-8.

<Storage Test>

The nonaqueous electrolyte secondary batteries according to Examples 1-1 to 1-8 were subjected to initial AC resistance measurement under the above-mentioned conditions. Thereafter, a storage test was performed under the above-mentioned conditions, and the AC resistance after the storage was measured. The increase rate (%) of the AC resistance after the storage with respect to the initial AC resistance was referred to as "Resistance increase rate on the $15^{th}$ day with respect to initial value". Table 2 shows the resistance increase rates (%) on the $15^{th}$ day with respect to the initial stages of the nonaqueous electrolyte secondary batteries according to Examples 1-1 to 1-8.

According to Table 2, it is determined that among Examples 1-1 and 1-3 to 1-6 with LR as the positive active materials, the increase in AC resistance after the storage is more suppressed in the nonaqueous electrolyte secondary batteries with the nonaqueous electrolytes containing FEC according to Examples 1-1, 1-5, and 1-6 than the nonaqueous electrolyte secondary batteries with the nonaqueous electrolytes containing no FEC according to Examples 1-3 and 1-4. In addition, it is determined that among Examples 1-2, 1-7, and 1-8 with LR-Al as the positive active materials, the increase in AC resistance after the storage is also more suppressed in the nonaqueous electrolyte secondary battery with the nonaqueous electrolyte containing FEC according to Example 1-2 than the nonaqueous electrolyte secondary batteries with the nonaqueous electrolytes containing no FEC according to Examples 1-7 and 1-8.

Next, an example of changing the additive of the nonaqueous electrolyte will be presented.

Example 1-9

As a nonaqueous electrolyte, a product was used that was obtained by adding 1.0% by mass of the compound A alone as an additive to 100% by mass of a solution in which $LiPF_6$ was dissolved to a concentration of 1 mol/L in a mixed solvent of ethylene carbonate (EC)/propylene carbonate (PC)/ethyl methyl carbonate (EMC) with a volume ratio of 25:5:70.

With the use of graphite as a negative active material, a negative electrode paste for application, including graphite, a styrene-butadiene rubber (SBR), and a carboxymethyl cellulose (CMC) with graphite:SBR:CMC=97:2:1 in ratio by mass (in terms of solid content) with water as a solvent, was prepared, applied to one surface of a strip-shaped copper foil current collector with a thickness of 10 µm, and dried. After applying pressure to this paste with a roller press, the paste was dried under reduced pressure at 100° C. for 12 hours to remove moisture in the plate. In this manner, a negative electrode was prepared.

Similarly to Example 1-3 except for the use of the nonaqueous electrolyte and negative electrode mentioned above, a nonaqueous electrolyte secondary battery was assembled and subjected to initial charge-discharge, thereby finishing a nonaqueous electrolyte secondary battery according to Example 1-9. It is to be noted that in the case of constant current constant voltage (CCCV) charge with a cutoff voltage of 4.25 V for the first charge and the second charge in the initial charge-discharge step, the potential of the graphite negative electrode in the full charge state is

TABLE 2

| | Active Material | First Charge Voltage/V | Second Charge Voltage/V | Solvent | Volume Ratio of Solvent | Additive Amount of VC/mass % | Resistance Increase Rate on 15th day with respect to Initial Value/% |
|---|---|---|---|---|---|---|---|
| Example 1-1 | LR | 4.25 | 4.25 | FEC/PC/EMC | 10/10/80 | 0.0 | 14 |
| Example 1-3 | LR | 4.25 | 4.25 | EC/PC/EMC | 25/5/70 | 0.0 | 18 |
| Example 1-4 | LR | 4.25 | 4.25 | EC/PC/EMC | 25/5/70 | 0.2 | 20 |
| Example 1-5 | LR | 4.25 | 4.25 | FEC/EMC | 20/80 | 0.0 | 10 |
| Example 1-6 | LR | 4.25 | 4.25 | FEC/EMC | 5/95 | 0.0 | 11 |
| Example 1-2 | LR-Al | 4.25 | 4.25 | FEC/PC/EMC | 10/10/80 | 0.0 | 17 |
| Example 1-7 | LR-Al | 4.25 | 4.25 | EC/PC/EMC | 25/5/70 | 0.0 | 30 |
| Example 1-8 | LR-Al | 4.25 | 4.25 | EC/PC/EMC | 25/5/70 | 0.2 | 29 | about 0.1 V (vs. Li/Li$^+$), and the positive electrode potential reaches about 4.35 V (vs. Li/Li$^+$).

Examples 1-10 to 1-12

Nonaqueous electrolyte secondary batteries according to Examples 1-10 to 1-12 were respectively finished similarly to Example 1-9 except for adding, in place of 1.0% by mass of the compound A, 0.2% by mass, 0.5% by mass, and 1.0% by mass of LiDFOB along with 1.0% by mass of the compound A as an additive.

Examples 1-13, 1-14

Nonaqueous electrolyte secondary batteries according to Examples 1-13 and 1-14 were respectively prepared similarly to Example 1-11 except for changing, as an additive, the LiDFOB to LiBOB and MOAB.

Comparative Examples 1-3 to 1-6

Nonaqueous electrolyte secondary batteries according to Comparative Examples 1-3 to 1-6 were respectively prepared similarly to Examples 1-9, 1-11, 1-13, and 1-14 except that constant current constant voltage (CCCV) charge with a cutoff voltage of 4.5 V was employed for the first charge and the second charge in the initial charge-discharge step. It is to be noted that the potential of the graphite negative electrode in the full charge state in the initial charge-discharge step is about 0.1 V (vs. Li/Li$^+$), and the positive electrode potential reaches about 4.6 V (vs. Li/Li$^+$).

The initial AC resistances of the nonaqueous electrolyte secondary batteries according to Examples 1-9 to 1-14 and Comparative Examples 1-3 to 1-6 were measured to determine, as "Resistance increase-decrease rate/%", the increase-decrease rate of the initial AC resistance of the nonaqueous electrolyte secondary battery containing the additive to the initial AC resistance in the case of containing, as an additive, no compound having an oxalate group bonded to boron (the nonaqueous electrolyte secondary batteries according to Example 1-9 and Comparative Example 1-3). The results are shown in Table 3 below. It is to be noted that the "additive amount/mass %" in Table 3 refers to "the mass percentage of the additive amount of the compound having an oxalate group bonded to boron".

According to Table 3, it is determined that the nonaqueous electrolyte secondary batteries according to Examples 1-9 to 1-14, manufactured with the use of LR as the positive active material such that the maximum attainable potential of the positive electrode in the initial charge-discharge step is lower than 4.5 V (vs. Li/Li$^+$), have initial AC resistances reduced more than the nonaqueous electrolyte secondary batteries according to Comparative Examples 1-3 to 1-6, subjected to the initial charge-discharge such that the maximum attainable potential of the positive electrode is 4.5 V (vs. Li/Li$^+$) or higher. It is to be noted that the maximum attainable potentials of the positive electrodes of the nonaqueous electrolyte secondary batteries according to Comparative Examples 1-3 to 1-6 is about 4.6 V (vs. Li/Li$^+$) as mentioned above. Furthermore, it is determined that, among the examples, Examples 1-10 to 1-14 in which the nonaqueous electrolytes contain a compound having an oxalate group bonded to boron as an additive produce an effect of further reducing the initial AC resistance, as compared with Example 1-9 without the compound contained.

The nonaqueous electrolyte secondary batteries according to Comparative Examples 1-3 to 1-6 with, as the positive active material, the same LR in as in Examples 1-9 to 1-14 are manufactured through the step such that the maximum attainable potential of the positive electrode in the initial charge-discharge step is 4.5 V (vs. Li/Li$^+$) or higher, and the disappearance of the diffraction peak of the positive active material in the range of 20° or more to 22° or less is thus confirmed by the method for confirming the diffraction peak in accordance with the procedure described above. Furthermore, as compared with the nonaqueous electrolyte secondary batteries according to Examples 1-9 to 1-14, the nonaqueous electrolyte secondary battery according to each of the comparative examples has an increased initial AC resistance, and moreover, has a further increased initial AC resistance with the nonaqueous electrolyte containing, as an additive, the compound having an oxalate group bonded to boron, and it is thus determined that containing the compound has an adverse effect on the reduction in initial AC resistance.

Experimental Example 2

Experimental Example 2 is intended to show an example of the positive active material according to the second embodiment together with a comparative example.

TABLE 3

| | Active Material | First Charge Voltage/V | Second Charge Voltage/V | Compound having Oxalate Group | Additive Amount/ mass % | Initial AC Resistance/ mΩ | Resistance Increase- Decrease Rate/% |
|---|---|---|---|---|---|---|---|
| Example 1-9 | LR | 4.25 | 4.25 | — | 0.0 | 91.4 | — |
| Example 1-10 | LR | 4.25 | 4.25 | LIDFOB | 0.2 | 82.2 | −10.0 |
| Example 1-11 | LR | 4.25 | 4.25 | LIDFOB | 0.5 | 85.2 | −6.8 |
| Example 1-12 | LR | 4.25 | 4.25 | LIDFOB | 1.0 | 85.7 | −6.2 |
| Example 1-13 | LR | 4.25 | 4.25 | LiBOB | 0.5 | 87.2 | −4.5 |
| Example 1-14 | LR | 4.25 | 4.25 | MOAB | 0.5 | 86.2 | −5.6 |
| Comparative Example 1-3 | LR | 4.5 | 4.5 | — | 0.0 | 114.8 | — |
| Comparative Example 1-4 | LR | 4.5 | 4.5 | LIDFOB | 0.5 | 143.6 | 25.1 |
| Comparative Example 1-5 | LR | 4.5 | 4.5 | LiBOB | 0.5 | 147.3 | 28.4 |
| Comparative Example 1-6 | LR | 4.5 | 4.5 | MOAB | 0.5 | 129.5 | 12.9 |

Example 2-1

The lithium-transition metal composite oxide was prepared similarly to Example 1-1 mentioned above, thereby preparing a lithium-transition metal composite oxide $Li_{1.13}Ni_{0.235}Co_{0.235}Mn_{0.40}O_2$.

<Acid Treatment of Active Material>

To 200 mL of a citric acid aqueous solution with a hydrogen ion concentration of 0.05 M, 5.0 g of the lithium-transition metal composite oxide mentioned above was added, and with the aqueous solution temperature kept at 50° C., the mixture was stirred at 400 rpm for 2 hours with the use of a stir bar. After the stirring, the positive active material was filtered with the use of a suction device, further washed with ion-exchange water, and then dried overnight at 80° C. under ordinary pressure, thereby preparing an active material according to Example 2-1 with the lithium-transition metal composite oxide acid-treated. The BET specific surface area was 5.8 $m^2/g$.

Examples 2-2 and 2-3

Similarly to Example 2-1 except that the lithium-transition metal composite oxide was subjected to an acid treatment with the use of, in place of the citric acid, a boric acid aqueous solution with a hydrogen ion concentration of 0.05 M or a tartaric acid aqueous solution with a hydrogen ion concentration of 0.025 M, thereby preparing active materials according to Examples 2-2 and 2-3 were produced. The BET specific surface areas were respectively 4.6 $m^2/g$ and 5.5 $m^2/g$.

Reference Example 2-1

Similarly to Example 2-1 except that the lithium-transition metal composite oxide was not subjected to any acid treatment, an active material according to Reference Example 2-1 was prepared. The BET specific surface area was 2.3 $m^2/g$.

Reference Examples 2-2 to 2-5

Active materials according to Reference Examples 2-2 to 2-4 were prepared similarly to Example 2-1 except that the lithium-transition metal composite oxides were subjected to acid treatments respectively with the use of sulfuric acid aqueous solutions with hydrogen ion concentrations of 0.05 M, 0.03 M, and 0.01 M, and an active material according to Reference Example 2-5 was prepared similarly to Reference Example 2-4 except that the acid treatment time was 10 minutes. The BET specific surface area of Comparative Example 2-2 was 7.4 $m^2/g$.

Reference Examples 2-6 to 2-8

Active materials according to Reference Examples 2-6 and 2-7 were prepared similarly to Example 2-1 except that the lithium-transition metal composite oxides were subjected to acid treatments respectively with the use of phosphoric acid aqueous solutions with hydrogen ion concentrations of 0.1 M and 0.01 M, and an active material according to Reference Example 2-8 was prepared similarly to Reference Example 2-7 except that the acid treatment time was 10 minutes. The BET specific surface area of Reference Example 2-6 was 5.7 $m^2/g$.

Reference Examples 2-9 and 2-10

Active material according to Reference Examples 2-9 and 2-10 were prepared similarly to Example 2-1 except that the lithium-transition metal composite oxides were subjected to acid treatments respectively with the use of tartaric acid aqueous solutions with hydrogen ion concentrations of 0.1 M and 0.05 M. The BET specific surface areas were respectively 7.1 $m^2/g$ and 6.5 $m^2/g$.

Examples 2-4 and 2-5 and Reference Example 2-11

Active materials according to Examples 2-4 and 2-5 and Reference Example 2-11 were respectively prepared similarly to Examples 2-1 and 2-2 and Reference Example 2-1 except for preparing a hydroxide precursor with a molar ratio Ni:Co:Mn of 40:5:55 and preparing a mixed powder such that the molar ratio of Li:(Ni, Co, Mn) was 120:100.

Example 2-6 and Reference Example 2-12

Active materials according to Example 2-6 and Reference Example 2-12 were respectively prepared similarly to Example 2-4 and Reference Example 2-11 except for preparing a mixed powder such that the molar ratio of Li:(Ni, Co, Mn) was 130:100.

Reference Examples 2-13 to 2-15

Active materials according to Reference Examples 2-13 to 2-15 were respectively prepared similarly to Examples 2-1 and 2-2 and Reference Example 2-1 except for preparing a hydroxide precursor with a molar ratio Ni:Co:Mn of 35:25:40 and preparing a mixed powder such that the molar ratio of Li:(Ni, Co, Mn) was 120:100.

Comparative Examples 2-1 and 2-2

Active materials according to Comparative Examples 2-1 and 2-2 were respectively prepared similarly to Example 2-4 and Reference Example 2-11 except for preparing a mixed powder from the hydroxide precursor according to Example 2-4 and a lithium hydroxide monohydrate such that the molar ratio of Li:(Ni, Co, Mn) was 100:100.

Comparative Examples 2-3 to 2-5

Active materials according to Comparative Examples 2-3 to 2-5 were respectively prepared similarly to Examples 2-1 and 2-2 and Reference Example 2-1 except for preparing a hydroxide precursor with a molar ratio Ni:Co:Mn of 33:33:33 and preparing a mixed powder from the hydroxide precursor mentioned above and a lithium hydroxide monohydrate such that the molar ratio of Li:(Ni, Co, Mn) was 100:100.

<Confirmation of Crystal Structure>

The above-mentioned active materials according to examples, reference examples, and comparative examples of Experimental Example 2 were subjected to powder X-ray diffraction measurement with the use of an X-ray diffractometer (from Rigaku, model name: MiniFlex II). The active materials according to all of examples, reference examples, and comparative examples had an α-NaFeO₂ type crystal structure. In addition, it has been confirmed that the active materials ("lithium-excessive" active material) according to the examples and reference examples excluding Comparative Examples 2-1 to 2-5 have diffraction peaks observed in the range of 20° or more and 22° or less.

<Preparation of Positive Electrode and Negative Electrode>

Positive electrodes were prepared similarly to Example 1-1 mentioned above, with the use of the active materials according to the above-mentioned examples, reference examples, and comparative examples. Furthermore, negative electrodes were prepared similarly to Example 1-1 mentioned above.

<Assembly of Nonaqueous Electrolyte Secondary Battery>

Nonaqueous electrolyte secondary batteries were assembled in accordance with the following procedure, with the use of the positive electrodes according to each of the above-mentioned examples, reference examples, and comparative examples.

A solution in which $LiPF_6$ was dissolved to a concentration of 1 mol/L in a mixed solvent of ethylene carbonate (EC)/ethyl methyl carbonate (EMC)/dimethyl carbonate (DMC) with a volume ratio of 6:7:7 was used as an electrolyte solution. As the separator, a polypropylene microporous membrane surface-modified with polyacrylate was used. A metal-resin composite film composed of polyethylene terephthalate (15 μm)/aluminum foil (50 μm)/metal-adhesive polypropylene film (50 μm) was used for the outer case. Nonaqueous electrolyte secondary batteries were assembled by housing, in the outer case, the positive electrodes according to each of the examples, reference examples, and comparative examples mentioned above and the negative electrode with the separator interposed therebetween such that the open ends of the positive electrode terminal and negative electrode terminal were exposed to the outside, hermetically sealing the sealing body with inner surfaces of the metal-resin composite film being opposed to each other, except for a part for an injection hole, electrolyte solution filling, and then sealing the injection hole.

<Check of First Coulombic Efficiency>

The assembled nonaqueous electrolyte secondary batteries were subjected to a first charge-discharge step at 25° C., thereby checking the first coulombic efficiency. The charge was constant current constant voltage charge with a current value of 15 mA per 1 g of the positive composite (corresponding to 0.1C) and an upper limit voltage of 4.35 V, and the charge cutoff condition was the time when the current value was attenuated to ⅕. The discharge was constant current discharge with the same current value and a lower limit voltage of 2.85 V. In this regard, a pause process for 10 minutes was provided after each of the charge and the discharge, and the charge capacity and the discharge capacity (0.1C discharge capacity) were checked to define the ratio of the discharge capacity to the charge capacity as the first coulombic efficiency.

<Measurement of Discharge Capacity Ratio a/b>

Next, the discharge capacity ratio a/b was measured. The charge was constant current constant voltage charge with a current value of 15 mA per 1 g of the positive composite (corresponding to 0.1C) and an upper limit voltage of 4.35 V, and the charge cutoff condition was the time when the current value was attenuated to ⅕. With a pause process provided for 10 minutes, the discharge was constant current discharge with the same current value and a lower limit voltage of 2.0 V. In this regard, the ratio a/b of the discharge capacity (a) from 4.35 V to 3.0 V to the discharge capacity (b) from 3.0 V to 2.0 V was determined.

Further, in the present examples, reference examples, and comparative examples, the above-mentioned measurement conditions were set after confirming that the same a/b as in the case of charge-discharge at 0.02C was obtained even in the case of charge-discharge at 0.1C in the evaluation of the discharge capacity ratio a/b.

<Check of High Rate Discharge Performance>

Furthermore, the high rate discharge performance was checked. The charge was constant current constant voltage charge with a current value of 15 mA per 1 g of the positive composite and an upper limit voltage of 4.35 V, and the charge cutoff condition was the time when the current value was attenuated to ⅕. With a pause process provided for 10 minutes, for the discharge, constant current discharge with a cutoff voltage of 2.85 V was performed at a current of 300 mA (corresponding to 2C) per 1 g of the positive composite. The ratio of the discharge capacity in this case (2C discharge capacity) to the above-mentioned 0.1C discharge capacity was regarded as high rate discharge performance (2C/0.1C).

<Confirmation of Diffraction Peak of Positive Active Material>

Based on the above-described method for confirming the diffraction peak, the nonaqueous electrolyte secondary batteries according to the examples and the reference examples in the full discharge states were disassembled to take out the positive composites, and the positive composites were subjected to X-ray diffraction measurement with the use of a CuKα line. In all of the examples and reference example, diffraction peaks for the positive active materials were confirmed in the range of 20° or more and 22° or less.

The foregoing measurement results are shown in Table 4.

TABLE 4

| | Ratio Li/M | Compositional Ratio of Transition Metal (Ni/Co/Mn) | Type of Acid | Hydrogen Ion Concentration | Acid Treatment Time | 0.1 C Discharge Capacity/ mAhg$^{-1}$ | First Coulombic Efficiency/% |
|---|---|---|---|---|---|---|---|
| Example 2-1 | 1.3 | 27/27/46 | Citric Acid | 0.05M | 2 h | 153.1 | 95.8% |
| Example 2-2 | 1.3 | 27/27/46 | Boric Acid | 0.05M | 2 h | 153.3 | 93.9% |
| Example 2-3 | 1.3 | 27/27/46 | Tartaric Acid | 0.025M | 2 h | 151.8 | 95.4% |
| Reference Example 2-1 | 1.3 | 27/27/46 | No Treatment | — | — | 153.2 | 93.4% |
| Reference Example 2-2 | 1.3 | 27/27/46 | Sulfuric Acid | 0.05M | 2 h | 141.5 | 99.3% |
| Reference Example 2-3 | 1.3 | 27/27/46 | Sulfuric Acid | 0.03M | 2 h | 147.8 | 95.8% |
| Reference Example 2-4 | 1.3 | 27/27/46 | Sulfuric Acid | 0.01M | 2 h | 150.4 | 92.9% |
| Reference Example 2-5 | 1.3 | 27/27/46 | Sulfuric Acid | 0.01M | 10 min | 150.4 | 93.2% |
| Reference Example 2-6 | 1.3 | 27/27/46 | Phosphoric Acid | 0.1M | 2 h | 138.1 | 96.1% |
| Reference Example 2-7 | 1.3 | 27/27/46 | Phosphoric Acid | 0.01M | 2 h | 150.0 | 92.6% |
| Reference Example 2-8 | 1.3 | 27/27/46 | Phosphoric Acid | 0.01M | 10 min | 146.4 | 92.5% |
| Reference Example 2-9 | 1.3 | 27/2746 | Tartaric Acid | 0.1M | 2 h | 146.1 | 98.9% |
| Reference Example 2-10 | 1.3 | 27/27/46 | Tartaric Acid | 0.05M | 2 h | 147.1 | 96.1% |
| Example 2-4 | 1.2 | 40/5/65 | Citric Acid | 0.05M | 2 h | 148.9 | 94.8% |
| Example 2-5 | 1.2 | 40/5/56 | Boric Acid | 0.05M | 2 h | 146.6 | 92.3% |
| Reference Example 2-11 | 1.2 | 40/5/55 | No Treatment | — | — | 137.8 | 89.3% |
| Example 2-6 | 1.3 | 40/5/55 | Citric Acid | 0.05M | 2 h | 141.6 | 93.4% |

TABLE 4-continued

| | | | | | | | |
|---|---|---|---|---|---|---|---|
| Reference Example 2-12 | 1.3 | 10/5/55 | No Treatment | — | — | 124.8 | 85.7% |
| Reference Example 2-13 | 1.2 | 35/25/40 | Citric Acid | 0.05M | 2 h | 150.0 | 92.9% |
| Reference Example 2-14 | 1.2 | 35/25/40 | Boric Acid | 0.05M | 2 h | 152.3 | 91.1% |
| Reference Example 2-15 | 1.2 | 35/25/40 | No Treatment | — | — | 152.2 | 90.2% |
| Comparative Example 2-1 | 1.0 | 40/5/55 | Citric Acid | 0.05M | 2 h | 94.8 | 90.9% |
| Comparative Example 2-2 | 1.0 | 40/5/55 | No Treatment | — | — | 99.0 | 95.8% |
| Comparative Example 2-3 | 1.0 | 33/33/33 | Citric Acid | 0.05M | 2 h | 157.0 | 90.9% |
| Comparative Example 2-4 | 1.0 | 33/33/33 | Boric Acid | 0.05M | 2 h | 159.5 | 89.8% |
| Comparative Example 2.5 | 1.0 | 33/33/33 | No Treatment | — | 2 h | 158.9 | 89.7% |

| | High Rate Discharge Characteristics (2 C/0.1 C)/% | (a) Discharge Capacity to 3.0 V/mAhg$^{-1}$ | (b)Discharge Capacity to 3.0 V or lower/mAhg$^{-1}$ | (a)/(b) |
|---|---|---|---|---|
| Example 2-1 | 91.9 | 152 | 8.8 | 17.3 |
| Example 2-2 | 90.6 | 151 | 6.3 | 24.2 |
| Example 2-3 | 91.5 | 150 | 8.4 | 17.9 |
| Reference Example 2-1 | 89.7 | 153 | 3.7 | 41.3 |
| Reference Example 2-2 | 86.8 | 141 | 13.5 | 10.4 |
| Reference Example 2-3 | 89.6 | 146 | 9.8 | 14.9 |
| Reference Example 2-4 | 88.5 | 149 | 5.7 | 26.2 |
| Reference Example 2-5 | 89.8 | 149 | 5.1 | 28.9 |
| Reference Example 2-6 | 85.8 | 188 | 15.4 | 8.9 |
| Reference Example 2-7 | 90.6 | 149 | 4.8 | 30.9 |
| Reference Example 2-8 | 89.6 | 145 | 5.0 | 29.0 |
| Reference Example 2-9 | 89.6 | 145 | 12.5 | 11.6 |
| Reference Example 2-10 | 89.9 | 145 | 11.2 | 12.9 |
| Example 2-4 | 86.1 | 148 | 8.6 | 17.2 |
| Example 2-5 | 84.2 | 146 | 6.0 | 24.4 |
| Reference Example 2-11 | 79.9 | 139 | 3.5 | 39.6 |
| Example 2-6 | 82.9 | 140 | 7.1 | 19.8 |
| Reference Example 2-12 | 78.6 | 125 | 3.2 | 39.2 |
| Reference Example 2-13 | 87.3 | 148 | 6.5 | 22.8 |
| Reference Example 2-14 | 88.7 | 150 | 4.2 | 35.8 |
| Reference Example 2-15 | 88.9 | 152 | 2.7 | 56.4 |
| Comparative Example 2-1 | 42.4 | 92 | 15.8 | 5.8 |
| Comparative Example 2-2 | 59.9 | 98 | 6.3 | 15.5 |
| Comparative Example 2-3 | 84.3 | 156 | 5.1 | 30.3 |
| Comparative Example 2-4 | 86.6 | 157 | 3.8 | 48.3 |
| Comparative Example 2.5 | 86.2 | 156 | 3.4 | 45.4 |

It is determined from Table 4 that, in the comparison among Examples 2-1, 2-2, and Reference Example 2-1, the nonaqueous electrolyte secondary batteries according to Examples 2-1 and 2-2 with the positive active materials of lithium-excessive active materials acid-treated with citric acid (pKa$_1$=3.1) or boric acid (pKa$_1$=9.14), and subjected to the charge-discharge at lower than 4.5 V, have first coulombic efficiencies and high rate discharge performance improved with the 0.1C capacity maintained, as compared with the battery according to Reference Example 2-1, subjected to no acid treatment. The ratio a/b of the discharge capacity (a) from 4.35 V to 3.0 V to discharge capacity (b) from 3.0 V to 2.0 V was within the range of 17 or more and 25 or less in the batteries according to Examples 2-1 and 2-2, whereas a/b was larger than 25 in the battery according to Reference Example 2-1. Further, the active materials according to Examples 2-1 and 2-2 were larger in specific surface area than the active material according to Reference Example 2-1.

Reference Examples 2-2 to 2-5 show battery characteristics in the case of the acid species changed to sulfuric acid (pKa$_1$=−3) and the acid treatment at variable hydrogen ion concentrations and/or treatment time, where the 0.1C capacities are each lower than that of Reference Example 2-1 subjected to no acid treatment, and the first coulombic efficiency and the high rate discharge performance are not both higher than those of Reference Example 2-1. The discharge capacity ratio a/b was smaller than 17 or larger than 25.

Reference Examples 2-6 to 2-8 show battery characteristics in the case of using the positive active materials of lithium-excessive active materials subjected to the acid treatment, with the acid species changed to phosphoric acid (pKa$_1$=2.12) and the hydrogen ion concentration and/or the treatment time changed. Again, the 0.1C capacities are each lower than that of Reference Example 2-1 subjected to no acid treatment, and the first coulombic efficiency and the high rate discharge performance are not both higher than those of Reference Example 2-1. The discharge capacity ratio a/b was smaller than 17 or larger than 25.

Example 2-3 and Reference Examples 2-9 and 2-10 are examples concerning batteries including the positive active materials acid-treated with tartaric acids (pKa$_1$=3.2) with different hydrogen ion concentrations.

Example 2-3 shows a 0.1C capacity almost equivalent to that of Reference Example 2-1 subjected to no acid treatment, and has a first coulombic efficiency and high rate discharge performance improved, whereas the batteries according to Reference Examples 2-9 and 2-10 have first coulombic efficiencies improved in comparison with Example 3-3, but fails to maintain the 0.1C capacity shown in Reference Example 2-1, and also show no improvements in high rate discharge performance in comparison with Reference Example 2-1. In addition, the battery according to Example 3-3 including the positive active material acid-treated with the tartaric acid with the low hydrogen ion concentration has a discharge capacity ratio a/b within the range of 17 or more and 25 or less, whereas the batteries according to Reference Examples 2-9 and 2-10 including the positive electrodes acid-treated with the tartaric acids with the high hydrogen ion concentrations have smaller discharge capacity ratios a/b than 17. Further, the active material according to Example 3-3 was smaller in specific surface area than the active materials according to Reference Examples 2-9 and 2-10.

From the foregoing, it is determined that even in the case of an acid treatment with $pKa_1$ of 3.1 or more, there is a need to appropriately select the hydrogen ion concentration of the acid solution, thereby satisfying a predetermined discharge capacity ratio a/b.

Examples 2-4, 2-5, and Reference Example 2-11 correspond to examples of changing the compositions (Li/Me=1.3, Mn/Me=0.48) of the lithium-excessive active materials according to Examples 2-1 and 2-2 and Reference Example 2-1 to other compositions (Li/Me=1.2, Mn/Me=0.55) in which the composition ratio of Mn is higher, and Example 2-6 and Reference Example 2-12 correspond to examples of changing the Li ratios (Li/Me=1.3, Mn/Me=0.55) without changing Mn/Me in the above-mentioned compositions according to Example 2-4 and Reference Example 2-11.

It is determined that the characteristics of the batteries according to Examples 2-4 and 2-5 have 0.1C discharge capacities, first coulombic efficiencies, and high rate discharge performance all increased as compared with Reference Example 2-11 subjected to no acid treatment with the active material of the same composition, and have discharge capacity ratios a/b within the range of 17 or more and 25 or less. It is determined that the characteristics of the battery according to Example 2-6 also have the battery characteristics each increased as compared with Reference Example 2-12 subjected to no acid treatment with the active material of the same composition, and has a discharge capacity ratio a/b within the range of 17 or more and 25 or less. Thus, it is determined that also in the active materials in the composition ranges with higher Mn/Me, the specification of a/b is related to the improvements of the battery characteristics.

Reference Examples 2-13 to 2-15 correspond to examples of changing the compositions (Li/Me=1.3, Mn/Me=0.48) of the lithium-excessive active materials according to Examples 2-1 and 2-2 and Reference Example 2-1 to other compositions (Li/Me=1.2, Mn/Me=0.40) in which the composition ratio of Mn is lower.

The characteristics of the batteries according to Reference Examples 2-13 and 2-14 subjected to the acid treatment have only improvements in first coulombic efficiency, and no improvements in high rate discharge performance, as compared with Reference Example 2-15 subjected to no acid treatment.

Thus, it is determined that even in the case where the discharge capacity ratio a/b satisfies 17 or more and 25 or less as in the active material according to Reference Example 2-13, the effect of the positive active material according to the second embodiment is not produced in the case of excessively low Mn/Me.

It is to be noted that the reference examples in Experimental Example 2 are not intended for the positive active material according to the second embodiment, but as mentioned above, the positive active materials have diffraction peaks confirmed in the range of 20° or more and 22° or less in the nonaqueous electrolyte secondary batteries obtained with the use of the active materials according to all of the examples and reference examples in the positive electrode, and thus, even in the case where the active materials according to the above-mentioned reference examples are used for the positive electrode, the effect of achieving nonaqueous electrolyte secondary batteries in which no sudden increase in battery voltage is observed until reaching a higher SOC is produced similarly as in the case of using the active materials according to the above-mentioned examples for the positive electrodes.

Comparative Examples 2-1 and 2-2 are not intended for active materials that have such a lithium-excessive composition in which lithium is excessive with respect to the transition metal, but are examples of the increased composition ratio of Mn (Li/Me=1, Mn/Me=0.55), which are both low in 0.1C capacity and high rate discharge performance, also with discharge capacity ratios a/b outside the scope of the present invention.

Comparative Examples 2-3 to 2-5 are examples of using the lithium-transition metal composite oxide with Li/Me=1 and Ni:Co:Me=33:33:33, already put into practical use, for the positive active materials. Comparative Example 2-4 subjected to the boric acid treatment has the battery characteristics each improved in comparison with Comparative Example 2-5 subjected to no acid treatment, while Comparative Example 2-3 subjected to the citric acid treatment has a 0.1C discharge capacity decreased and high rate discharge performance degraded, and each of the battery characteristic is not correlated with the discharge capacity ratio a/b.

Experimental Example 3

Experimental Example 3 shows examples of the positive active material according to the third embodiment together with comparative examples. Presented first are Examples 3-1 to 3-10 and Reference Example 1 of varying the conditions for producing the lithium-transition metal composite oxide with the use of a transition metal compound of the same composition.

Example 3-1

<Preparation of Lithium-Transition Metal Composite Oxide>

For preparing the lithium-transition metal composite oxide, a hydroxide precursor was prepared by using a reaction crystallization method. First, a nickel sulfate hexahydrate, a cobalt sulfate heptahydrate, and a manganese sulfate pentahydrate were weighed respectively to 578.3 g, 56.2 g, and 385.7 g, and the total of these hydrates was dissolved in 4 L of ion-exchange water to prepare a 1.0 M aqueous solution of sulfates with a molar ratio Ni:Co:Mn of 55:5:40. Next, 2 L of ion-exchange water was poured into a 5 L reaction tank, and bubbled with an $N_2$ gas for 30 minutes to remove oxygen contained in the ion-exchange water. The temperature of the reaction tank was set to 50° C. (±2° C.), such that sufficient convection in the reaction tank was generated, while stirring the inside of the reaction tank at a rotation speed of 1500 rpm with the use of a paddle blade equipped with a stirring motor. The undiluted sulfate solution was delivered by drops to the reaction tank at a rate of 1.3 mL/min for 50 hours. In this regard, between the start of the dropping and the end thereof, a mixed alkaline solution composed of a 4.0 M sodium hydroxide, a 1.25 M ammonia, and a 0.1 M hydrazine was appropriately delivered by drops, thereby controlling the pH in the reaction tank to be always kept at 10.20 (±0.1), and the reaction liquid was partially discharged by overflow thereof, thereby controlling the total amount of the reaction liquid always not to exceed 2 L. After the completion of the dropping, stirring in the reaction tank was continued for another 1 hour. After stopping the stirring, the reaction tank was left at room temperature for 12 hours or longer. Next, the hydroxide precursor particles produced in the reaction tank were separated with the use of a suction filtration device, sodium ions adhering to the particles were further washed away with the use of ion-exchange water, and with the use of an electric furnace, the particles were dried in an air atmosphere at 80° C. for 20 hours under ordinary pressure. Then, the powder was crushed for several minutes in an automatic agate mortar to make the particle sizes uniform. In this manner, a hydroxide precursor with a molar ratio Ni:Co:Mn of 55:5:40 was prepared.

To 2.264 g of the hydroxide precursor, 1.264 g of a lithium hydroxide monohydrate and 0.015 g of a lithium fluoride were added, and mixed well with the use of an automatic agate mortar to prepare a mixed powder with a molar ratio Li:(Ni, Co, Mn) of 120:100. The addition ratio of the lithium fluoride is 2 mol % based on the total amount of the Li compounds. With the use of a pellet molding machine, the powder was subjected to molding at a pressure of 6 MPa to obtain pellets of 25 mm in diameter. The amount of the mixed powder subjected to the pellet molding was determined by converting the amount such that the assumed mass of the final product was 2.5 g. One of the pellets was placed on an alumina boat with a total length of about 100 mm, and the boat was placed in a box-type electric furnace (model number: AMF20), and subjected to a temperature increase from ordinary temperature to 900° C. over 10 hours, and then to firing at 900° C. for 4 hours, under ordinary pressure in an air atmosphere. The internal dimensions of the box-type electric furnace are 10 cm in length, 20 cm in width, and 30 cm in depth, with heating wires inserted at intervals of 20 cm in the width direction. After the firing, the heater was turned off, and the alumina boat was naturally cooled with the boat left in the furnace. As a result, the furnace temperature drops to about 200° C. after 5 hours, but the rate of the subsequent temperature decrease is rather slow. After all night and all day, the pellet was taken out after confirming that the temperature of the furnace was 100° C. or lower, and crushed for a few minutes in an agate automatic mortar to make the particle sizes uniform. In this manner, the lithium-transition metal composite oxide according to Example 3-1 was prepared.

Examples 3-2 to 3-5, Reference Example 1

Lithium-transition metal composite oxides according to Examples 3-2 to 3-4 and Reference Example 1 were prepared similarly to Example 3-1 except that the addition ratios of the lithium fluoride in mixed powders of the hydroxide precursor, the lithium hydroxide monohydrate, and the lithium fluoride were respectively adjusted to 5, 8, 10, and 20 mol % based on the total amounts of the Li compounds.

In addition, a lithium-transition metal composite oxide according to Example 3-5 was prepared similarly to Example 3-1 except that no lithium fluoride was added.

Example 3-6

Similarly to Example 3-2 except that the mixed powder of the hydroxide precursor, the lithium hydroxide monohydrate, and the lithium fluoride was subjected to firing at 950° C., a lithium-transition metal composite oxide according to Example 3-6 was prepared.

Example 3-7

Similarly to Example 3-2 except that the molar ratio of Li:(Ni, Co, Mn) in the mixed powder of the hydroxide precursor, the lithium hydroxide monohydrate, and the lithium fluoride was changed to 130:100, a lithium-transition metal composite oxide according to Example 3-7 was prepared.

Examples 3-8 to 3-10

Lithium-transition metal composite oxides according to Examples 3-8 to 3-10 were prepared similarly to Example 3-2 except for preparing mixed powders respectively with a lithium carbonate, a sodium fluoride, and a sodium chloride added thereto in place of the lithium fluoride at 5 mol % based on the total amount of the lithium compound.

Presented next are Examples 3-11 to 3-14 and Reference Example 3-2 of varying the conditions for producing lithium-transition metal composite oxide with the use of transition metal compounds of other compositions.

Example 3-11

Similarly to Example 3-2 except that the molar ratio of Ni:Co:Mn was changed to 40:15:45 to prepare a hydroxide precursor and that the molar ratio of Li:(Ni, Co, Mn) in the mixed powder of the hydroxide precursor, the lithium hydroxide monohydrate, and the lithium fluoride was changed to 110:100, a lithium-transition metal composite oxide according to Example 3-11 was prepared.

Examples 3-12 to 3-14

Lithium-transition metal composite oxides according to Examples 3-12 to 3-14 were prepared similarly to Example 3-11 except for preparing mixed powders respectively with a lithium carbonate, a sodium fluoride, and a sodium chloride added thereto in place of the lithium fluoride at 5 mol % based on the total amount of the lithium compound.

Reference Example 3-2

Similarly to Example 3-11 except that the addition ratio of the lithium fluoride in the mixed powder of the hydroxide precursor, the lithium hydroxide monohydrate, and the lithium fluoride was 20 mol %, a lithium-transition metal composite oxide according to Reference Example 3-2 was prepared.

Further presented are Examples 3-15 to 3-17, Reference Examples 3-3 and 3-4 and Comparative Examples 3-1 to 3-3 of varying the conditions for producing lithium-transition metal composite oxide with the use of transition metal compounds of other compositions.

Example 3-15

Similarly to Example 3-2 except that the molar ratio of Ni:Mn was changed to 60:40 to prepare a hydroxide precursor, a lithium-transition metal composite oxide according to Example 3-15 was prepared.

Example 3-16

Similarly to Example 3-2 except that the molar ratio of Ni:Co:Mn was changed to 35:15:50 to prepare a hydroxide precursor and that the molar ratio of Li:(Ni, Co, Mn) in the mixed powder of the hydroxide precursor, the lithium hydroxide monohydrate, and the lithium fluoride was changed to 110:100, a lithium-transition metal composite oxide according to Example 3-16 was prepared.

Example 3-17

Similarly to Example 3-2 except that the molar ratio of Ni:Co:Mn was changed to 33:33:33 to prepare a hydroxide precursor and that the molar ratio of Li:(Ni, Co, Mn) in the mixed powder of the hydroxide precursor, the lithium hydroxide monohydrate, and the lithium fluoride was changed to 110:100, a lithium-transition metal composite oxide according to Example 3-17 was prepared.

Reference Example 3-3

Similarly to Example 3-2 except that the molar ratio of Ni:Co:Mn was changed to 30:15:55 to prepare a hydroxide precursor, a lithium-transition metal composite oxide according to Reference Example 3-3 was prepared.

Reference Example 3-4

Similarly to Example 3-2 except that the molar ratio of Ni:Co:Mn was changed to 30:10:60 to prepare a hydroxide precursor and that the molar ratio of Li:(Ni, Co, Mn) in the mixed powder of the hydroxide precursor, the lithium hydroxide monohydrate, and the lithium fluoride was changed to 130:100, a lithium-transition metal composite oxide according to Reference Example 3-4 was prepared.

Comparative Example 3-1

Similarly to Example 3-5 except that the molar ratio of Ni:Co:Mn was changed to 33:33:33 to prepare a hydroxide precursor and that the molar ratio of Li:(Ni, Co, Mn) in the mixed powder of the hydroxide precursor and the lithium hydroxide monohydrate was changed to 100:100, a lithium-transition metal composite oxide according to Comparative Example 3-1 was prepared.

Comparative Example 3-2

Similarly to Example 3-2 except that the molar ratio of Ni:Co:Mn was changed to 33:33:33 to prepare a hydroxide precursor and that the molar ratio of Li:(Ni, Co, Mn) in the mixed powder of the hydroxide precursor, the lithium hydroxide monohydrate, and the lithium fluoride was changed to 100:100, a lithium-transition metal composite oxide according to Comparative Example 3-2 was prepared.

Comparative Example 3-3

Similarly to Example 3-2 except that the molar ratio of Li:(Ni, Co, Mn) in the mixed powder of the hydroxide precursor, the lithium hydroxide monohydrate, and the lithium fluoride was changed to 100:100, a lithium-transition metal composite oxide according to Comparative Example 3-3 was prepared.

<Confirmation of Crystal Structure of Lithium-Transition Metal Composite Oxide>

The α-NaFeO$_2$-type crystal structures of the lithium-transition metal composite oxides according to the above-mentioned examples and comparative examples were confirmed by the fact that the diffraction patterns agreed with the structural model in X-ray diffraction measurement. In addition, the diffraction peaks observed in the range of 20° or more and 22° or less were confirmed for the active materials ("lithium-excessive" active materials) according to the examples and reference examples excluding Comparative Examples 3-1 to 3-3.

<Evaluation of $I_{490}/I_{600}$>

Figure 13:
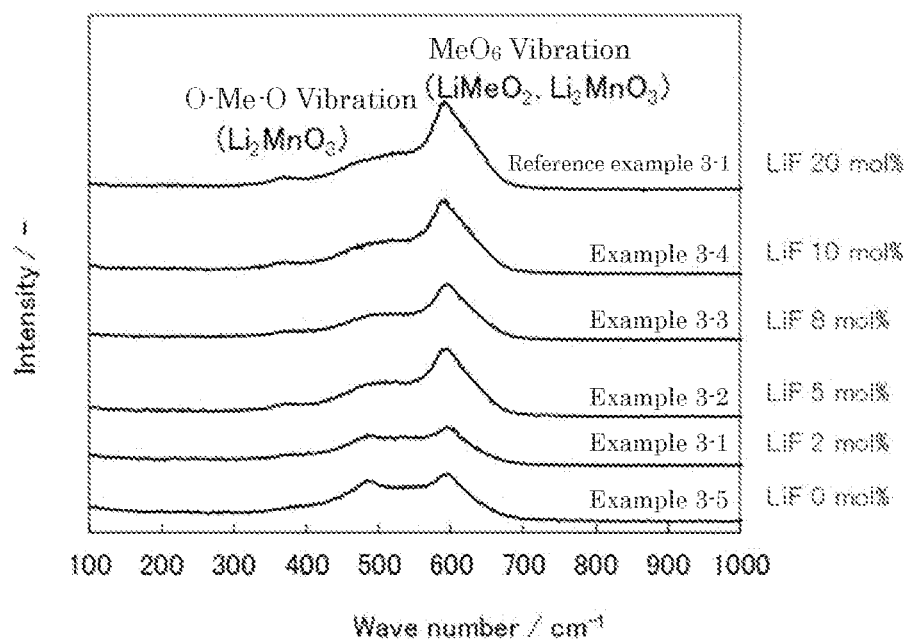
FIG. 13 shows Raman spectra according to examples of the present invention and a reference example.

Furthermore, the Raman spectra of the lithium-transition metal composite oxides according to the above-mentioned examples, reference examples, and comparative examples were measured to evaluate the ratio ($I_{490}/I_{600}$) of the maximum value $I_{490}$ in the range of 450 cm$^{-1}$ or more and 520 cm$^{-1}$ or less to the maximum value Ica) in the range of 550 cm$^{-1}$ or more and 650 cm$^{-1}$ or less. FIG. 13 shows Raman spectra of the lithium-transition metal composite oxides according to Examples 3-1 to 3-5.

<Preparation of Positive Electrode and Negative Electrode>

Positive electrodes were prepared similarly to Example 1-1, with the use of the lithium-transition metal composite oxides according to the above-mentioned examples, reference examples, and comparative examples for the positive active material. It is to be noted that the applied thicknesses of the active materials applied per specific area were adjusted so as to achieve the same test condition for determining the amount of charge and the discharge capacity for the nonaqueous electrolyte secondary batteries according to all of the examples, reference examples, and comparative examples.

Furthermore, negative electrodes were prepared similarly to Example 1-1 mentioned above.

<Assembly of Nonaqueous Electrolyte Secondary Battery>

Nonaqueous electrolyte secondary batteries were assembled in accordance with the same procedure as in Experimental Example 2, with the use of the partially cut out positive electrodes according to the above-mentioned examples, reference examples, and comparative examples.

<First Charge-Discharge Step>

The nonaqueous electrolyte secondary batteries assembled in accordance with the above-mentioned procedure is finished through the first charge-discharge step. In this regard, the first charge-discharge step was divided into a first group to which a first charge-discharge condition 1 is applied and a second group to which a first initial charge-discharge condition 2 is applied.

(Calculation of Discharge Capacity Per Volume)

The batteries in the first group were used for the first charge-discharge step under the following first charge-discharge condition 1 applied. At 25° C., the charge was constant current constant voltage charge with a current of 0.1C and a voltage of 4.35 V, and the charge cutoff condition was the time when the current value was attenuated to 0.02C. The amount of charge in this case was defined as "the amount of charge during 4.35 V charge" (mAh/g). The discharge was constant current discharge with a current of 0.1C and a cutoff voltage of 2.5 V. This charge-discharge was performed for 1 cycle. Further, a pause process for 10 minutes was provided after the charge.

The discharge capacity per mass in this case was defined as "the discharge capacity during 4.35 V charge" (mAh/g). On the other hand, the press density of the positive active material powder was measured under the above-described condition, and the measured press density (g/cm$^3$) was multiplied by "the discharge capacity during 4.35 V charge" (mAh/g) to calculate the discharge capacity per volume "the discharge capacity during 4.35 V charge" (mAh/cm$^3$). In this regard, "the discharge capacity during 4.35 V charge" (mAh/cm$^3$) refers to an index indicating the discharge capacity in the case of manufacture without undergoing any charge process until the completion of the overcharge region, and use in a lower potential range without undergoing any charge with electricity until the completion of the overcharge region.

<Confirmation of Diffraction Peak of Positive Active Material>

Based on the above-described method for confirming the diffraction peak, the nonaqueous electrolyte secondary batteries according to the examples and the reference examples in the full discharge states after the first charge-discharge step were disassembled to take out the positive composites, and the positive composites were subjected to X-ray diffraction measurement with the use of a CuKα line. In all of the examples and reference example, diffraction peaks for the positive active materials were confirmed in the range of 20° or more and 22° or less.

(Calculation of the Amount of Charge Per Volume)

The batteries in the second group were used for the first charge-discharge step under the following first charge-discharge condition 2 applied. At 25° C., the charge was constant current constant voltage charge with a current of 0.1C and a voltage of 4.6 V, and the charge cutoff condition was the time when the current value was attenuated to 0.02C. The discharge was constant current discharge with a current of 0.1C and a cutoff voltage of 2.0 V. This charge-discharge was performed for 1 cycle. Further, a pause process for 10 minutes was provided after the charge.

The difference between the amount of charge (mAh/g) in this case and "the amount of charge during 4.35 V charge" (mAh/g) was calculated as "the amount of charge between 4.35 V and 4.6 V" (mAh/g). The press density (g/cm$^3$) was multiplied by "the amount of charge between 4.35 V and 4.6 V" (mAh/g) to calculate the amount of charge per volume "the amount of charge between 4.35 V and 4.6 V" (mAh/cm$^3$). In this regard, "the amount of charge between 4.35 V and 4.6 V" (mAh/cm$^3$) refers to an index indicating the amount of charge in the overcharge region.

Figure 14:
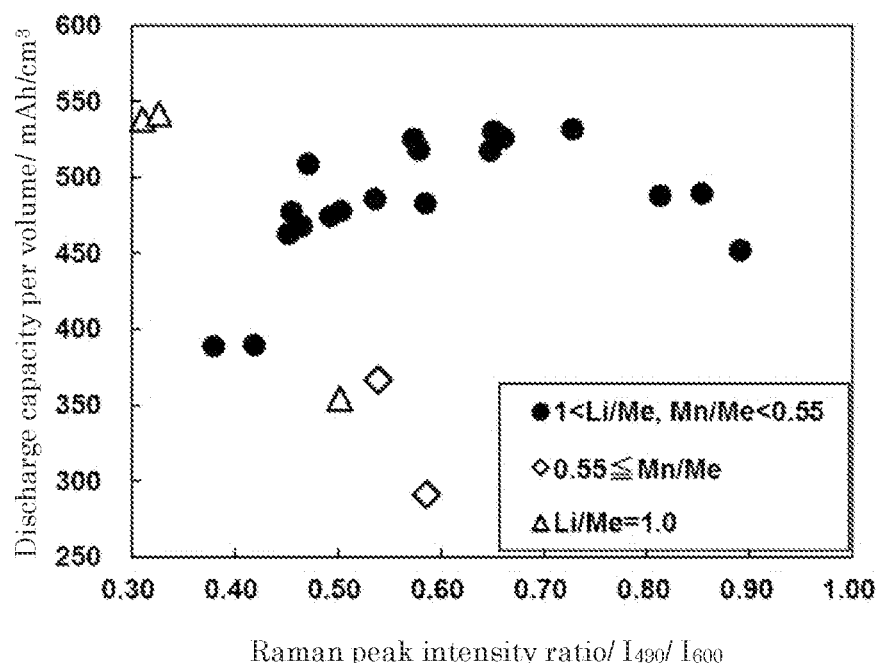
FIG. 14 is a graph showing the relationship between the Raman peak intensity ratio I$_{490}$/I$_{600}$ and the discharge capacity per volume for lithium-excessive active materials according to examples of the present invention, reference examples, and comparative examples.

The above results are shown in Table 5. Further, FIG. 14 shows the relationship between $I_{490}/I_{600}$ and the discharge capacity per volume, where ● shows examples of 1<Li/Me and Mn/Me<0.55 (Examples 1-1 to 1-17 and reference Examples 3-1 and 3-2), ◇ shows examples of 0.55≤Mn/Me (Reference Examples 3-3 and 3-4), and Δ shows examples of Li/Me=1.0 (Comparative Examples 3-1 to 3-3). From FIG. 14, it is determined that there is a correlation between the Raman peak intensity ratio and the discharge capacity per volume in the compositions with 1<Li/Me and Mn/Me<0.55. In contrast, no correlation is observed in the compositions with Li/Me=1.0 or 0.55≤Mn/Me.

TABLE 5

| | Composition | | Firing | Sintering Aid | | Raman Peak Intensity Ratio $I_{490}/I_{600}$ | Discharge Capacity in Formation at 4.35 V [mAh/cm$^3$] | Amount of Charge between 4.35 V and 4.6 V [mAh/cm$^3$] |
|---|---|---|---|---|---|---|---|---|
| | Ni/Co/Mn [mol %] | Ratio Li/Me | Temperature ° C. | Type | Additive Amount [mol %] | | | |
| Example 3-1 | 55/5/40 | 1.2 | 900 | LiF | 2 | 0.66 | 527 | 152 |
| Example 3-2 | 55/5/40 | 1.2 | 900 | LiF | 5 | 0.57 | 526 | 116 |
| Example 3-3 | 55/5/40 | 1.2 | 900 | LiF | 8 | 0.53 | 486 | 130 |
| Example 3-4 | 55/5/40 | 1.2 | 900 | LiF | 10 | 0.50 | 478 | 115 |
| Example 3-5 | 55/5/40 | 1.2 | 900 | None | | 0.89 | 453 | 165 |
| Reference Example 3-1 | 55/5/40 | 1.2 | 900 | LiF | 20 | 0.42 | 390 | 109 |
| Example 3-6 | 55/5/40 | 1.2 | 950 | LiF | 5 | 0.58 | 519 | 118 |
| Example 3-7 | 55/5/40 | 1.3 | 900 | LiF | 5 | 0.73 | 532 | 165 |
| Example 3-8 | 65/5/40 | 1.2 | 900 | Li$_2$CO$_3$ | 5 | 0.85 | 490 | 280 |
| Example 3-9 | 55/5/40 | 1.2 | 900 | NaF | 5 | 0.65 | 531 | 179 |
| Example 3-10 | 55/5/40 | 1.2 | 900 | NaCl | 5 | 0.81 | 489 | 197 |
| Example 3-11 | 40/15/45 | 1.1 | 900 | LiF | 5 | 0.58 | 483 | 144 |
| Example 3-12 | 40/15/45 | 1.1 | 900 | Li$_2$CO$_3$ | 5 | 0.49 | 474 | 290 |
| Example 3-13 | 40/15/45 | 1.1 | 900 | NaF | 5 | 0.45 | 477 | 174 |
| Example 3-14 | 40/15/45 | 1.1 | 900 | NaCl | 5 | 0.46 | 468 | 199 |
| Reference Example 3-2 | 40/15/45 | 1.1 | 900 | LiF | 20 | 0.38 | 389 | 145 |
| Example 3-15 | 60/0/40 | 1.2 | 900 | LiF | 5 | 0.65 | 518 | 146 |
| Example 3-16 | 35/15/50 | 1.1 | 900 | LiF | 5 | 0.45 | 463 | 309 |
| Example 3-17 | 33/33/33 | 1.1 | 900 | LiF | 5 | 0.47 | 509 | 121 |
| Reference Example 3-3 | 30/15/55 | 1.2 | 900 | LiF | 5 | 0.54 | 367 | 389 |
| Reference Example 3-4 | 30/10/60 | 1.3 | 900 | LiF | 5 | 0.59 | 291 | 462 |
| Comparative Example 3-1 | 33/33/38 | 1.0 | 900 | None | 0 | 0.31 | 539 | 68 |
| Comparative Example 3-2 | 33/33/33 | 1.0 | 900 | LiF | 5 | 0.33 | 542 | 66 |
| Comparative Example 3-3 | 55/5/40 | 1.0 | 900 | LiF | 5 | 0.50 | 354 | 116 |

For all of the lithium-transition metal composite oxides (positive active materials) according to Examples 3-1 to 3-5, the transition metal compounds (hydroxide precursors) containing Ni, Co, and Mn has the same composition, and also the same Li/Me ratio, but differ in the presence or absence of lithium fluoride as a sintering aid or the additive amount thereof. It is determined that as the additive amounts increase, the ratios $I_{490}/I_{600}$ show a tendency to decrease, but all above 0.45, the discharge capacity per volume exceeds 450 mAh/cm$^3$ in the case of charge with electricity at 4.35 V, and the amount of charge per volume in the overcharge region exceeds 110 mAh/cm$^3$. In contrast, it is determined that Reference Example 3-1 in which the additive amount of lithium fluoride is 20 mol % based on the total amount of the lithium compound fails to, with $I_{490}/I_{600}$) below 0.45, achieve a sufficient discharge capacity per volume in the case of charge with electricity at 4.35 V and a sufficient amount of charge per volume in the overcharge region.

Examples 3-6 and 3-7 correspond to examples of changing the firing temperature of the mixed powder in Example 3-2 or changing the Li/Me ratio. In each case, it is determined that $I_{490}/I_{600}$ exceeds 0.45, the discharge capacity per volume in the case of charge with electricity at 4.35 V exceeds 450 mAh/cm$^3$, and the amount of charge per volume in the overcharge region exceeds 110 mAh/cm$^3$.

Examples 3-8 to 3-10 correspond to examples of changing the type of the sintering aid in Example 3-2, and in each case, it is determined that $I_{490}/I_{600}$ exceeds 0.45, thereby resulting in the high discharge capacity per volume in the case of charge with electricity at 4.35 V and the large amount of charge per volume in the overcharge region.

Further, when Examples 3-1 to 3-4 and 3-6 to 3-10 are compared with Example 3-5, it is determined that the positive active materials according to Examples 3-1 to 3-4 and 3-6 to 3-10 with the sintering aid added thereto each have a lower $I_{490}/I_{600}$ of 0.85 or less, than the positive active material according to Example 3-5 without any sintering aid added thereto, thereby resulting in the high discharge capacity per volume in the case of charge with electricity at 4.35 V. Thus, $I_{490}/I_{600}$ is preferably 0.45 or more and 0.85 or less for increasing the discharge capacity per volume in the case of charge with electricity at 4.35 V.

Examples 3-11 to 3-14 and Reference Example 3-2 corresponds to examples of changing the composition of the lithium-transition metal composite oxide from Example 3-2, and Examples 3-12 to 3-14 further correspond to examples of changing the type of the sintering aid in Example 3-11. According to Examples 3-11 to 3-14, in each case, it is to be noted that $I_{490}/I_{600}$ is 0.45 or more, thereby resulting in the high discharge capacity per volume in the case of charge with electricity at 4.35 V and the large amount of charge per volume in the overcharge region.

Reference Example 3-2 corresponds to an example of increasing the additive amount of the sintering aid in Example 3-11. With $I_{490}/I_{600}$ below 0.45, the discharge capacity per volume in the case of charge with electricity at 4.35 V was insufficiently 389 mAh/cm$^3$.

Examples 3-15 to 3-17, Reference Examples 3-3 and 3-4, and Comparative Examples 3-1 to 3-3 correspond to examples of further changing the composition of the lithium-transition metal composite oxide from Example 3-2. From Examples 3-15 to 3-17, it is determined that if the ratio Mn/Me is 0.33 or more and 0.50 or less, active materials with the discharge capacity per volume in the case of charge with electricity at 4.35 V in excess of 450 mAh/cm$^3$ and the amount of charge per volume in the overcharge region in excess of 110 mAh/cm$^3$ are obtained under conditions that achieve $I_{490}/I_{600}$ of 0.45 or more.

In contrast, from Reference Examples 3-3 and 3-4, it is determined that in the case of the ratio Mn/Me of 0.55 or more, the discharge capacity per volume in the case of charge with electricity at 4.35 V is insufficiently obtained even if $I_{490}/I_{600}$ is 0.45 or more.

It is to be noted that the reference examples in Experimental Example 3 are not intended for the positive active material according to the third embodiment, but as mentioned above, the positive active materials have diffraction peaks confirmed in the range of 20° or more and 22° or less in the nonaqueous electrolyte secondary batteries obtained with the use of the active materials according to all of the examples and reference examples in the positive electrode, and thus, even in the case where the active materials according to the above-mentioned reference examples are used for the positive electrode, the effect of achieving nonaqueous electrolyte secondary batteries in which no sudden increase in battery voltage is observed until reaching a higher SOC is produced similarly as in the case of using the active materials according to the above-mentioned examples for the positive electrodes.

Further, the use of the active materials according to the present examples for the positive electrodes increases the amount of charge per volume in the overcharge region, thus providing nonaqueous electrolyte secondary batteries in which no sudden increase in battery voltage is observed until reaching a higher SOC.

Comparative Examples 3-1 to 3-3 are active materials in the case of Li/Me=1, to which the present invention is not directed. With $I_{490}/I_{600}$ below 0.45 in each case, any active material was not obtained which was sufficient in both the discharge capacity per volume in the case of charge with electricity at 4.35 V and the amount of charge per volume in the overcharge region.

INDUSTRIAL APPLICABILITY

In the nonaqueous electrolyte secondary battery according to the present invention, no sudden increase in battery voltage is observed until reaching a higher SOC, even if the battery is overcharged.

In addition, the nonaqueous solvent of the nonaqueous electrolyte includes therein a fluorinated cyclic carbonate, thereby making it possible to suppress an increase in AC resistance after storage.

Furthermore, the nonaqueous electrolyte includes a compound having an oxalate group bonded to boron, thereby allowing the initial AC resistance to be reduced.

The active material for a nonaqueous electrolyte secondary battery according to the second embodiment exhibits excellent first coulombic efficiency and high rate discharge performance in use in a potential range of lower than 4.5 V (vs. Li/Li$^+$).

The use of the positive active material including the lithium-transition metal composite oxide according to the third embodiment makes it possible to provide a nonaqueous electrolyte secondary battery that has a large charge capacity per volume in the overcharge region, no observed sudden increase in battery voltage until reaching a higher SOC, and a large discharge capacity per volume.

Thus, the nonaqueous electrolyte secondary battery according to the present invention is highly useful as a battery for hybrid vehicles (HEV), plug-in hybrid vehicles (PHEV), and electric vehicles (EV) that require high safety, storage performance, efficiency, and high power.

DESCRIPTION OF REFERENCE SIGNS

1: Nonaqueous electrolyte secondary battery
2: Electrode group
3: Battery case
4: Positive electrode terminal
4': Positive electrode lead
5: Negative electrode terminal
5': Negative electrode lead
1A, 1B: Measurement probe
2A, 2B: Measurement surface
3A, 3B: Base
6: Side body 7: Through hole
20: Energy storage unit
30: Energy storage apparatus

The invention claimed is:

1. A positive active material for a nonaqueous electrolyte secondary battery, the positive active material containing a lithium-transition metal composite oxide,
wherein the lithium-transition metal composite oxide has an α-NaFeO$_2$-type crystal structure, the lithium-transition metal composite oxide is represented by the general formula Li$_{1+\alpha}$Me$_{1-\alpha}$O$_2$ where 0<α, Me is a transition metal element containing Ni and Mn, or containing Ni, Mn, and Co, a molar ratio Mn/Me of Mn to Me meets 0.3≤Mn/Me<0.55, and
a ratio (I$_{490}$/I$_{600}$) of a maximum value I$_{490}$ in a range of 450 cm$^{-1}$ or more and 520 cm$^{-1}$ or less to a maximum value I$_{600}$ in a range of 550 cm$^{-1}$ or more and 650 cm$^{-1}$ or less is 0.45 or more in a Raman spectrum of the lithium-transition metal composite oxide.

2. A method for producing the positive active material of claim 1, the method comprising adding a sintering aid in a case where a transition metal compound containing Ni and Mn, or containing Ni, Co, and Mn, with the molar ratio Mn/Me of Mn to Me meeting 0.3≤Mn/Me<0.55, is mixed with a Li compound, and fired to produce the lithium-transition metal composite oxide with a molar ratio Li/Me meeting 1<Li/Me.

3. A positive electrode containing the positive active material according to claim 1.

4. A nonaqueous electrolyte secondary battery comprising the positive electrode according to claim 3, wherein the positive active material contained in the positive electrode has a diffraction peak observed in a range of 20° or more and 22° or less in an X-ray diffraction pattern obtained with a CuKα line.

5. The positive active material according to claim 1, wherein the positive active material has a diffraction peak observed in a range of 20° or more and 22° or less in an X-ray diffraction pattern obtained with a CuKα line.

6. The positive active material according to claim 1, wherein the ratio (I$_{490}$/I$_{600}$) is 0.45 or more and 0.85 or less in the Raman spectrum of the lithium-transition metal composite oxide.

7. The positive active material according to claim 1, wherein the molar ratio Mn/Me of Mn to Me meets 0.33≤Mn/Me≤0.50.

8. A nonaqueous electrolyte secondary battery comprising the positive electrode according to claim 3, wherein
the nonaqueous electrolyte secondary battery has undergone an initial charge-discharge,
a maximum attainable potential of the positive electrode in the initial charge-discharge is less than 4.5 V (vs. Li/Li$^+$), and
when the positive electrode is charged with electricity to a positive electrode potential of 5.0 V (vs. Li/Li$^+$), a positive electrode potential change with respect to an amount of charge is relatively flat within a positive electrode potential range of 4.5 V (vs. Li/Li$^+$) or higher and 5.0 V (vs. Li/Li$^+$) or lower.

9. A nonaqueous electrolyte secondary battery comprising the positive electrode according to claim 3, wherein
the nonaqueous electrolyte secondary battery has undergone an initial charge-discharge,
a maximum attainable potential of the positive electrode in the initial charge-discharge is less than 4.5 V (vs. Li/Li$^+$), and
the positive active material contained in the positive electrode has a diffraction peak observed in a range of 20° or more and 22° or less in an X-ray diffraction pattern obtained with a CuKα line.

10. The positive active material according to claim 1, wherein the molar ratio Mn/Me of Mn to Me meets 0.33≤Mn/Me≤0.50,
the ratio (I$_{490}$/I$_{600}$) is 0.45 or more and 0.85 or less in the Raman spectrum of the lithium-transition metal composite oxide, and
the positive active material has a diffraction peak observed in a range of 20° or more and 22° or less in an X-ray diffraction pattern obtained with a CuKα line.

11. A positive electrode containing the positive active material according to claim 10.

12. A nonaqueous electrolyte secondary battery comprising the positive electrode according to claim 11, wherein
the nonaqueous electrolyte secondary battery has undergone an initial charge-discharge,
a maximum attainable potential of the positive electrode in the initial charge-discharge is less than 4.5 V (vs. Li/Li$^+$), and
when the positive electrode is charged with electricity to a positive electrode potential of 5.0 V (vs. Li/Li$^+$), a positive electrode potential change with respect to an amount of charge is relatively flat within a positive electrode potential range of 4.5 V (vs. Li/Li$^+$) or higher and 5.0 V (vs. Li/Li$^+$) or lower.

13. A nonaqueous electrolyte secondary battery comprising the positive electrode according to claim 11, wherein
the nonaqueous electrolyte secondary battery has undergone an initial charge-discharge,
a maximum attainable potential of the positive electrode in the initial charge-discharge is less than 4.5 V (vs. Li/Li$^+$), and
the positive active material contained in the positive electrode has a diffraction peak observed in a range of 20° or more and 22° or less in an X-ray diffraction pattern obtained with a CuKα line.

14. A nonaqueous electrolyte secondary battery comprising the positive electrode according to claim 3, wherein when the positive electrode is charged with electricity to a positive electrode potential of 5.0 V (vs. Li/Li$^+$), a positive electrode potential change with respect to an amount of charge is relatively flat within a positive electrode potential range of 4.5 V (vs. Li/Li$^+$) or higher and 5.0 V (vs. Li/Li$^+$) or lower.

15. The nonaqueous electrolyte secondary battery according to claim 4, for use at a battery voltage at which the positive electrode has a lower maximum attainable potential than 4.5 V (vs. Li/Li$^+$) in a full charge state (SOC 100%).

16. A method for producing the nonaqueous electrolyte secondary battery according to claim 4, wherein the positive electrode in an initial charge-discharge step has a lower maximum attainable potential than 4.5 V (vs. Li/Li$^+$).

17. A method for using the nonaqueous electrolyte secondary battery according to claim 4, for use at a battery voltage at which the positive electrode has a lower maximum attainable potential than 4.5 V (vs. Li/Li$^+$) in a full charge state (SOC 100%).

* * * * *